(12) United States Patent
Kutsuna et al.

(10) Patent No.: US 11,390,310 B2
(45) Date of Patent: Jul. 19, 2022

(54) HANDCART

(71) Applicant: Makita Corporation, Anjo (JP)

(72) Inventors: Tomoyuki Kutsuna, Anjo (JP);
Toshihiro Tomita, Anjo (JP); Susumu Kato, Anjo (JP); Tomonobu Nashimoto, Anjo (JP); Kohei Oishi, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 16/986,654

(22) Filed: Aug. 6, 2020

(65) Prior Publication Data

US 2021/0039702 A1 Feb. 11, 2021

(30) Foreign Application Priority Data

Aug. 8, 2019 (JP) .............................. JP2019-146884

(51) Int. Cl.
*B62B 5/06* (2006.01)
*B62B 5/00* (2006.01)
*B60Q 5/00* (2006.01)
*B60Q 1/30* (2006.01)

(52) U.S. Cl.
CPC .............. *B62B 5/0036* (2013.01); *B60Q 1/30* (2013.01); *B60Q 5/001* (2013.01); *B62B 5/0053* (2013.01); *B62B 5/06* (2013.01)

(58) Field of Classification Search
CPC ......... B62D 51/04; B62D 51/002; B60Q 1/30
USPC ...................................... 180/19.1, 19.2, 19.3
See application file for complete search history.

(56) References Cited

U.S. PATENT DOCUMENTS

| | | | | |
|---|---|---|---|---|
| 4,286,309 A | * | 8/1981 | Rasinski ................ | B60Q 1/305 280/414.1 |
| 4,429,758 A | * | 2/1984 | Meshulam ........... | B62D 51/005 180/19.3 |
| 5,082,074 A | * | 1/1992 | Fischer .................. | B62D 51/04 180/11 |
| 5,157,591 A | * | 10/1992 | Chudzik .................. | B60Q 7/02 362/473 |
| 5,350,030 A | * | 9/1994 | Mawhinney .............. | B62B 1/24 180/19.3 |
| 5,438,490 A | * | 8/1995 | Woodbury ............. | B60Q 1/305 340/473 |
| 5,544,022 A | * | 8/1996 | Blackard ................ | B60Q 1/305 362/431 |
| 5,727,865 A | * | 3/1998 | Caldwell ................ | B60Q 1/305 362/368 |
| 6,070,679 A | * | 6/2000 | Berg ...................... | B62B 3/1404 180/19.2 |
| 6,244,366 B1 | * | 6/2001 | Otterson ................ | B62B 3/1404 180/11 |
| 6,260,643 B1 | * | 7/2001 | Schuchardt ............. | A47F 10/04 180/14.1 |

(Continued)

FOREIGN PATENT DOCUMENTS

JP           3210118 U      4/2017

*Primary Examiner* — Jeffrey J Restifo
(74) *Attorney, Agent, or Firm* — Sughrue Mion, PLLC

(57) ABSTRACT

A handcart may include a drive wheel; a prime mover configured to rotate the drive wheel; a grip portion configured to be gripped by a user; and a visibly noticeable portion that is clearly noticeable from behind the user when the user stands behind the handcart, gripping the grip portion.

15 Claims, 64 Drawing Sheets

(56) References Cited

U.S. PATENT DOCUMENTS

| | | | | |
|---|---|---|---|---|
| 6,322,238 B1* | 11/2001 | Barr | ................... | B60Q 1/44 |
| | | | | 362/473 |
| 6,409,273 B1* | 6/2002 | Campbell | ................... | B62B 1/18 |
| | | | | 180/19.1 |
| 6,595,306 B2* | 7/2003 | Trego | ................... | B62D 51/001 |
| | | | | 180/19.2 |
| 6,880,652 B2* | 4/2005 | Holtan | ................... | B62B 3/1404 |
| | | | | 180/19.2 |
| 7,108,089 B2* | 9/2006 | Hanafusa | ................... | B62D 51/04 |
| | | | | 180/19.1 |
| 7,201,453 B2* | 4/2007 | Vandewinckel | ................... | B62D 33/02 |
| | | | | 296/10 |
| 7,395,886 B2* | 7/2008 | Berg | ................... | A47F 10/04 |
| | | | | 180/19.2 |
| 7,549,651 B2* | 6/2009 | Holtan | ................... | B62B 3/1404 |
| | | | | 180/19.1 |
| 8,033,348 B1* | 10/2011 | Parkhe | ................... | B62B 9/085 |
| | | | | 180/19.1 |
| 8,072,309 B2* | 12/2011 | Kraimer | ................... | G05D 1/0033 |
| | | | | 340/4.3 |
| 9,169,609 B2* | 10/2015 | Lambert | ................... | B60Q 1/0441 |

* cited by examiner

FIG. 41
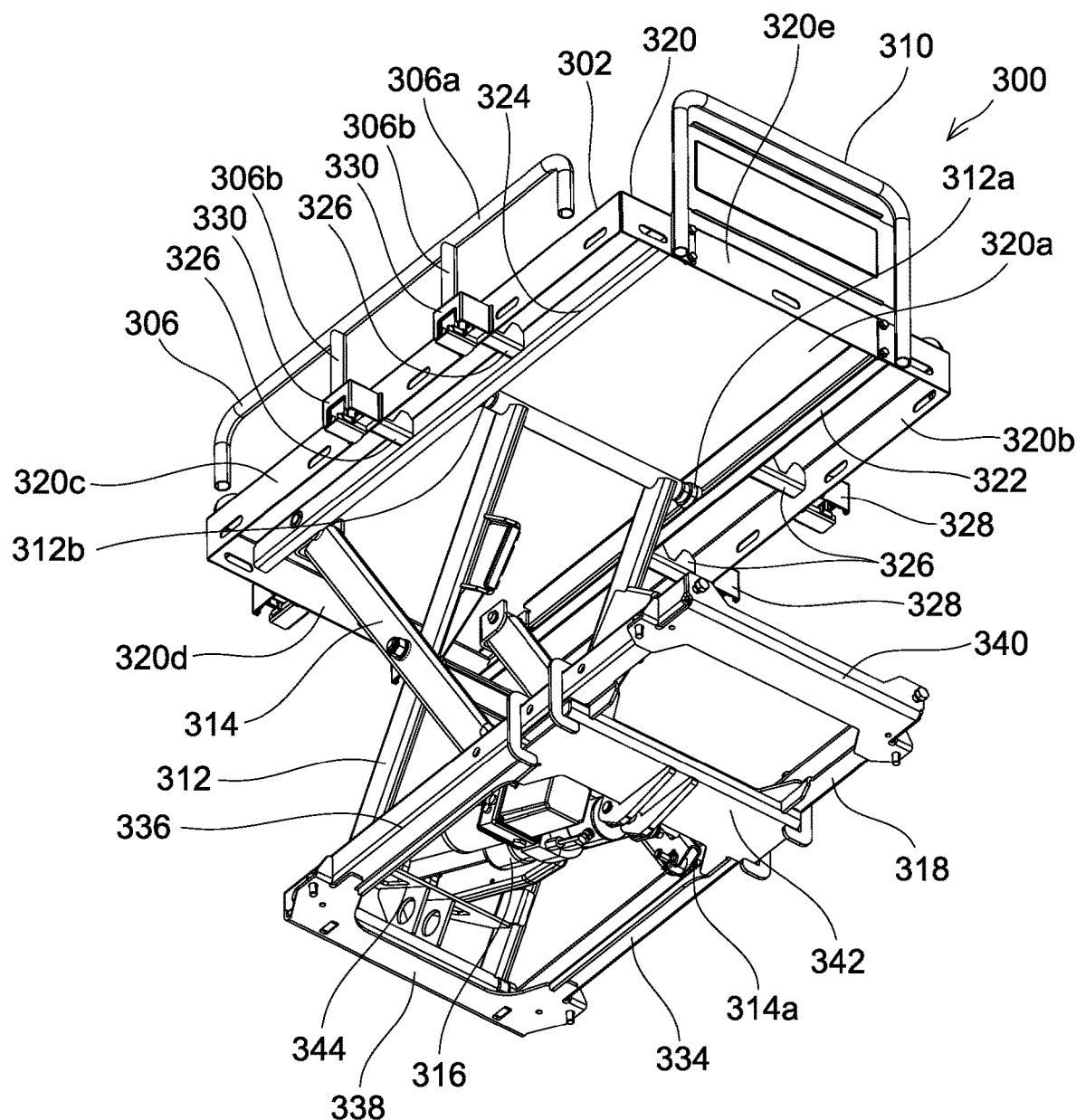
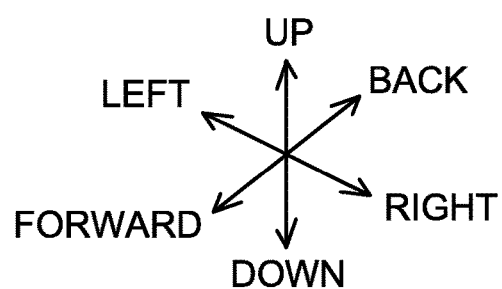

FIG. 53
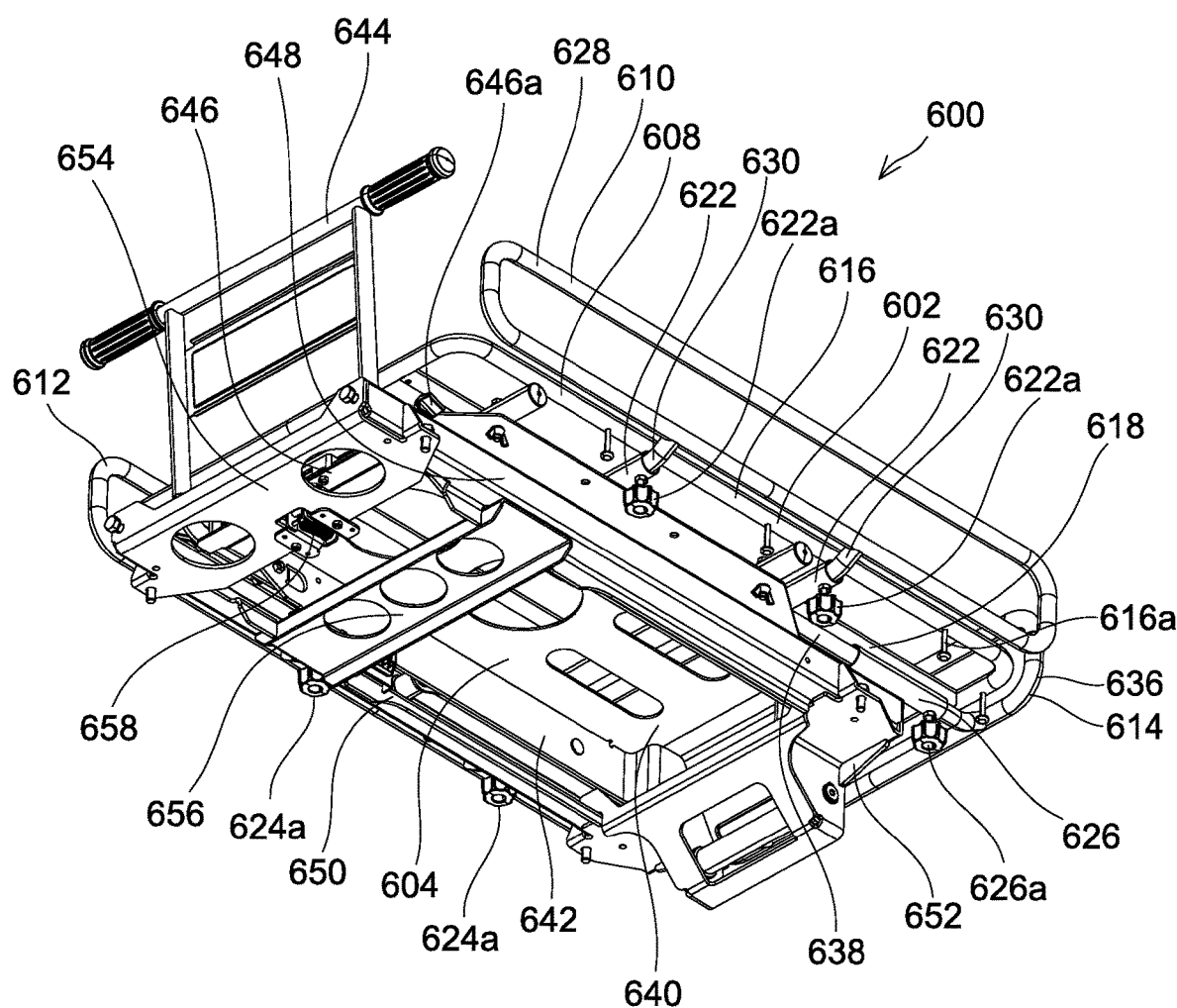
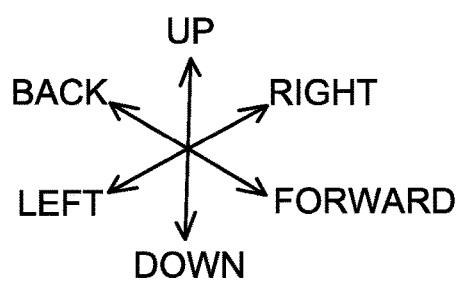

FIG. 56
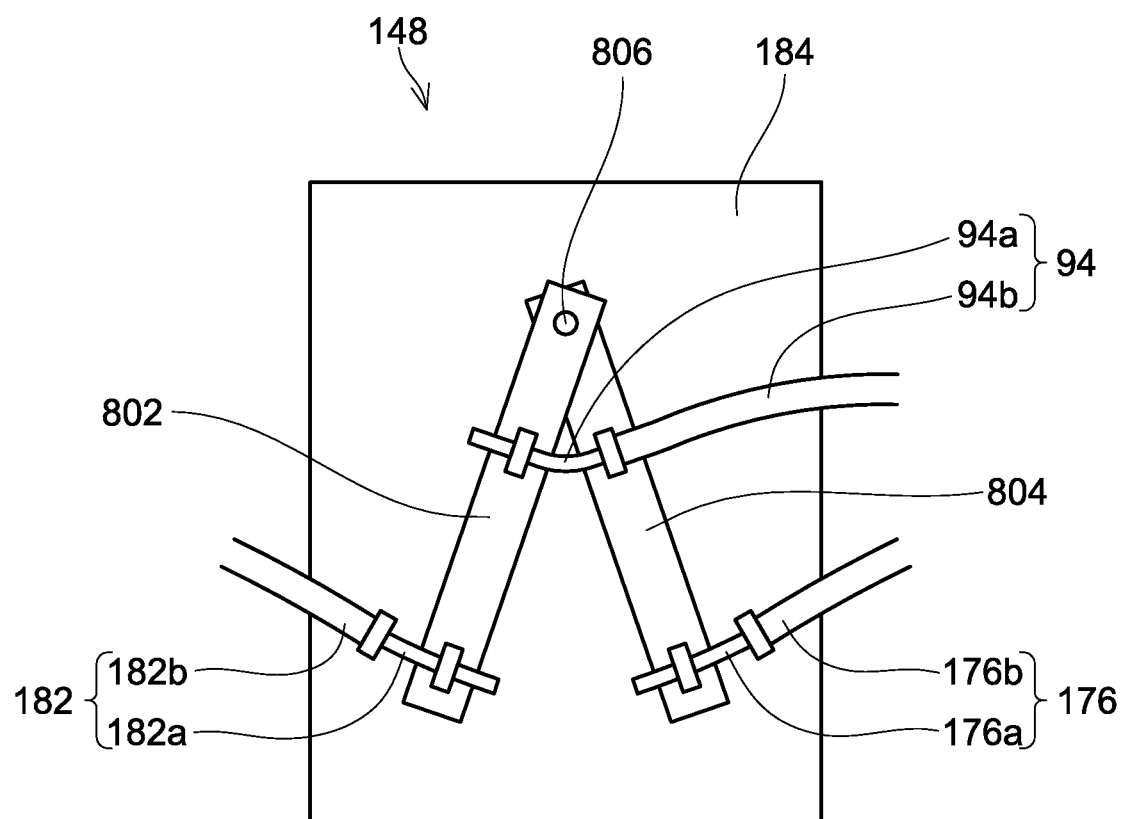
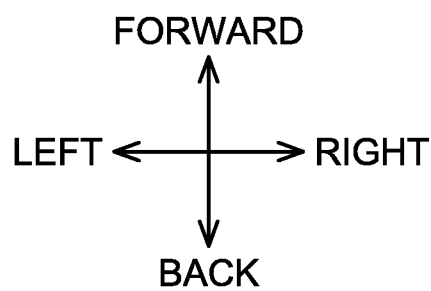

HANDCART

CROSS-REFERENCE TO RELATED APPLICATION

This application claims priority to Japanese Patent Application No. 2019-146884, filed on Aug. 8, 2019, the entire contents of which are incorporated herein by reference.

TECHNICAL FIELD

The technique disclosed herein relates to a handcart.

BACKGROUND

Japanese Utility Model Registration No. 3210118 describes a handcart. This handcart includes a drive wheel, a prime mover configured to rotate the drive wheel, and a grip portion configured to be gripped by a user.

SUMMARY

When transferring work is performed with a handcart as described above, it is desirable, in order to ensure safety, to inform a person or a car coming from behind that the transferring work is in progress with the handcart. The disclosure herein provides a technique for informing a person or a car coming from behind that transferring work is in progress with a handcart.

A handcart disclosed herein may comprise a drive wheel; a prime mover configured to rotate the drive wheel; a grip portion configured to be gripped by a user; and a visibly noticeable portion that is clearly noticeable from behind the user when the user stands behind the handcart gripping the grip portion.

In the above configuration, the visually noticeable portion can be visually noticed from behind the user even when the user stands behind the handcart, gripping the grip portion. Thus, the configuration can inform a person or a car coming from behind that transferring work is in progress with the handcart.

BRIEF DESCRIPTION OF DRAWINGS

FIG. 41 is a perspective view of the first container unit 300 according to the embodiment with the container 302 lifted, when seen from lower-rear-left side, FIG. 53 is a perspective view of the fourth container unit 600 according to the embodiment, when seen from lower-rear-right side, FIG. 56 is a top view of a brake equalizer 148 according to a variant.

DETAILED DESCRIPTION

Figure 1:
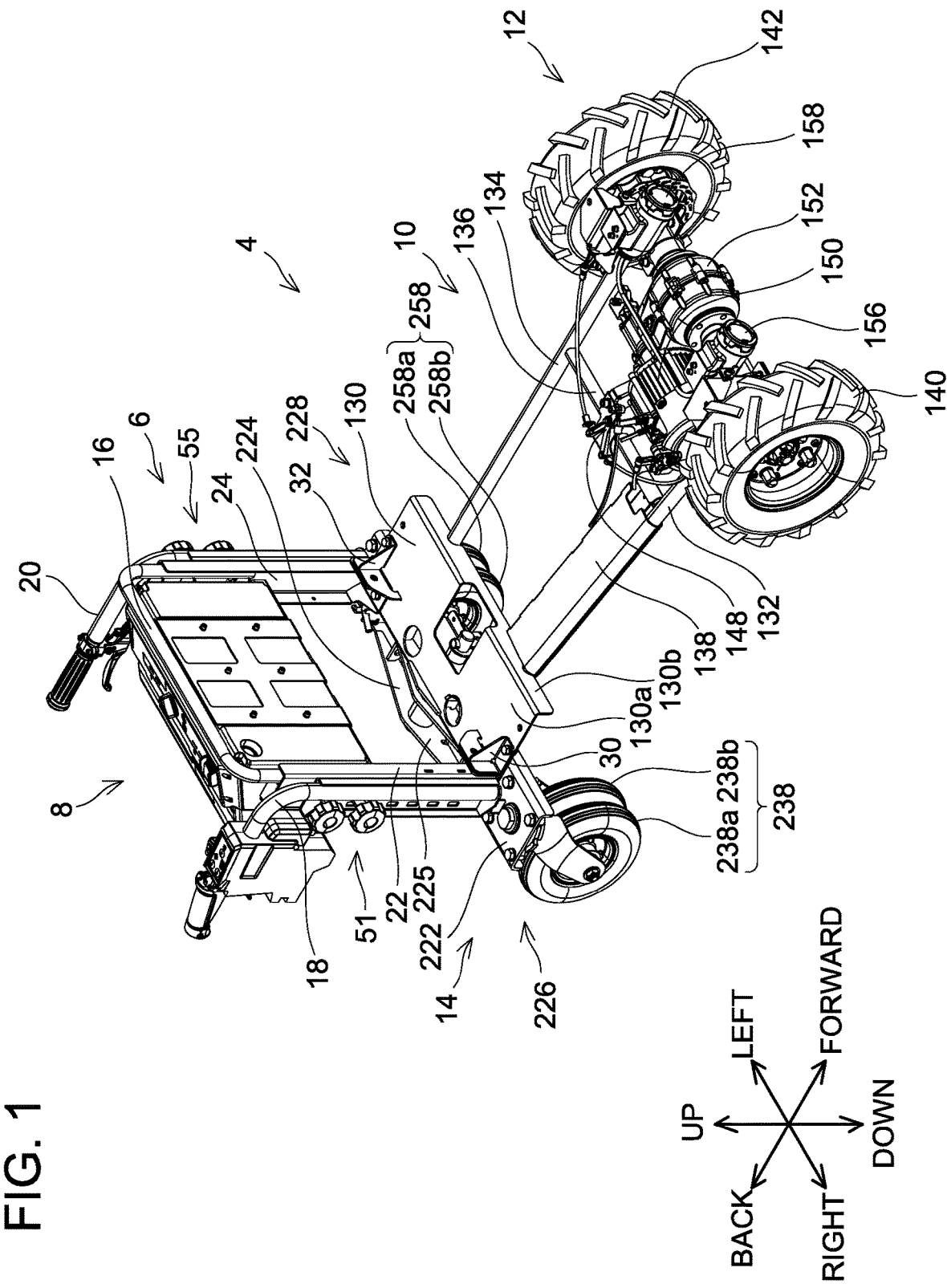
FIG. 1 is a perspective view of a chassis unit 4 according to an embodiment, when seen from upper-front-right side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved handcarts, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a handcart may comprise a drive wheel; a prime mover configured to rotate the drive wheel; a grip portion configured to be gripped by a user; and a visibly noticeable portion that is clearly noticeable from behind the user when the user stands behind the handcart, gripping the grip portion.

In this configuration, the visually noticeable portion can be visually noticed from behind the user even when the user stands behind the handcart, gripping the grip portion. Thus, the configuration can inform a person or a car coming from behind that transferring work is in progress with the handcart.

In one or more embodiments, the visibly noticeable portion may include at least one of a taillight configured to emit light and a reflector configured to receive and reflect light.

This configuration can surely inform a person or a car coming from behind that transferring work is in progress with the handcart, even when the handcart is used outdoor at night and/or in bad weather or the handcart is used indoor, for example, in a factory.

In one or more embodiments, the grip portion may include a grip extending in a front-rear direction. The visibly noticeable portion may be disposed forward of a rear end of the grip.

In this configuration, when an object collides with the handcart from behind it, the object collides with the rear end of the grip before reaching the visibly noticeable portion. Thus, damage to the visibly noticeable portion can be prevented.

In one or more embodiments, the handcart may further comprise a casing disposed near the grip and an operation member supported by the casing and configured to be operable by the user with the user gripping the grip. The prime mover may be configured to rotate the drive wheel when the operation member is operated by the user.

This configuration enables the user to perform an operation for driving the prime mover while the user grips the grip, thus it improves convenience for the user.

In one or more embodiments, the visibly noticeable portion may be disposed on a rear surface of the casing.

This configuration can simplify the configuration of the handcart as compared to a configuration in which the visibly noticeable portion is disposed separately from the casing which supports the operation member.

In one or more embodiments, the handcart may further comprise an alarm sound button supported by the casing and configured to be operable by the user with the user gripping the grip; and an alarm sound emitter configured to emit an alarm sound when the alarm sound button is operated by the user.

This configuration can inform a person or a car that is present in other directions than behind the handcart that transferring work is in progress with the handcart, by emitting the alarm sound from the alarm sound emitter. Further, the configuration enables the user to perform an operation for emitting the alarm sound from the alarm sound emitter while the user grips the grip, thus it can improve the user's convenience.

In one or more embodiments, the prime mover may include a motor.

This configuration can suppress vibrations transmitted to a load on the handcart as compared to a configuration in which an engine is used as the prime mover.

In one or more embodiments, the handcart may further comprise a battery mounting portion to which a battery is detachably attached. The motor may be driven by electric power from the battery.

This configuration enables the motor to be supplied with the electric power, without connecting the handcart with an external power supply via a power cord.

EMBODIMENTS

A cart 2 of the present embodiment is a hand cart. The cart 2 is configured by a chassis unit 4 shown in FIG. 1 being removably attached to one of a first container unit 300 shown in FIG. 39, a second container unit 400 shown in FIG. 45, a third container unit 500 shown in FIG. 49, a fourth container unit 600 shown in FIG. 52, and a fifth container unit 700 shown in FIG. 54. In another embodiment, the cart 2 may be configured by the chassis unit 4 being unremovably attached to one of the first container unit 300, the second container unit 400, the third container unit 500, the fourth container unit 600, and the fifth container unit 700. In the following description, one of the container units, among the first container unit 300, the second container unit 400, the third container unit 500, the fourth container unit 600, and the fifth container unit 700, that is attached to the chassis unit 4 may be simply referred to as a container unit 800.

(Chassis Unit 4)

As shown in FIG. 1, the chassis unit 4 includes a handle unit 6, a battery box 8, a chassis frame 10, a front wheel unit 12, and a rear wheel unit 14.

(Handle Unit 6)

Figure 2:
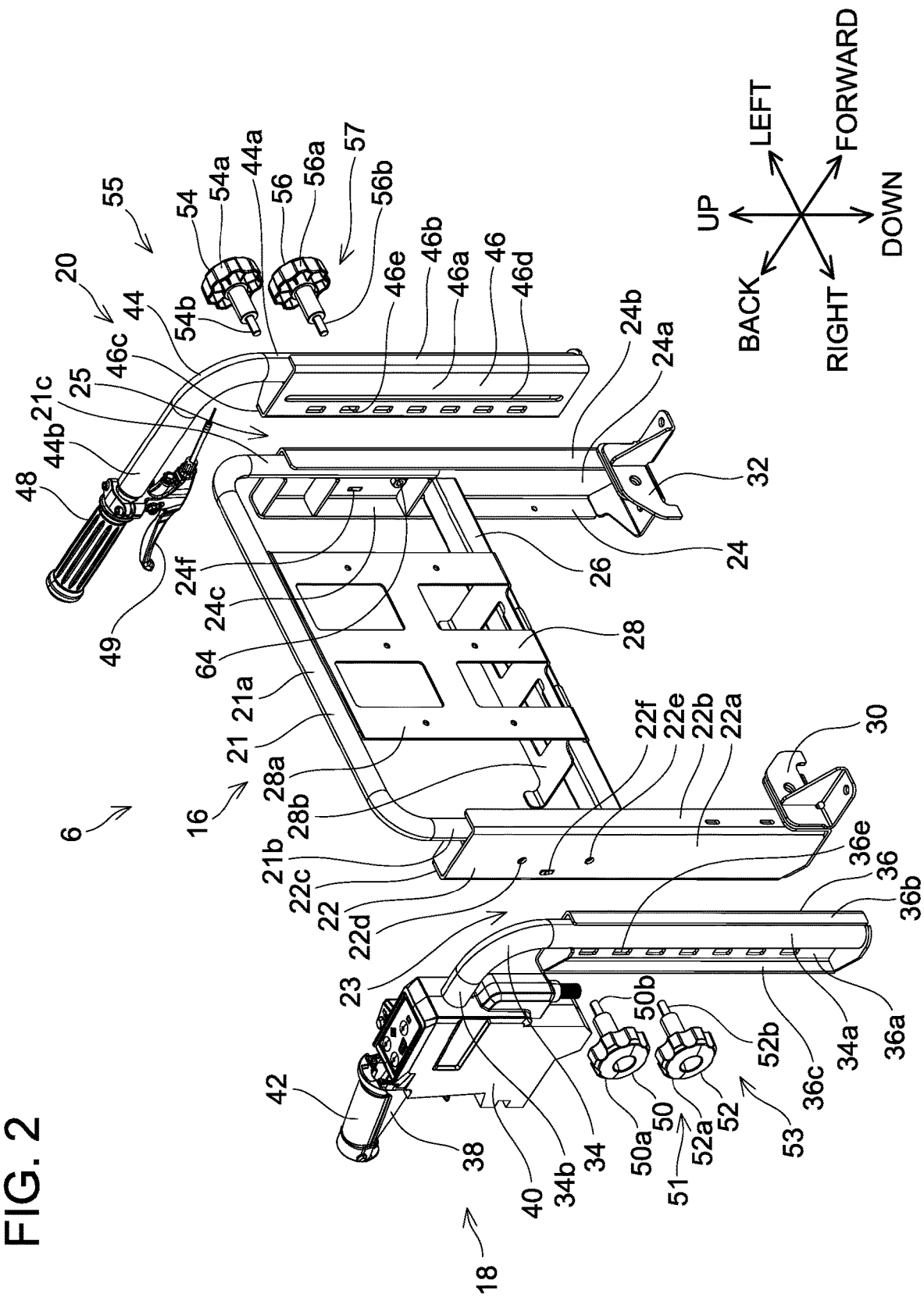
FIG. 2 is an exploded perspective view of a handle unit 6 according to the embodiment.

As shown in FIG. 2, the handle unit 6 includes a handle base 16, a right handle 18, and a left handle 20. The handle base 16 includes a base pipe 21, a right channel 22, a left channel 24, a rectangular pipe 26, a base plate 28, a right attachment 30, and a left attachment 32. All of the base pipe 21, the right channel 22, the left channel 24, the rectangular pipe 26, the base plate 28, the right attachment 30, and the left attachment 32 are constituted of a steel material. A cross-sectional shape of the base pipe 21 is substantially circular. The base pipe 21 includes a central portion 21a extending in a right-left direction, a right support portion 21b bent downward from a right end of the central portion 21a, and a left support portion 21c bent downward from a left end of the central portion 21a. The right channel 22 includes a web 22a extending along a front-rear direction and an up-down direction, a front flange 22b bent leftward from a front end of the web 22a, and a rear flange 22c bent leftward from a rear end of the web 22a. The right support portion 21b of the base pipe 21 is welded to an upper portion of the right channel 22 on the left side thereof. The left channel 24 includes a web 24a extending along the front-rear direction and the up-down direction, a front flange 24b bent rightward from a front end of the web 24a, and a rear flange 24c bent rightward from a rear end of the web 24a. The left support portion 21c of the base pipe 21 is welded to an upper portion of the left channel 24 on the right side thereof. The rectangular pipe 26 extends in the right-left direction. A right end of the rectangular pipe 26 is welded to the vicinity of a center of the right channel 22 in the up-down direction on the left side thereof. A left end of the rectangular pipe 26 is welded to the vicinity of a center of the left channel 24 in the up-down direction on the right side thereof. The base plate 28 includes a wall 28a extending along the up-down direction and the right-left direction, and a floor 28b bent rearward from a lower end of the wall 28a. An upper end of the wall 28a is welded to a lower surface of the central portion 21a of the base pipe 21. A lower surface of the floor 28b is welded to an upper surface of the rectangular pipe 26. The right attachment 30 is welded to a lower end of the right channel 22. The left attachment 32 is welded to a lower end of the left channel 24. As shown in FIG. 1, the handle base 16 is fixed to the chassis frame 10 by the right attachment 30 being screwed to a frame plate 130 of the chassis frame 10 and the left attachment 32 being screwed to the frame plate 130 of the chassis frame 10.

As shown in FIG. 2, the right handle 18 includes a pipe 34, a channel 36, a grip 38, a switch box 40, and a dead man's lever 42. The pipe 34 and the channel 36 are both constituted of a steel material. The pipe 34 includes a support portion 34a extending in the up-down direction, and a handle portion 34b bent rearward from an upper end of the support portion 34a. The channel 36 includes a web 36a extending along the front-rear direction and the up-down direction, a front flange 36b bent rightward from a front end of the web 36a, and a rear flange 36c bent rightward from a rear end of the web 36a. The pipe 34 is welded to the channel 36 on the right side of the channel 36. The grip 38, the switch box 40 and the dead man's lever 42 are attached to the handle portion 34b of the pipe 34.

The left handle 20 includes a pipe 44, a channel 46, a grip 48, and a brake lever 49. The pipe 44 and the channel 46 are both constituted of a steel material. The pipe 44 includes a support portion 44a extending in the up-down direction, and a handle portion 44b bent rearward from an upper end of the support portion 44a. The channel 46 includes a web 46a extending along the front-rear direction and the up-down direction, a front flange 46b bent leftward from a front end of the web 46a, and a rear flange 46c bent leftward from a rear end of the web 46a. The pipe 44 is welded to the channel 46 on the left side of the channel 46. The grip 48 and the brake lever 49 are attached to the handle portion 44b of the pipe 44.

Figure 3:
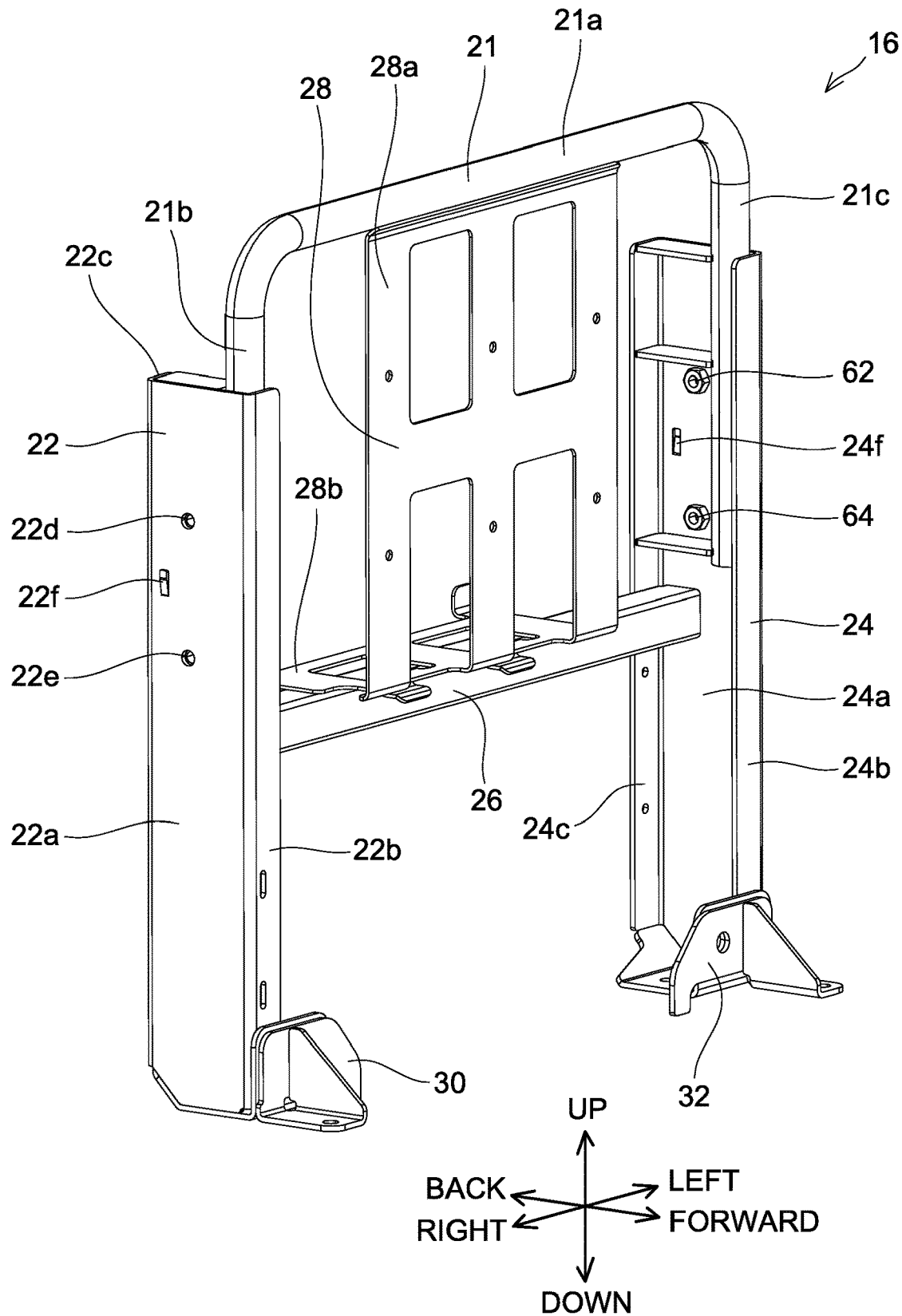
FIG. 3 is a perspective view of a handle base 16 according to the embodiment, when seen from upper-front-right side.
Figure 4:
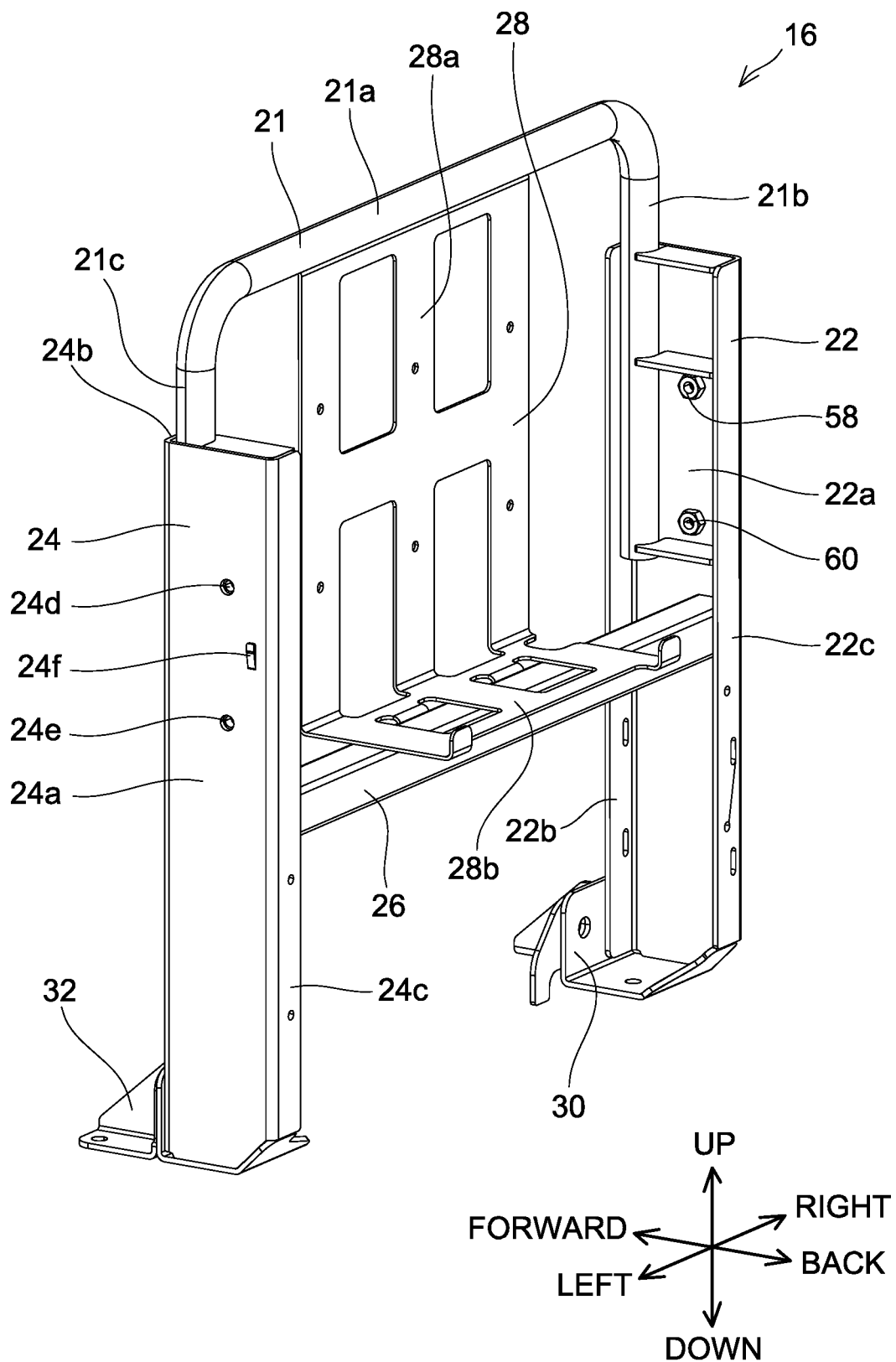
FIG. 4 is a perspective view of the handle base 16 according to the embodiment, when seen from upper-rear-left side.
Figure 5:
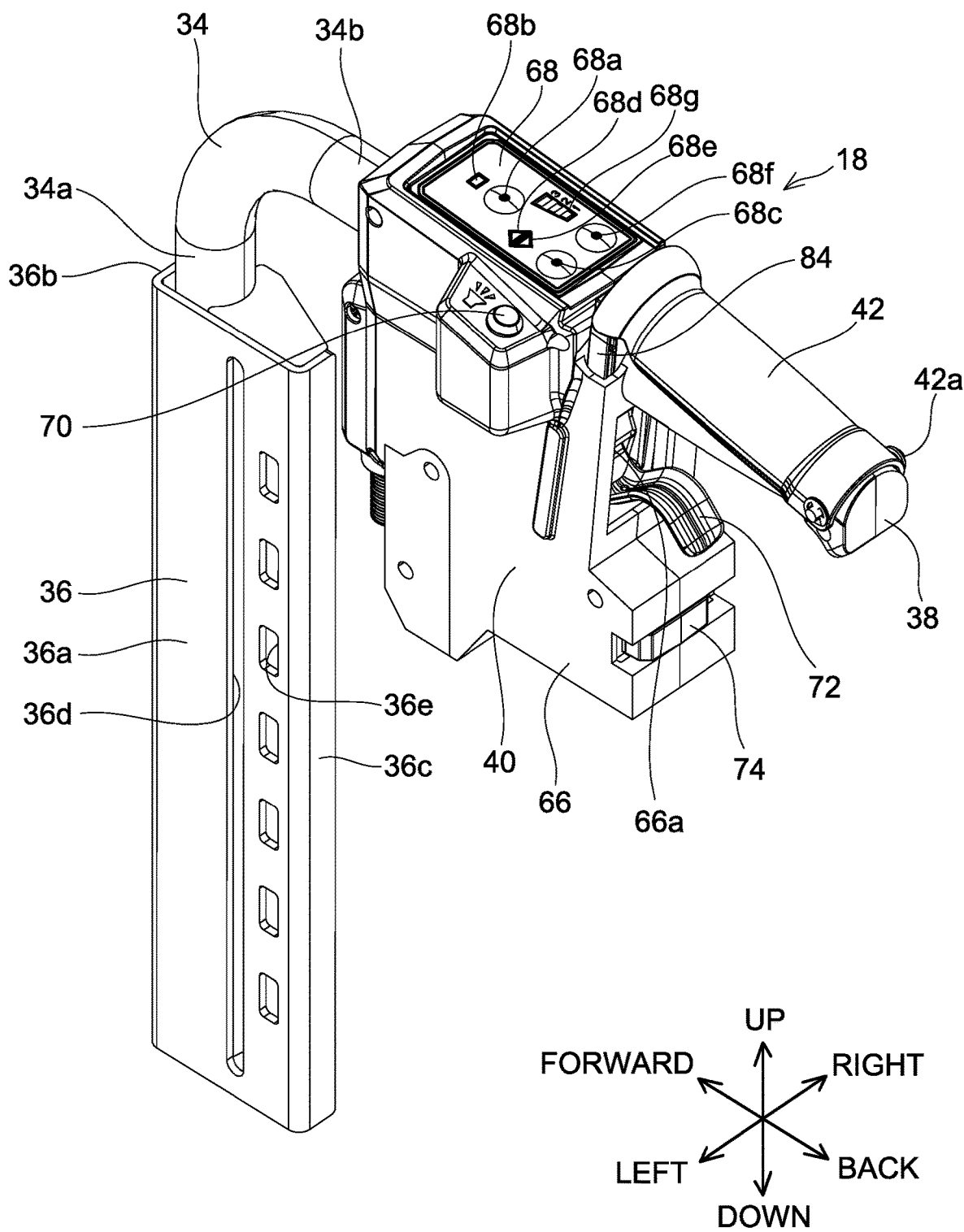
FIG. 5 is a perspective view of a right handle 18 according to the embodiment, when seen from upper-rear-left side.
Figure 6:
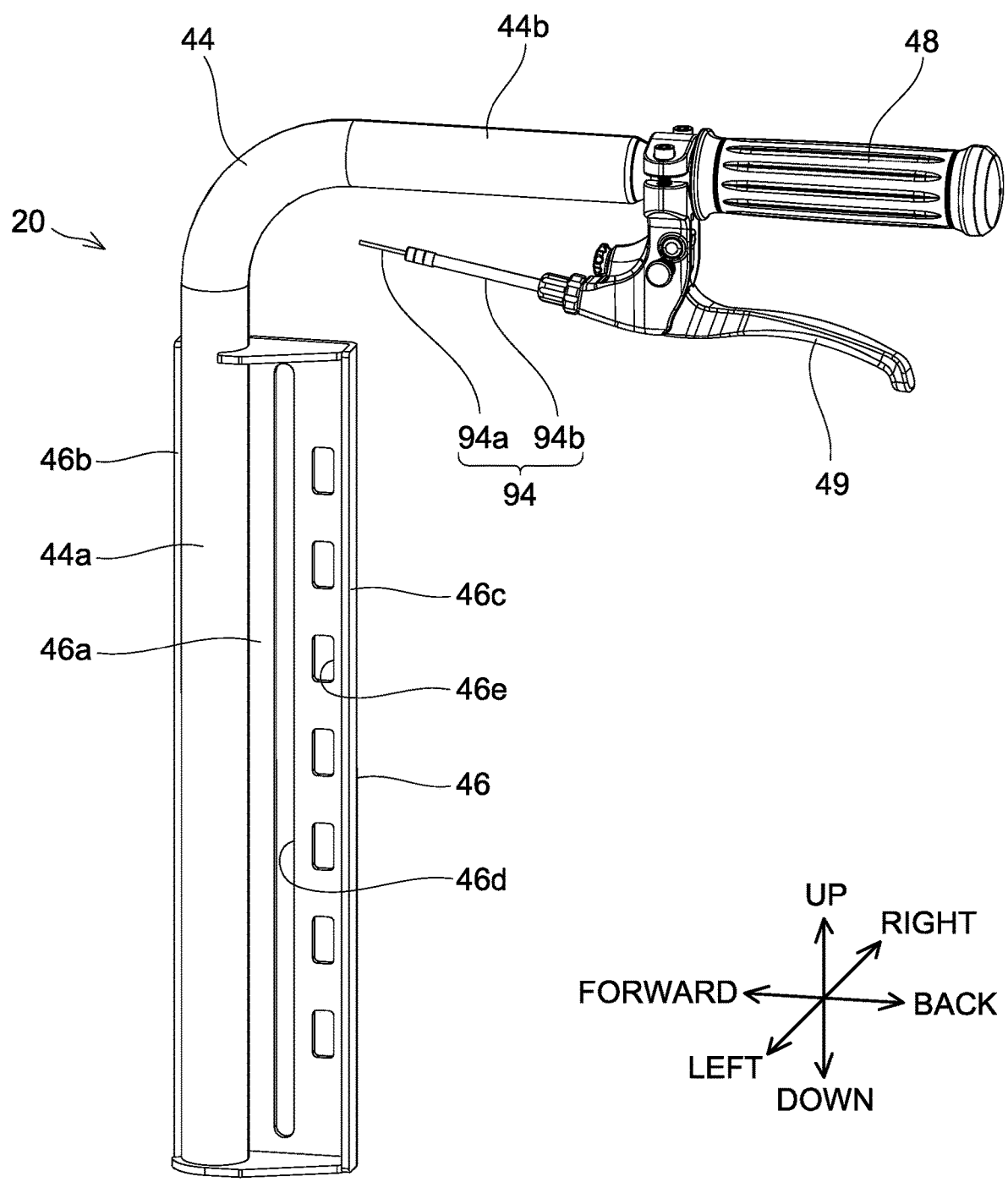
FIG. 6 is a perspective view of a left handle 20 according to the embodiment, when seen from upper-rear-left side.

The right handle 18 is fixed to the handle base 16 via grip bolts 50 and 52. The left handle 20 is fixed to the handle base 16 via grip bolts 54 and 56. The grip bolts 50, 52, 54, and 56 respectively include heads 50a, 52a, 54a, and 56a, and shafts 50b, 52b, 54b, and 56b. As shown in FIG. 3, through holes 22d and 22e are formed in the web 22a of the right channel 22 of the handle base 16 such that the holes are arranged along the up-down direction. As shown in FIG. 4, nuts 58 and 60 are welded on a left surface of the web 22a of the right channel 22 at positions corresponding to the through holes 22d and 22e. Similarly, through holes 24d and 24e are formed in the web 24a of the left channel 24 of the handle base 16 such that the through holes are arranged along the up-down direction. As shown in FIG. 3, nuts 62 and 64 are welded on a right surface of the web 24a of the left channel 24 at positions corresponding to the through holes 24d and 24e. As shown in FIG. 5, an elongated hole 36d extending in the up-down direction is formed in the web 36a of the channel 36 of the right handle 18. As shown in FIG. 6, an elongated hole 46d extending in the up-down direction is formed in the web 46a of the channel 46 of the left handle 20.

As shown in FIG. 2, to fix the right handle 18 to the handle base 16, the shaft 50b of the grip bolt 50 is inserted through the elongated hole 36d of the right handle 18 and the through hole 22d of the handle base 16 and then is screwed into the nut 58, and the shaft 52b of the grip bolt 52 is also inserted through the elongated hole 36d of the right handle 18 and the through hole 22e of the handle base 16 and then is screwed into the nut 60. As a result, the channel 36 of the right handle 18 and the right channel 22 of the handle base 16 are held between the nuts 58, 60 and the heads 50a, 52a of the grip bolts 50, 52, with a left surface of the web 36a of the channel 36 of the right handle 18 being in contact with a right surface of the web 22a of the right channel 22 of the handle base 16. The right handle 18 is fixed to the handle base 16 as above. In the following description, the grip bolts 50, 52 and the nuts 58, 60 may be collectively referred to as a right holder mechanism 51. Further, the grip bolt 52 and the nut 60 may be referred to as a right rotation restricting mechanism 53. The right rotation restricting mechanism 53 is configured to restrict rotation of the right handle 18 relative to the handle base 16 about the grip bolt 50 as a rotation axis.

Similarly, to fix the left handle 20 to the handle base 16, the shaft 54b of the grip bolt 54 is inserted through the elongated hole 46d of the left handle 20 and the through hole 244 of the handle base 16 and then is screwed into the nut 62, and the shaft 56b of the grip bolt 56 is also inserted through the elongated hole 46d of the left handle 20 and the through hole 24e of the handle base 16 and then is screwed into the nut 64. As a result, the channel 46 of the left handle 20 and the left channel 24 of the handle base 16 are held between the nuts 62, 64 and the heads 54a, 56a of the grip bolts 54 and 56, with a right surface of the web 46a of the channel 46 of the left handle 20 being in contact with a left surface of the web 24a of the left channel 24 of the handle base 16. The left handle 20 is fixed to the handle base 16 as above. In the following description, the grip bolts 54, 56 and the nuts 62, 64 may be collectively referred to as a left holder mechanism 55. Further, the grip bolt 56 and the nut 64 may be referred to as a left rotation restricting mechanism 57. The left rotation restricting mechanism 57 is configured to restrict rotation of the left handle 20 relative to the handle base 16 about the grip bolt 54 as a rotation axis.

The right handle 18 is configured to be movable in the up-down direction relative to the handle base 16, with the grip bolts 50 and 52 loosened. Setting the right handle 18 to a desired position in the up-down direction relative to the handle base 16 and then tightening the grip bolts 50, 52 enables the right handle 18 to be fixed at the desired position relative to the handle base 16. Similarly, the left handle 20 is configured to be movable relative to the handle base 16, with the grip bolts 54, 56 loosened. Setting the left handle 20 to a desired position in the up-down direction relative, to the handle base 16 and then tightening the grip bolts 54, 56 enables the left handle 20 to be fixed at the desired position relative to the handle base 16. If the right handle 18 is integrated with the left handle 20 and a position of the integrated handle is adjusted in the up-down direction relative to the handle base 16, a large amount of labor is required for the positional adjustment in the up-down direction relative to the handle base 16 because the weight of the integration of the right handle 18 and the left handle 20 is large. Contrary to this, in the cart 2 of the present embodiment, the right handle 18 and the left handle 20 are separate components, and their positions in the up-down direction relative to the handle base 16 can be adjusted individually. This arrangement can reduce an amount of labor required for the positional adjustment in the up-down direction relative to the handle base 16 because the individual weights of the right handle 18 and the left handle 20 are not so large.

Figure 7:
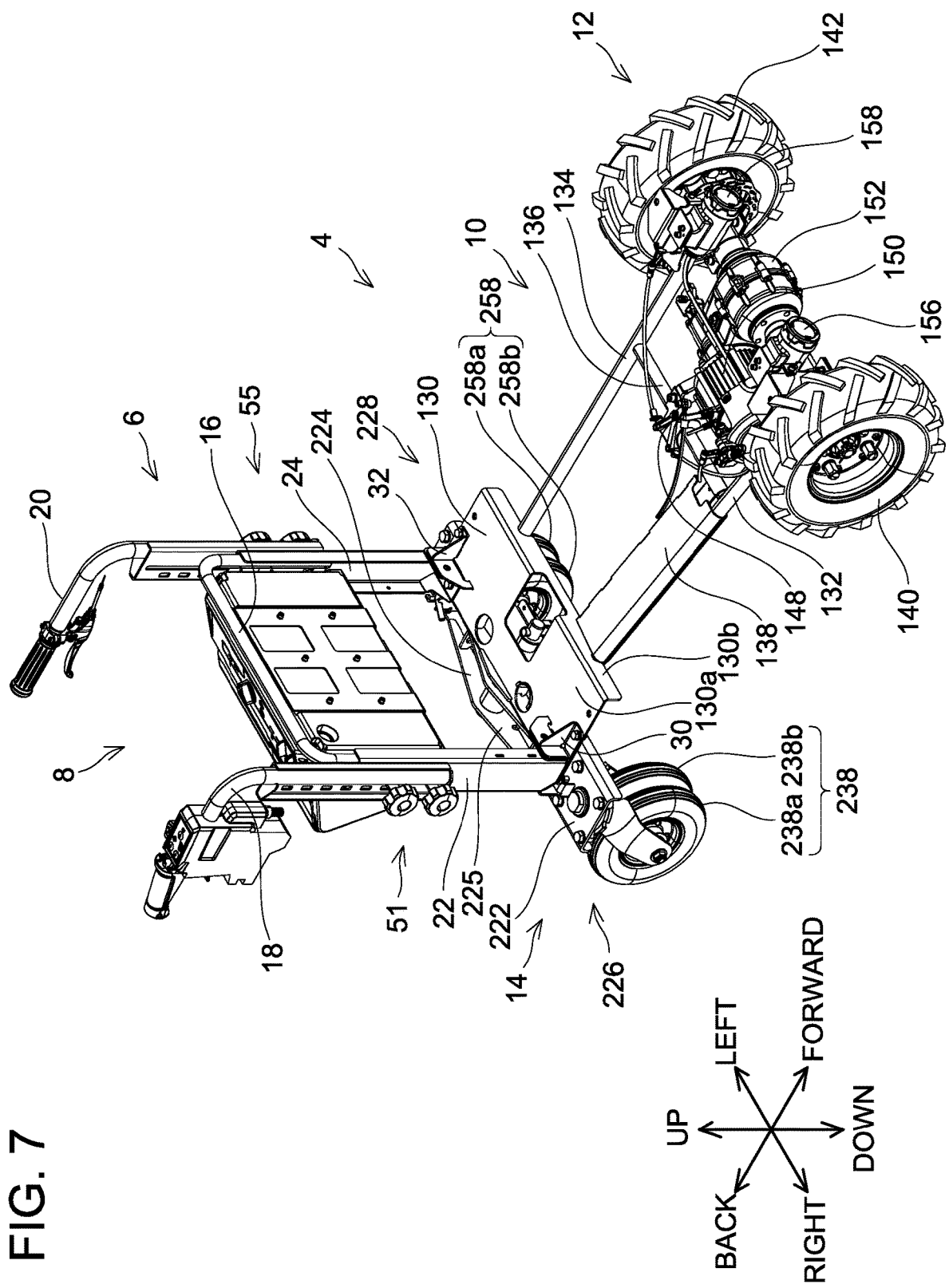
FIG. 7 is a perspective view of the chassis unit 4 with the right handle 18 and the left handle 20 fixed at a highest position, when seen from upper-front-right side.

As shown in FIG. 3, an elastic engagement piece 22f that protrudes rightward is disposed on the web 22a of the right channel 22 of the handle base 16. As shown in FIG. 4, an elastic engagement piece 24f that protrudes leftward is disposed on the web 24a of the left channel 24 of the handle base 16. A position of the elastic engagement piece 22f of the right channel 22 and a position of the elastic engagement piece 24f of the left channel 24 are substantially the same in the up-down direction. As shown in FIG. 5, a plurality of engagement holes 36e is formed in the web 36a of the channel 36 of the right handle 18, corresponding to the elastic engagement piece 22f of the right channel 22. The engagement holes 36e are arranged at predetermined intervals along the up-down direction. As shown in FIG. 6, a plurality of engagement holes 46e is formed in the web 46a of the channel 46 of the left handle 20, corresponding to the elastic engagement piece 24f of the left channel 24. The engagement holes 46e are arranged at predetermined intervals along the up-down direction. Positions of the engagement holes 36e of the right handle 18 and positions of the corresponding engagement holes 46e of the left handle 20 are substantially the same in the up-down direction. The right handle 18 can be fixed to the handle base 16, with the elastic engagement piece 22f inserted in one of the engagement holes 36e. Similarly, the left handle 20 can be fixed to the handle base 16, with the elastic engagement piece 24f inserted in one of the engagement holes 46e. Inserting the elastic engagement piece 22f to one of the engagement holes 36e and inserting the elastic engagement piece 24f to the corresponding one of the engagement holes 46e enables the right handle 18 and the left handle 20 to be fixed to the handle base 16 at the substantially same position in the up-down direction. For example, both the right handle 18 and the left handle 20 can be fixed at a lowest position relative to the handle base 16 as shown in FIG. 1 by fixing the right handle 18 to the handle base 16 with the elastic engagement piece 22f inserted in the uppermost one of the engagement holes 36e and fixing the left handle 20 to the handle base 16 with the elastic engagement piece 24f inserted in the uppermost one of the engagement holes 46e. Alternatively, both the right handle 18 and the left handle 20 can be fixed at a highest position relative to the handle base 16 as shown in FIG. 7 by fixing the right handle 18 to the handle base 16 with the elastic engagement piece 22f inserted in the lowermost one of the engagement holes 36e and fixing the left handle 20 to the handle base 16 with the elastic engagement piece 24f inserted in the lowermost one of the engagement holes 46e. Hereinafter, the elastic engagement piece 22f and the plurality of engagement holes 36e may be collectively referred to as a right positioning mechanism 23, and the elastic engagement piece 24f and the plurality of engagement holes 46e may be collectively referred to as a left positioning mechanism 25.

The right handle 18 can also be fixed to the handle base 16 by tightening the grip bolts 50 and 52 with the elastic engagement piece 22f not inserted in any of the engagement holes 36e. In this case, the elastic engagement piece 22f is pressed by the web 36a of the channel 36 and is maintained in a leftward elastically deformed state. Similarly, the left handle 20 can also be fixed to the handle base 16 by tightening the grip bolts 54 and 56 with the elastic engagement piece 24f not inserted in any of the engagement holes 46e, In this case, the elastic engagement piece 24f is pressed by the web 46a of the channel 46 and is maintained in a rightward elastically deformed state.

In another embodiment, the handle portion 34b of the right handle 18 may be bent rightward or leftward from the upper end of the support portion 34a, and the handle portion 44b of the left handle 20 may be bent rightward or leftward from the upper end of the support portion 44a. In yet another embodiment, the right handle 18 and the left handle 20 may be integrated, such as a U-shaped handle.

(Right Handle 18)

As shown in FIG. 5, in the right handle 18, the switch box 40 is disposed frontward of the grip 38. Further, the dead man's lever 42 is disposed above the grip 38.

Figure 8:
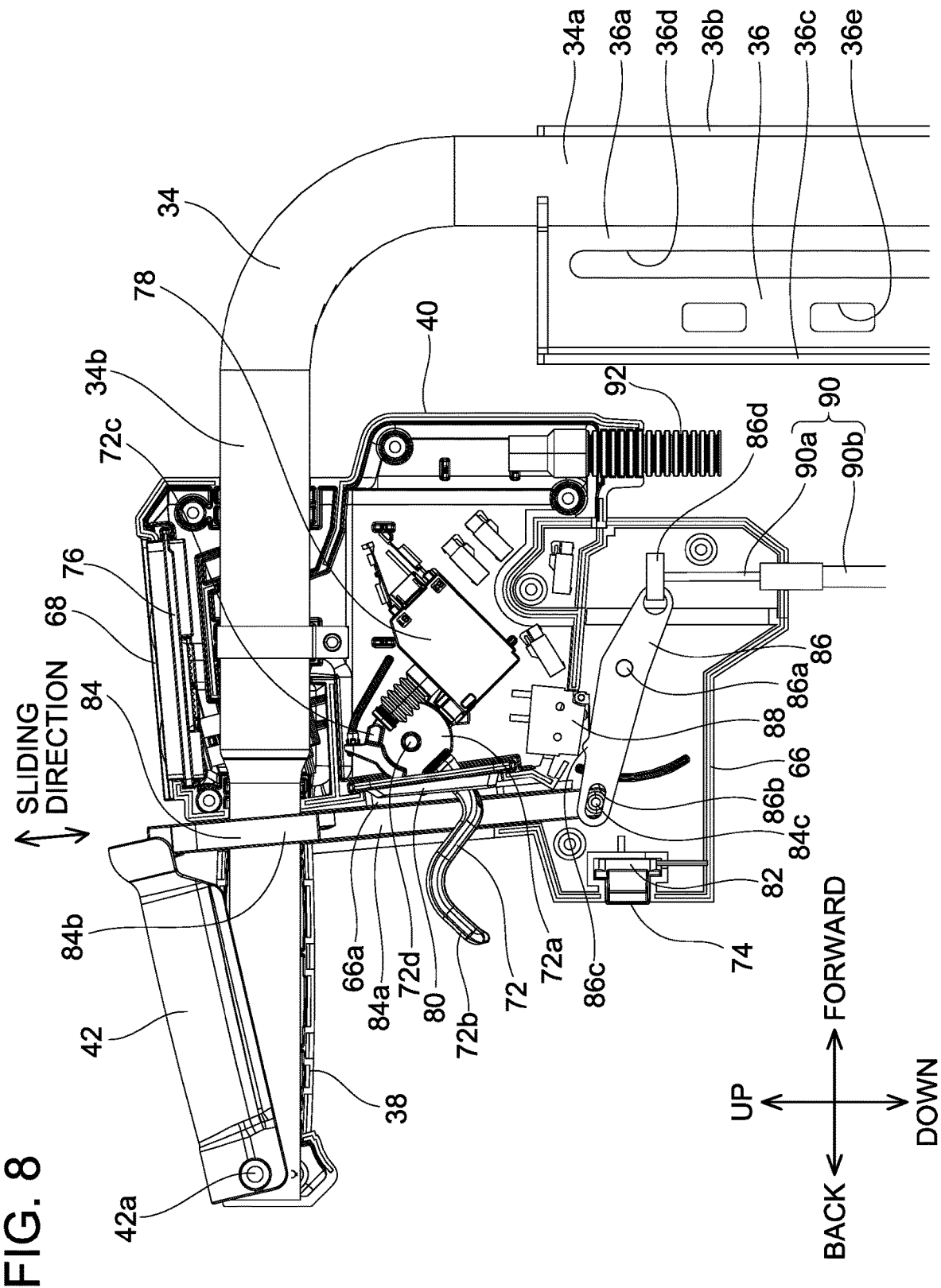
FIG. 8 is a right side view of an internal structure of a switch box 40 according to the embodiment.

The switch box 40 includes a casing 66, an operation panel 68, an alarm sound button 70, an operation lever 72, and a taillight 74. The casing 66 is a resin member. The operation panel 68 is disposed on an upper surface of the casing 66. The operation panel 68 includes a main power button 68a, a main power indicator lamp 68b, a forward/backward mode switching button 68c, a forward mode indicator lamp 68d, a backward mode indicator lamp 68e, a speed switching button 68f, and a speed indicator 68g. The main power button 68a is a button for the user to switch on and off of a main power of the cart 2. The main power indicator lamp 68b turns on when the main power of the cart 2 is turned on, and turns off when the main power of the cart 2 is turned off. The forward/backward mode switching button 68c is a button for the user to switch a forward mode and a backward mode of the cart 2. In the forward mode, the cart 2 actuates a motor 150 (which will be described later, see FIG. 1) to rotate a right front wheel 140 and a left front wheel 142 (which will be described later, see FIG. 1) in a forward direction, while in the backward mode, the cart 2 actuates the motor 150 to rotate the right front wheel 140 and the left front wheel 142 in the reverse direction. The forward mode indicator lamp 68d turns on when the cart 2 operates in the forward mode, and turns off when the cart 2 operates in the backward mode. The backward mode indicator lamp 68e turns on when the cart 2 operates in the backward mode, and turns off when the cart 2 operates in the forward mode. The speed switching button 68f is a button for the user to switch a traveling speed of the cart 2. In the cart 2 of the present embodiment, the traveling speed can be switched in multiple levels (e.g., in three levels). The cart 2 controls a rotational speed of the motor 150 when actuating the motor 150 in accordance with the traveling speed set by the speed switching button 68f. The speed indicator 68g changes the number of lit windows according to the traveling speed of the cart 2 set by the speed switching button 68f. As shown in FIG. 8, an operation board 76 is disposed inside the casing 66 and below the operation panel 68. The operation board 76 includes switches (not shown) configured to detect user's operations on the main power button 68a, the forward/backward mode switching button 68c, and the speed switching button 68f, LEDs (not shown) configured to turn on/turn off the main power indicator lamp 68b, the forward mode indicator lamp 68d, the backward mode indicator lamp 68e, and the speed indicator 68g, and the like.

As shown in FIG. 5, the alarm sound button 70 is disposed on a side surface of the casing 66 and leftward of the operation panel 68. The alarm sound button 70 is a button for the user to activate a buzzer 124 (which will be described later, see FIG. 13). When the user operates the alarm sound button 70, the cart 2 activates the buzzer 124 to cause it to emit an alarming sound. If the cart 2 includes a speaker (not shown) other than the buzzer 124, the cart 2 may be configured to output a predetermined music or sound from the speaker in response to the user's operation on the alarm sound button 70.

Figure 9:
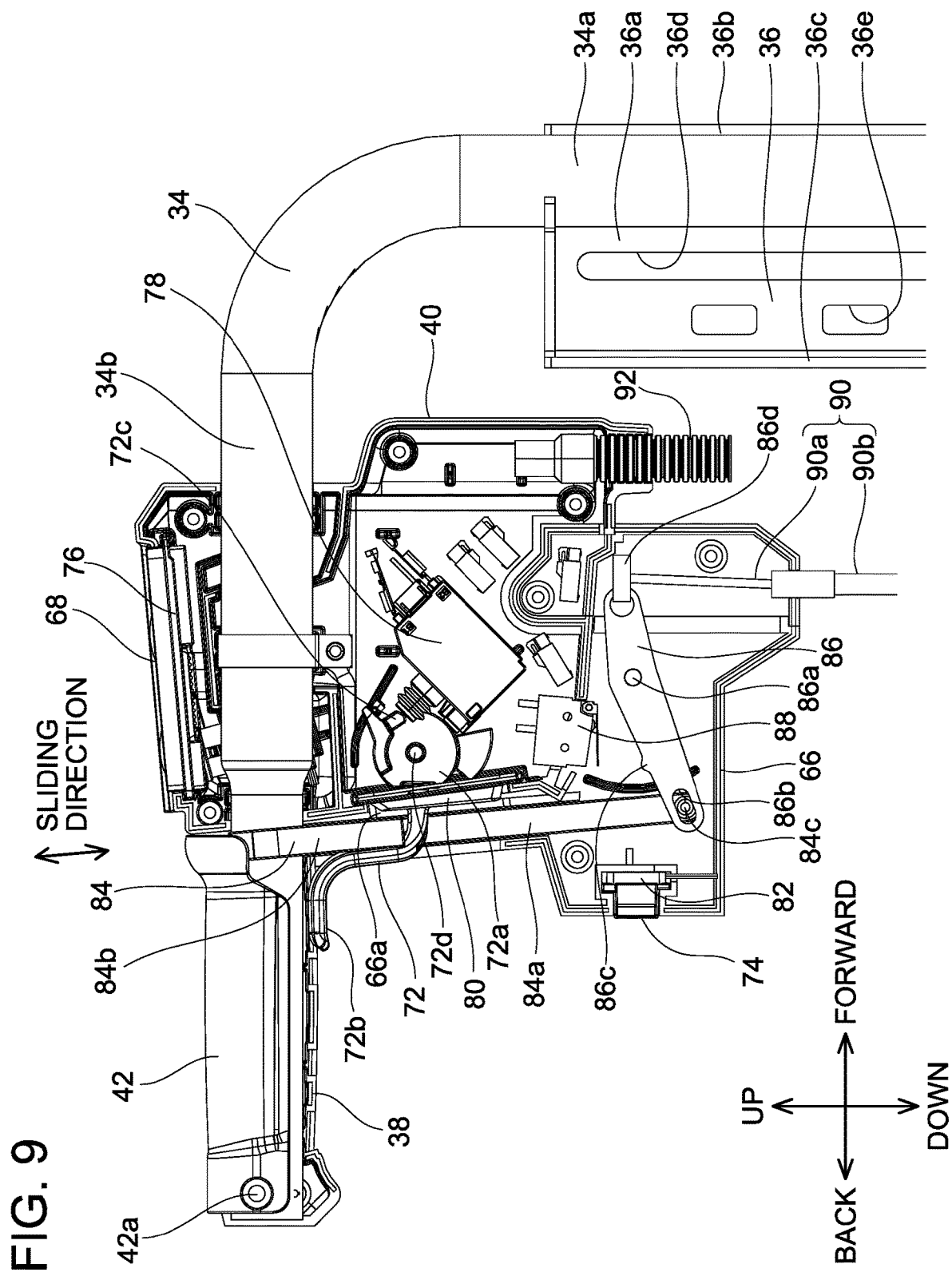
FIG. 9 is a right side view of the internal structure of the switch box 40 according to the embodiment, with a dead man's lever 42 pushed downward and an operation lever 72 pushed upward.

The operation lever 72 is a resin member. As shown in FIG. 8, the operation lever 72 includes a support portion 72a, an operation piece 72b, and a detection piece 72c. The support portion 72a, the operation piece 72b, and the detection piece 72c are integrated with each other. The support portion 72a and the detection piece 72c are housed in the casing 66. The operation piece 72b protrudes from the inside of the casing 66 to the outside thereof through an opening 66a formed in a rear surface of the casing 66. The support portion 72a is pivotably supported with respect to the casing 66 around a pivot axis 72d extending in the right-left direction. An actuation switch 78 is housed in the casing 66 near the detection piece 72c. When the operation piece 72b is pushed upward by the user, the operation piece 72b, the support portion 72a, and the detection piece 72c are thereby integrally pivoted about the pivot axis 72d, and the actuation switch 78 is pressed by the detection piece 72c as shown in FIG. 9. The casing 66 also houses a compression spring (not shown) configured to apply a torque in a direction along which the operation piece 72b moves downward to the operation lever 72. When the user releases the hand from the operation piece 72b, the operation piece 72b, the support portion 72a, and the detection piece 72c are integrally pivoted about the pivot axis 72d by the biasing force of the compression spring, and the detection piece 72c is separated from the actuation switch 78 as Shown in FIG. 8. Around the operation piece 72b, the opening 66a of the casing 66 is covered by a bellows cover 80. The bellows cover 80 prevents foreign matter from entering the inside of the casing 66 from the outside thereof through the opening 66a.

The operation panel 68 is located on the upper surface of the casing 66. The alarm sound button 70 is located on a side surface of the casing 66. Further, the operation lever 72 is located rearward of the casing 66. This arrangement enables the user to operate the operation panel 68, the alarm sound button 70, and the operation lever 72 by his/her fingers of the right hand while gripping the grip 38 with the right hand.

The taillight 74 is disposed on a rear surface of the casing 66 and below the operation lever 72. The taillight 74 is turned on when a right headlight 156 and a left headlight 158 (which will be described later) are turned on, and is turned off when these lights are turned off. The taillight 74 is configured to emit light toward an area behind the cart 2 and serves as a visibly noticeable portion that can be clearly seen. As shown in FIG. 8, a taillight board 82 is disposed in the casing 66 and frontward of the taillight 74. The taillight board 82 includes an LED (not shown) configured to turn on/off the taillight 74 and the like. The taillight 74 may be turned on/off by a surface-emitting LED, for example. For example, when the cart 2 collides with an object located behind while traveling backward, the grip 38 collides with the object before the object reaches the taillight 74 because the taillight 74 is located frontward of the grip 38, thus the taillight 74 can be prevented from colliding with an object and getting damaged.

From a safety perspective for workers at night, the taillight 74 is desirable to be bright enough such that the lighting of the taillight 74 can be visually recognized at night from a point that is a distance of 100 m rearward apart from the taillight 74. Further, the color of light emitted by the taillight 74 is desirably a color including red, specifically, orange, red, or the like. For example, if an LED is used, the lamp brightness that can be visually recognized at night from a point the distance of 100 m rearward apart may satisfy the standard for bike taillights specified in JISC9502 (in particular, the standard for brightness and/or color of beam of taillights).

The cart 2 may be configured to turn on the taillight 74 in conjunction with the activation of the cart 2. The cart 2 may maintain the light of the taillight 74 constantly, and/or may cause it to blink. For example, the cart 2 may be configured to maintain the light of the taillight 74 constantly during normal operation and cause it to blink when an acceleration sensor (not shown) or the like detects deceleration of the cart 2. Alternatively, the cart 2 may be configured to cause the light of the taillight 74 to blink during normal operation and maintain it constantly when an optical sensor (not shown) or the like detects that the environment gets dark. Further, the actuation of the motor 150 may be detected by a vibration sensor (not shown) or the like, and the cart 2 may be configured to maintain the light of the taillight 74 constantly when the environment gets dark and the motor 150 is actuated. Alternatively, the cart 2 may be configured to continue power supply to the taillight 74 while stopping power supply to the motor 150 and/or the container unit 800, when a remaining charge of battery packs 112 (which will be described later, see FIG. 14) is small.

The cart 2 may include a reflector (not shown) on the rear surface of the casing 66, instead of the taillight 74. The reflector emit light toward an area behind the cart 2 by receiving light and reflecting it, and serves as a visibly noticeable portion that can be clearly seen. The reflector may comprise a retroreflective material. When irradiated with light from a car headlight or the like at night, the reflector desirably provides reflected light that can be visually recognized from 100 m behind. The color of the light reflected by the reflector is desirably a color including red, specifically, an orange, red, or the like. Alternatively, a combination of the taillight 74 and the reflector may be used to further improve the visibility from behind. In this case, the taillight 74 may be integrated with the reflector.

Figure 10:
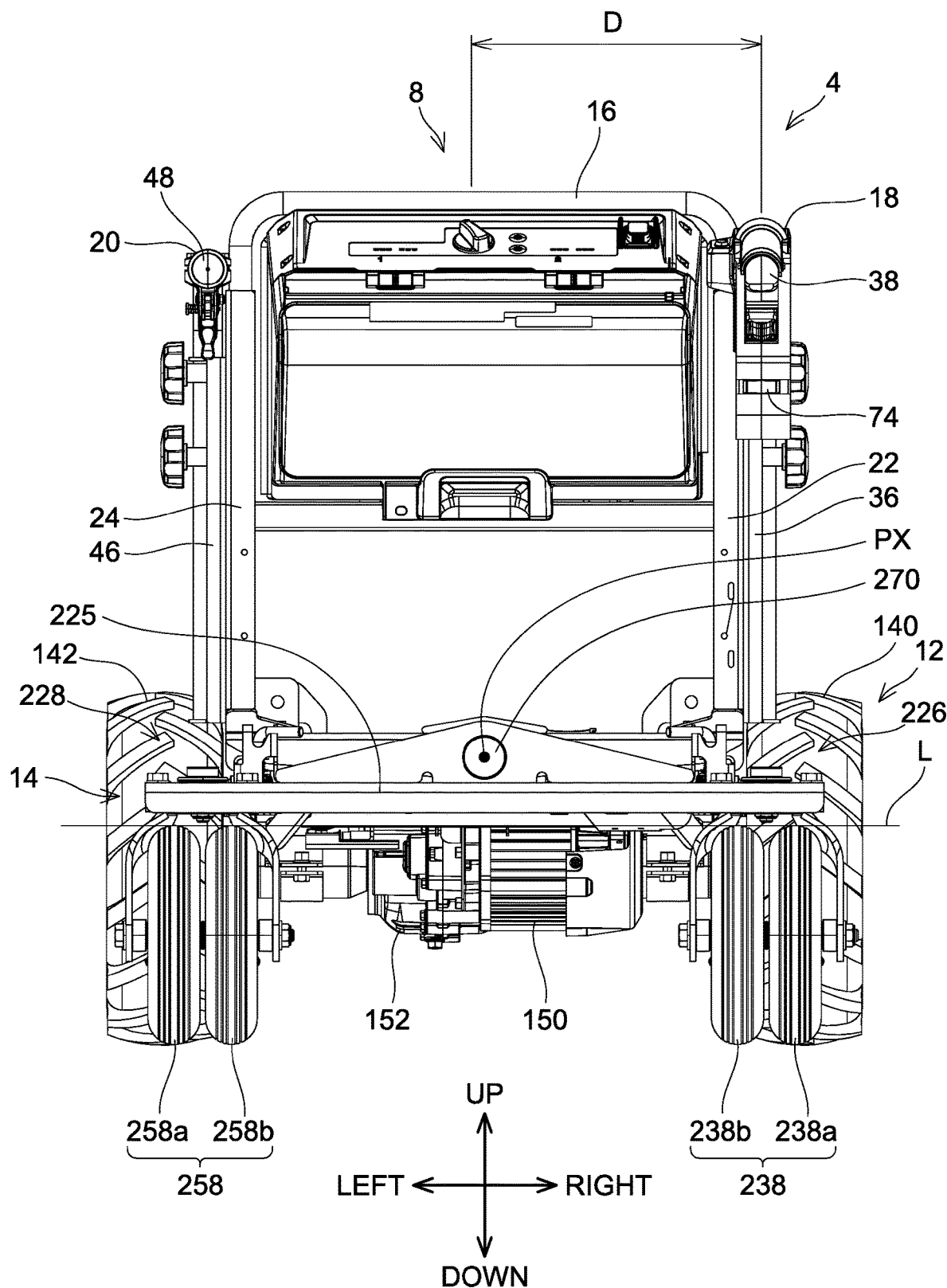
FIG. 10 is a rear view of the chassis unit 4 according to the embodiment.

As shown in FIG. 10, in a rear plan view of the chassis unit 4, a distance D from a center of the chassis unit 4 in the right-left direction to a center of the taillight 74 in the right-left direction is 150 mm or more, preferably 200 mm or more, and is, for example, about 250 mm. For example, when the distance D is 150 mm or more, a distance between the right handle 18 and the left handle 20 is 300 mm or more, which is larger than a waist width of a standard adult. When the distance D is 200 mm or more, the distance between the right handle 18 and the left handle 20 is 400 mm or more, which is larger than a shoulder width of the standard adult. The distance D is selectable with the aforementioned standard waist width and shoulder width as its reference, considering the posture of a worker based on the shapes of the right handle 18 and the left handle 20. With this configuration, even when the user is standing behind the cart 2 while gripping the right handle 18 and the left handle 20, the taillight 74 is not blocked by the user's body and the taillight 74 can be visually recognized from behind the user. The center of the chassis unit 4 in the right-left direction may be any position corresponding to a center of the user's body in the right-left direction when the user is standing behind the cart 2 while gripping the right handle 18 and the left handle 20. For example, the center of the chassis unit 4 in the right-left direction may be: a middle position between a center of a right front wheel 140 in the right-left direction and a center of a left front wheel 142 in the right-left direction; a middle position between a center of a right rear wheel 238 in the right-left direction and a center of a left rear wheel 258 in the right-left direction; a center position of the handle unit 6 in the right-left direction; or a middle position between a center of the grip 38 of the right handle 18 in the right-left direction and a center of the grip 48 of the left handle 20 in the right-left direction. The taillight 74 may be disposed at any position on the chassis unit 4 other than the switch box 40, as long as the position is visually recognizable from behind the user when the user is standing behind the cart 2 while gripping the right handle 18 and the left handle 20. For example, the taillight 74 may be disposed at the right channel 22 or the left channel 24 of the handle base 16. Alternatively, the taillight 74 may be disposed at the channel 36 of the right handle 18 or on a rear end surface of the grip 38. Alternatively, the taillight 74 may be disposed at the channel 46 of the left handle 20 or on a rear end surface of the grip 48. Alternatively, the taillight 74 may be disposed near the right rear wheel 238 or near the left rear wheel 258 in a rear wheel frame 225 of the rear wheel unit 14 (which will be described later). Even if the taillight 74 is disposed at any of these positions, the light of the taillight 74 is desirably visually recognizable at night from 100 m behind.

Figure 11:
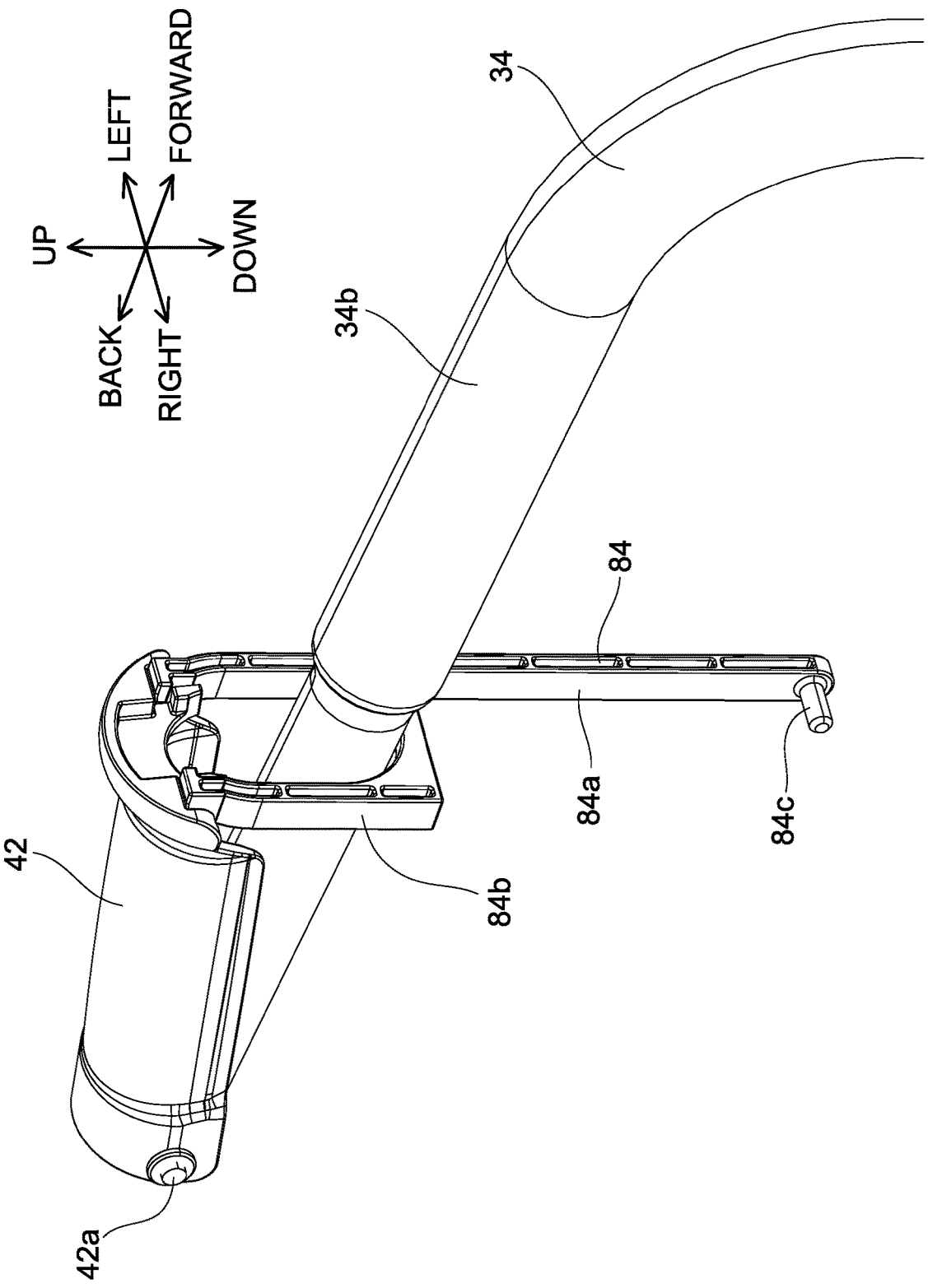
FIG. 11 is a perspective view showing a positional relationship among the dead man's lever 42, a first link member 84, and a pipe 34 according to the embodiment, when they are seen from upper-front-right side.

As shown in FIGS. 8 and 9, the casing 66 further houses a first link member 84, a second link member 86, and a dead man's switch 88. The first link member 84 is slidably supported by the casing 66 such that it can slide in a predetermined sliding direction (see arrows in FIGS. 8 and 9). As shown in FIG. 11, the first link member 84 includes a support beam 84a that extends substantially linearly from its upper end to lower end, an auxiliary beam 84b that extends rightward from an intermediate part of the support beam 84a and then bends upward, and a pin 84c that extends rightward from a lower end of the support beam 84a. As shown in FIGS. 8 and 9, the support beam 84a is located leftward of the operation lever 72 and extends from an upper portion to a lower portion inside the casing 66. The auxiliary beam 84b has a shape that does not interfere with the grip 38 and the operation lever 72 which are respectively located in an upper area and in a lower area within a movable range of the first link member 84. The second link member 86 is pivotably supported by the casing 66 such that it can pivot about a pivot axis 86a extending in the right-left direction. An elongated hole 86b is formed at a rear end of the second link member 86. The pin 84c of the first link member 84 is in the elongated hole 86b of the second link member 86. When the first link member 84 slides in the sliding direction, the pin 84c presses a side wall of the elongated hole 86b while sliding along the side wall of the elongated hole 86b, which pivots the second link member 86 around the pivot axis 86a. The dead man's switch 88 is located to face a projection 86c disposed on the second link member 86. When the second link member 86 is pivoted such that the rear end of the second link member 86 is moved upward, the projection 86c presses the dead man's switch 88, whereas when the second link member 86 is pivoted such that the rear end of the second link member 86 is moved downward, the projection 86c is separated from the dead man's switch 88. The second link member 86 is biased in a pivoting direction along which the rear end is moved upward by a torsion spring (not shown). A cable holder 86d is disposed at a front end of the second link member 86. A dead man's cable 90 is inserted to a front lower portion of the casing 66. The dead man's cable 90 includes an inner cable 90a and an outer cable 90b covering the periphery of the inner cable 90a. The outer cable 90b is supported by the casing 66. The inner cable 90a is supported by the cable holder 86d.

As shown in FIG. 5, the dead man's lever 42 has a shape that extends along an upper surface of the grip 38. The dead man's lever 42 is a resin member. A rear end of the dead man's lever 42 is pivotably supported at a rear end of the grip 38 via a pivot axis 42a extending in the right-left direction. A front end of the dead man's lever 42 is slidably supported on an upper end of the first link member 84.

When the user grips the grip 38, the dead man's lever 42 is pushed downward by the user's palm. This moves the first link member 84 downward along the sliding direction and pivots the second link member 86 in a pivoting direction such that the rear end thereof is moved downward. As a result, as shown in FIG. 9, the inner cable 90a of the dead man's cable 90 is relatively pulled out from the outer cable 90b. Further, the projection 86c of the second link member 86 is separated from the dead man's switch 88. When the user releases his/her hand from the grip 38 in this state, the biasing force of the torsion spring causes the second link member 86 to pivot such that the rear end is moved upward and the first link member 84 is thereby moved upward along the sliding direction. As a result, as shown in FIG. 8, the inner cable 90a of the dead man's cable 90 is relatively pushed into the outer cable 90b. Further, the projection 86c of the second link member 86 presses the dead man's switch 88. Furthermore, the front end of the dead man's lever 42 is pushed upward.

Figure 62:
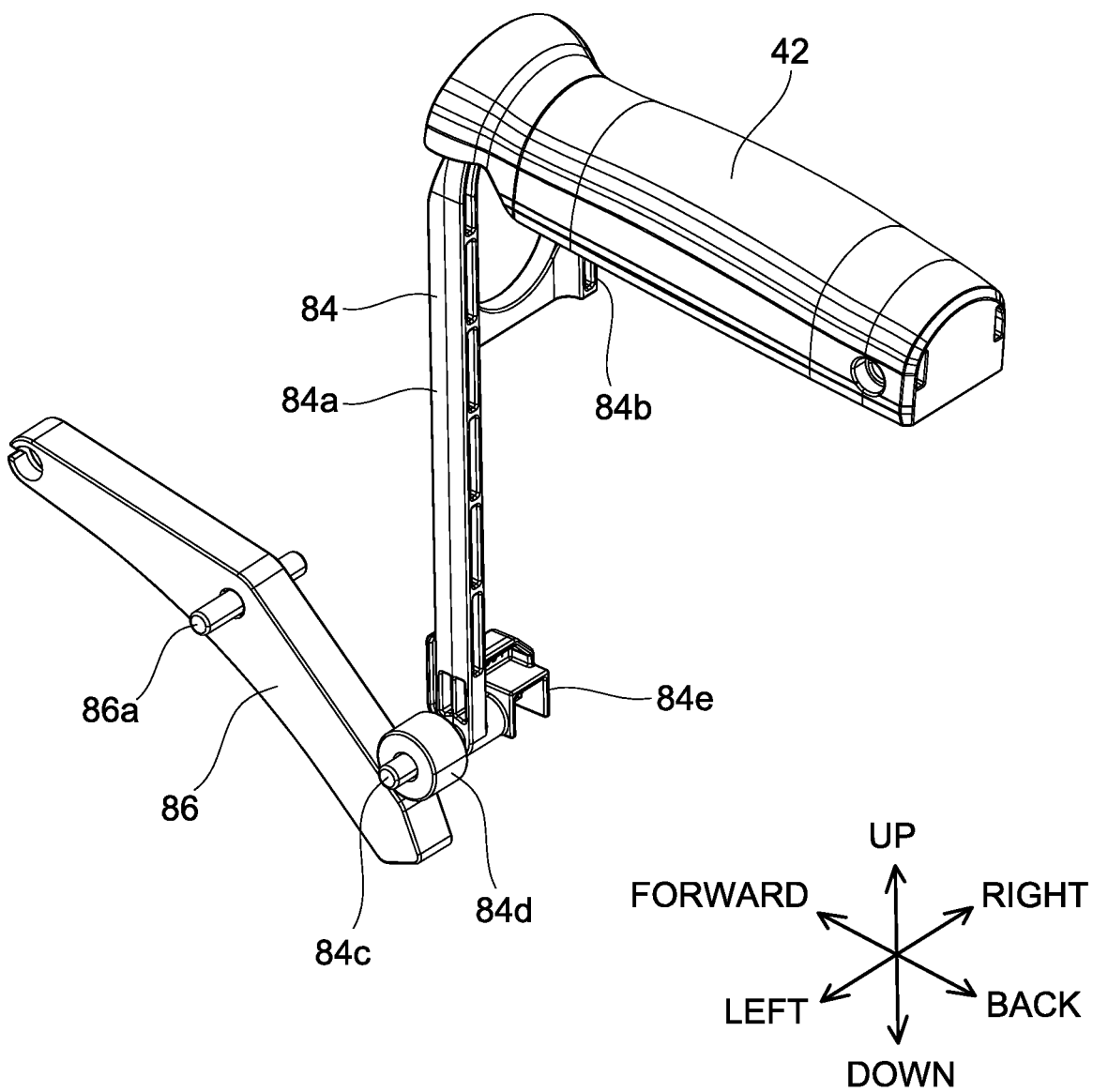
FIG. 62 is a perspective view showing a positional relationship among a dead man's lever 42, a first link member 84, and a second link member 86 according to a variant, when they are seen from upper-rear-left side.

The first link member 84 and the second link member 86 may be configured as shown in FIG. 62. In the configuration shown in FIG. 62, the pin 84c of the first link member 84 extends leftward from the lower end of the support beam 84a. Further, the first link member 84 includes a roller 84d that is rotatably supported by the pin 84c and a block 84e that protrudes rightward from the lower end of the support beam 84a. In the configuration shown in FIG. 62, the elongated hole 86b and the projection 86c are not disposed on the second link member 86. In the vicinity of the rear end of the second link member 86, the roller 84d of the first link member 84 is in contact with an upper surface of the second link member 86.

Figure 63:
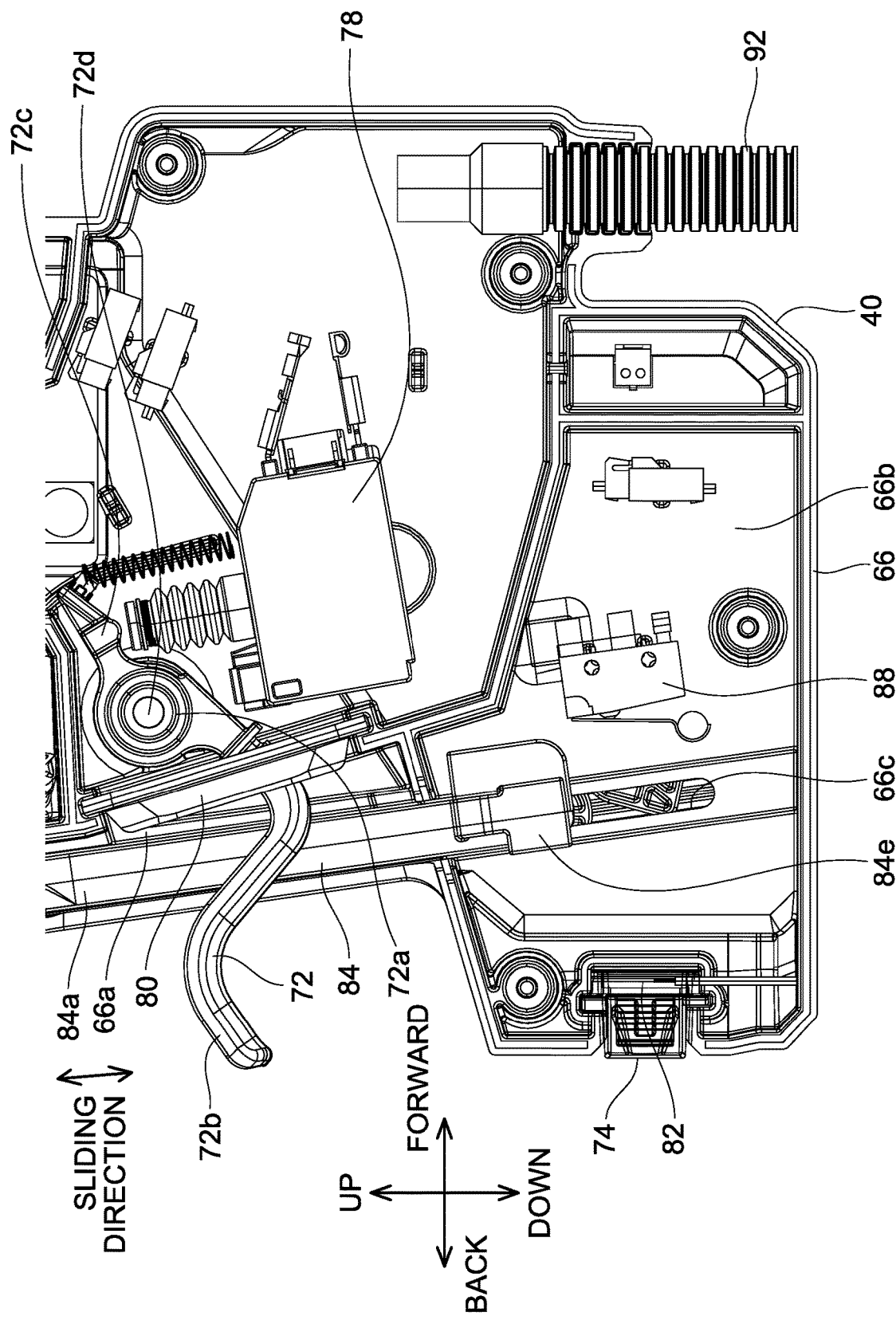
FIG. 63 is a right side view of an internal structure of a switch box 40 according to the variant.
Figure 64:
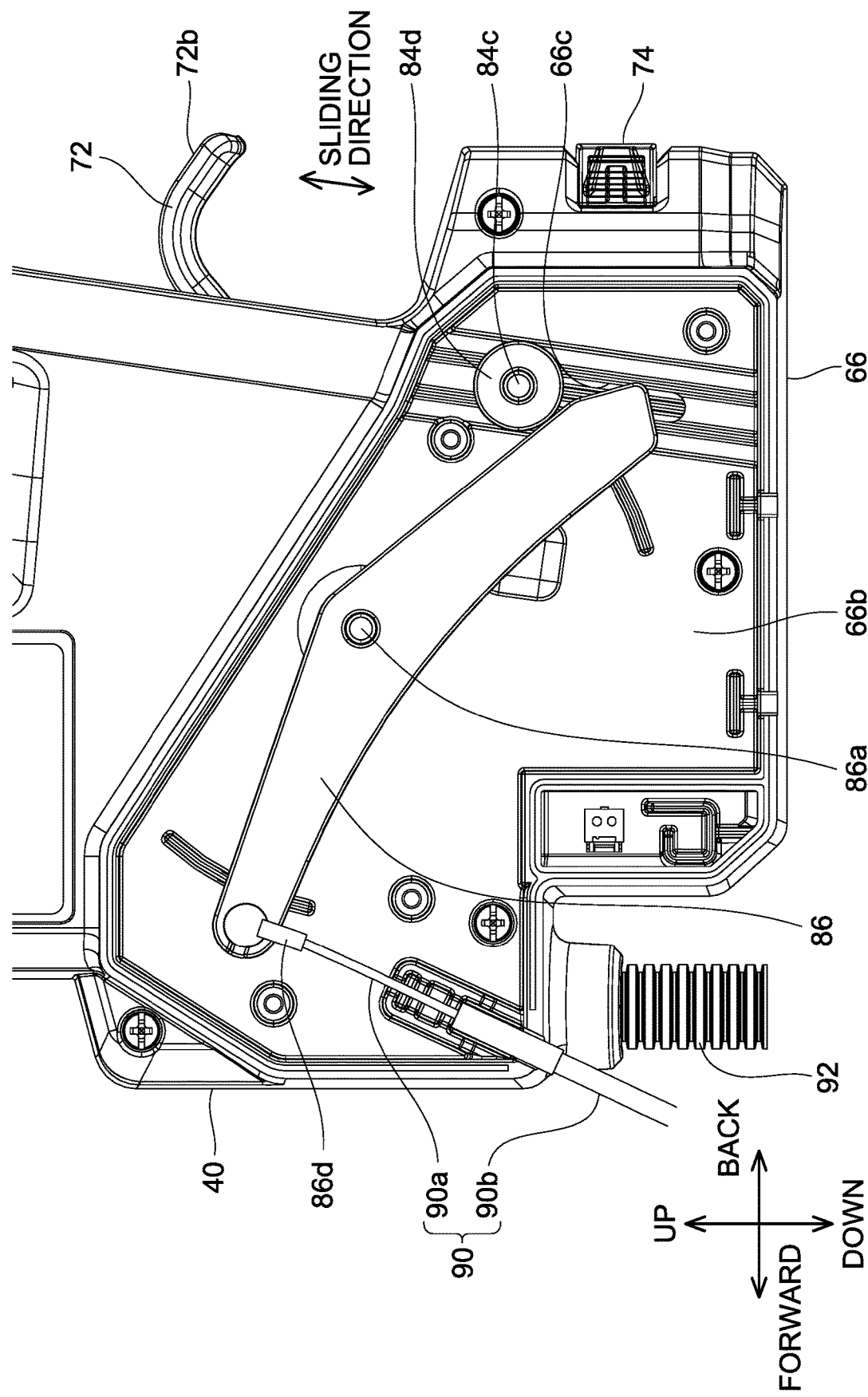
FIG. 64 is a left side view of the internal structure of the switch box 40 according to the variant.

In a configuration using the first link member 84 and the second link member 86 shown in FIG. 62, the internal space of the casing 66 is partitioned by an inner wall 66b into a left space and a right space as shown in FIGS. 63 and 64. An elongated hole 66c is formed in the inner wall 66b. A longitudinal direction of the elongated hole 66c is along the sliding direction of the first link member 84. As shown in FIG. 63, the support beam 84a and the block 84e of the first link member 84 and the dead man's switch 88 are disposed in the right space which is located on the right side relative to the inner wall 66b. The pin 84c of the first link member 84 passes through the elongated hole 66c. As shown in FIG. 64, the roller 84d of the first link member 84, the second link member 86, and the dead man's cable 90 are disposed in the left space located on the left side relative to the inner wall 66b.

In the configuration shown in FIGS. 62 to 64, when the dead man's lever 42 is pushed downward by the user, the first link member 84 is moved downward along the sliding direction and the roller 84d presses the upper surface of the second link member 86 near the rear end thereof while rolling thereon. This pivots the second link member 86 about the pivot axis 86a and moves the front end of the second link member 86 upward, as a result of which the inner cable 90a of the dead man's cable 90 is relatively pulled out from the outer cable 90b. Further, when the first link member 84 is moved downward along the sliding direction, the block 84e of the first link member 84 presses the dead man's switch 88. When the user releases his/her hand from the dead man's lever 42 in this state, the biasing force of the torsion spring (not shown) causes the second link member 86 to pivot in the pivoting direction such that its front end is moved downward and its rear end is moved upward. As a result, the inner cable 90a of the dead man's cable 90 is relatively pushed into the outer cable 90b. Further, when the roller 84d is pushed upward by the upper surface of the second link member 86, the first link member 84 is moved upward along the sliding direction and the block 84e of the first link member 84 is separated from the dead man's switch 88. Furthermore, the front end of the dead man's lever 42 is pushed upward.

A signal cable 92 is inserted into the front lower portion of the casing 66. Wires extending from the operation hoard 76, the alarm sound button 70, the actuation switch 78, the taillight board 82, and the dead man's switch 88 in the casing 66 are drawn out of the casing 66 through the signal cable 92.

(Left Handle 20)

As shown in FIG. 4, in the left handle 20, a brake cable 94 is connected to the brake lever 49. The brake cable 94 includes an inner cable 94a and an outer cable 94b coveting the periphery of the inner cable 94a. The brake lever 49 is pushed downward by a biasing force of a torsion spring (not shown). When the user pushes the brake lever 49 upward, the inner cable 94a of the brake cable 94 is relatively pulled out from the outer cable 94b, When the user releases his/her hand from the brake lever 49, the brake lever 49 is pushed downward by the biasing force of the torsion spring and the inner cable 94a of the brake cable 94 is relatively pushed into the outer cable 94b.

(Battery Box 8)

Figure 12:
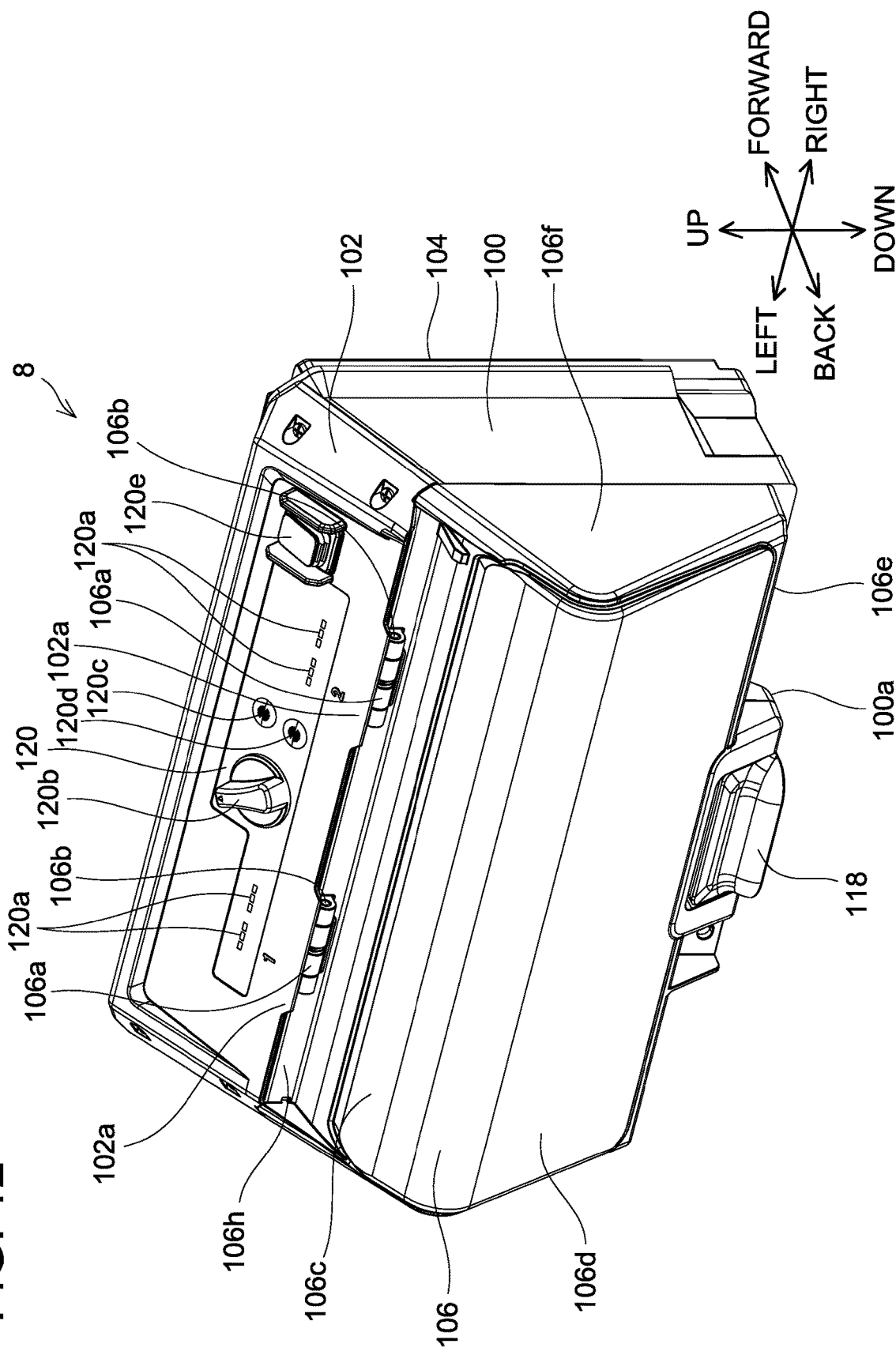
FIG. 12 is a perspective view of a battery box 8 according to the embodiment, when seen from upper-rear-right side.
Figure 13:
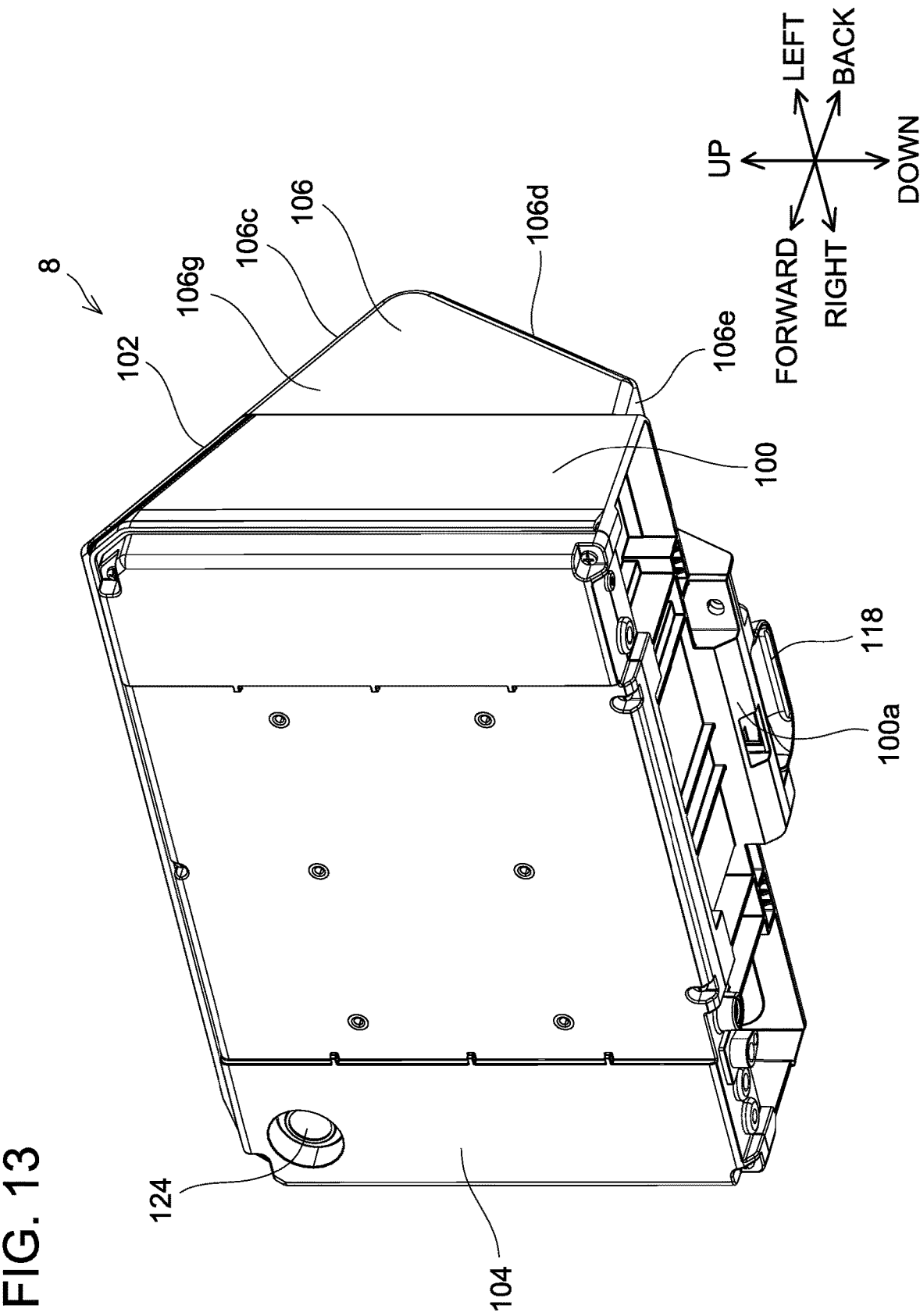
FIG. 13 is a perspective view of the battery box 8 according to the embodiment, when seen from upper-front-left side.

As shown in FIGS. 12 and 13, the battery box 8 includes a casing 100, a top cover 102, a front cover 104, and a battery cover 106. The casing 100, the top cover 102, the front cover 104, and the battery cover 106 are constituted of resin. The casing 100 has a box shape. The top cover 102 is attached to an upper surface of the casing 100. The top cover 102 has a substantially flat plate shape and is inclined downward from the front toward rear. The front cover 104 is attached to a front surface of the casing 100. The front cover 104 has a substantially flat plate shape and is substantially perpendicular to the front-rear direction. The battery box 8 is fixed to the handle unit 6 by screwing the front cover 104 to the wall 28a (see FIG. 2) of the base plate 28 with the battery box 8 placed on the floor 28b (see FIG. 2) of the base plate 28 of the handle unit 6.

Figure 14:
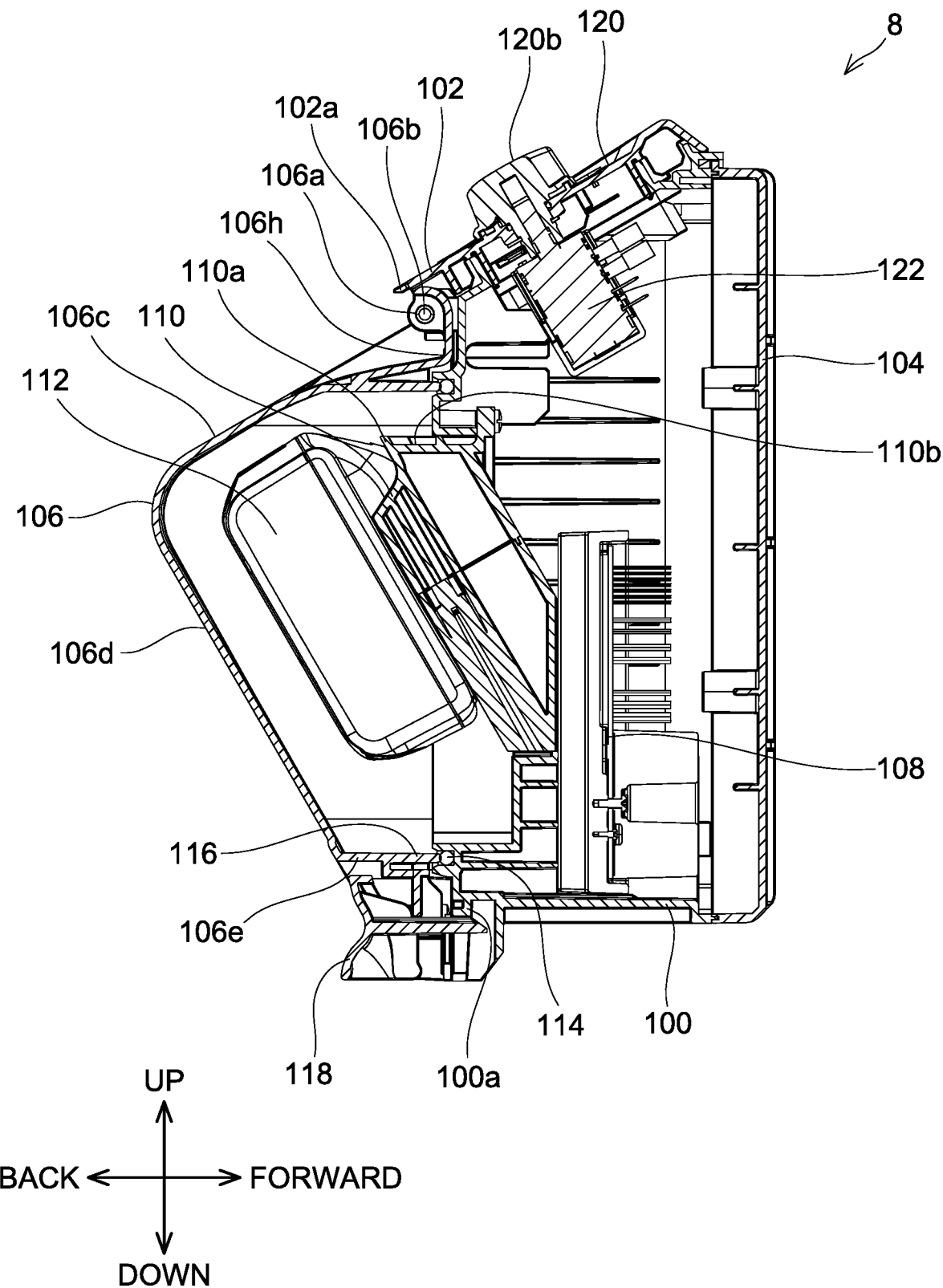
FIG. 14 is a vertical cross-sectional view of the battery box 8 according to the embodiment.
Figure 15:
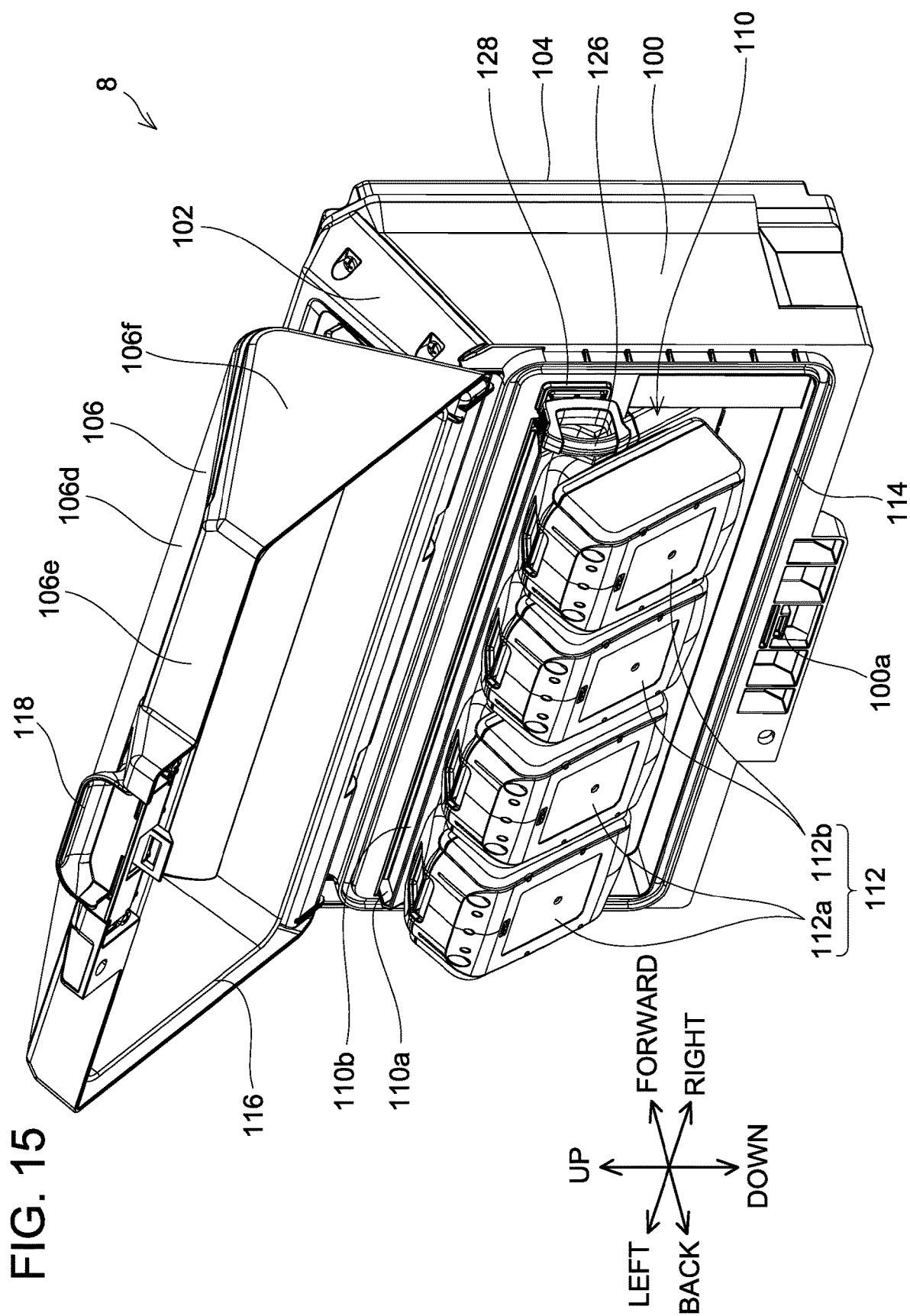
FIG. 15 is a perspective view of the battery box 8 according to the embodiment with a battery cover 106 opened, when seen from upper-rear-right side.

As shown in FIG. 14, a control board 108 is housed in the casing 100. Further, a plurality of battery mounting portions 110 is disposed on a rear surface of the casing 100. A plurality of battery packs 112 is detachably attached to the plurality of battery mounting portions 110. The battery packs 112 each include, for example, a secondary battery cell such as a lithium ion battery cell (not shown) and are configured to be charged by a charger (not shown). Each of the battery packs 112 has, for example, a rated voltage of 18V and a rated capacity of 6.0 Ah. The battery packs 112 can be also used in an electric device other than the cart 2, for example, in an electric power tool such as electric driver, or an electric working machine such as electric mower. As shown in FIG. 15, in the cart 2 of the present embodiment, the plurality of battery packs 112 (e.g., four battery packs 112) is grouped into first-group battery packs 112a (e.g., two battery packs on the left) and second-group battery packs 112b (e.g., two battery packs on the right). The cart 2 of the present embodiment is switchable between a state in which the cart 2 uses the first-group battery packs 112a connected in series as the power source and a state in which the cart 2 uses the second-group battery packs 112b connected in series as the power source.

As shown in FIG. 12, the battery cover 106 is attached to the casing 100 via a hinge 106a disposed at an upper end of the battery cover 106. The battery cover 106 is pivotable relative to the casing 100 about a pivot axis 106b extending in the right-left direction. As shown in FIGS. 12 and 13, the battery cover 106 includes an upper inclined surface 106c that is inclined downward from the front to rear, a lower inclined surface 106d that is continuous from the upper inclined surface 106c and is inclined downward from the rear to front, a bottom surface 106e that is continuous from the lower inclined surface 106d and is substantially perpendicular to the up-down direction, a right side surface 106f that connects right ends of the upper inclined surface 106c, the lower inclined surface 106d, and the bottom surface 106e, and a left side surface 106g that connects left ends of the upper inclined surface 106c, the lower inclined surface 106d, and the bottom surface 106e. A recessed surface 106h which is recessed toward the front is disposed at an upper portion of the upper inclined surface 106c, and the hinge 106a is disposed on the recessed surface 106h. As shown in FIG. 14, the battery cover 106 covers the periphery of the plurality of battery packs 112 attached to the battery mounting portions 110 when the battery cover 106 is closed with respect to the casing 100. In this state, an upper surface of the top cover 102 and an upper surface of the battery cover 106 are inclined relative to a horizontal surface. Thus, even when water adheres to the upper surface of the top cover 102 and/or the upper surface of the battery cover 106, the water travels along the upper surface of the top cover 102 and/or the upper surface of the battery cover 106 and then drops downward from the battery box 8.

Figure 16:
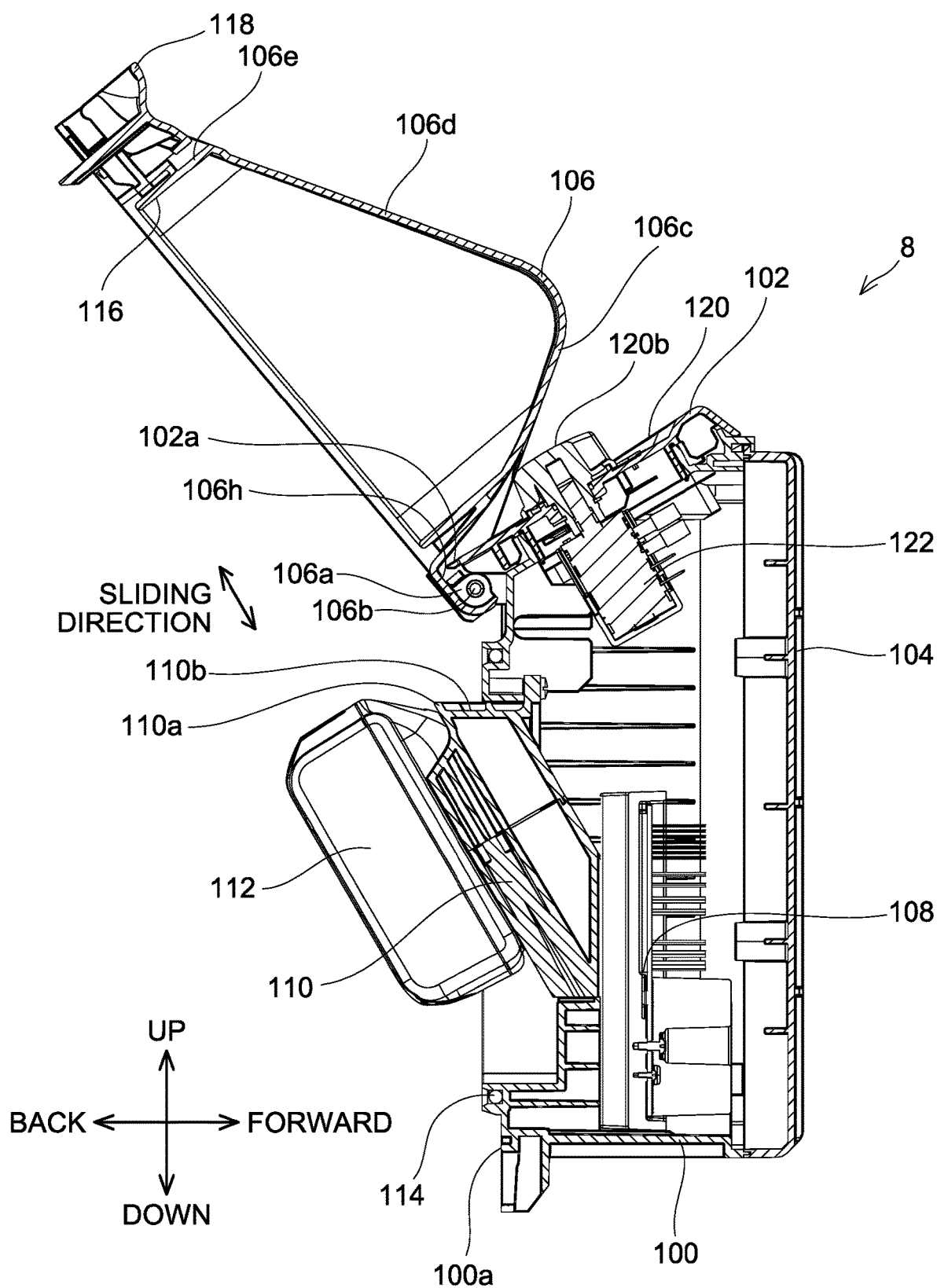
FIG. 16 is a vertical cross-sectional view of the battery box 8 according to the embodiment with the battery cover 106 opened.

As shown in FIGS. 15 and 16, when the battery cover 106 is open with respect to the casing 100, the battery packs 112 can be removed or attached with respect to the battery mounting portions 110 by being slid in a predetermined sliding direction (see an arrow in FIG. 16). When the battery cover 106 is open with respect to the casing 100, the battery cover 106 is located at a position that does not interfere with the sliding of the battery packs 112. Thus, the opened battery cover 106 does not interfere with the attachment or detachment of the battery packs 112.

As shown in FIGS. 14 and 16, the pivot axis 106b of the battery cover 106 is located below the top cover 102, and a rear end of the top cover 102 extends rearward beyond the pivot axis 106b. Thus, as shown in FIG. 14, in a top view of the battery box 8 with the battery cover 106 closed with respect to the casing 100, the battery cover 106 and the top cover 102 partially overlap with each other. Further, as shown in FIG. 16, in the top view of the battery box 8 with the battery cover 106 opened with respect to the casing 100, the battery cover 106 and the top cover 102 partially overlap with each other. Even though water adheres to an outer surface of the top cover 102 and/or an outer surface of the battery cover 106, such a configuration can prevent the water from dripping onto the battery packs 112 attached to the battery mounting portions 110. An eaves 102a overhanging the hinge 106a is disposed at a position correspond to the hinge 106a in the rear end of the top cover 102. This can suppress water droplets from adhering to the hinge 106a and affecting the pivoting of the battery cover 106.

As shown in FIGS. 15 and 16, a water tray 110b surrounded by a side wall 110a is disposed on upper surfaces of the battery mounting portions 110. Thus, even if water drops onto the upper surfaces of the battery mounting portions 110, the water is suppressed from reaching the battery packs 112 attached to the battery mounting portions 110.

As shown in FIG. 15, a sealing member 114 may be attached to the rear surface of the casing 100. The sealing member 114 is, for example, a rubber O-ring and is disposed around the plurality of battery mounting portions 110. A rib 116 is disposed on an inner surface of the battery cover 106, corresponding to the sealing member 114. When the battery cover 106 is closed with respect to the casing 100, the rib 116 contacts and presses the sealing member 114. This prevents water from entering the inside of the battery cover 106 while the battery cover 106 is closed with respect to the casing 100.

The battery cover 106 is biased by a torsion spring (not shown) in a direction that closes the battery cover 106 with respect to the casing 100. In the cart 2, the gravity on the battery cover 106 acts as a force in the direction that closes the battery cover 106 with respect to the casing 100. A member 118, which is configured to be operable by the user, is disposed on the battery cover 106. The latch member 118 can keep the battery cover 106 closed by engaging with a latch receiver 100a disposed in a lower portion of the casing 100 when the battery cover 106 is closed.

As shown in FIG. 12, an operation panel 120 is disposed on the top cover 102. The operation panel 120 includes a battery remaining charge indicator 120a, a power supply switching knob 120b, a lighting button 120c, a display switching button 120d, and a container operation switch 120e. The battery remaining charge indicator 120a corresponds to the plurality battery packs 112 attached to the plurality of battery mounting portions 110 and changes the number of lighted windows according to battery remaining charge of the plurality of battery packs 112 attached to the plurality of battery mounting portions 110. The power supply switching knob 120b is a knob for the user to switch the power supply of the cart 2 between the first-group battery packs 112a and the second-group battery packs 112b. The lighting button 120c is a button for the user to switch on/off of a right headlight 156 and a left headlight 158, which will be described later. The display switching button 120d is a button for the user to switch on/off of the display of battery remaining charge by the battery remaining charge indicator 120a. The container operation switch 120e is, for example, a momentary rocker switch and is a switch for accepting user's operations to the container unit 800. As shown in FIGS. 14 and 16, an operation board (not shown) and a power supply switching switch 122 are housed in the casing 100 below the operation panel 120. The operation board includes an LED (not shown) for lighting/un-lighting the battery remaining charge indicator 120a and switches (not shown) for detecting user's operations to the lighting button 120c and the display switching button 120d. The power supply switching switch 122 is configured to detect a user's operation to the power supply switching knob 120b.

As shown in FIG. 13, a buzzer 124 is disposed in an upper right portion of the front cover 104. The buzzer 124 is configured to emit an alarm sound when activated by the user pressing the alarm sound button 70 of the right handle 18. A signal cable 92 (see FIGS. 8 and 9) connecting the switch box 40 to the battery box 8, a power supply cable 156a (see FIG. 17) connecting the battery box 8 to the right headlight 156 and the left headlight 158 (see FIG. 17), a power cable (not shown) connecting the battery box 8 to a motor 150, and a power cable (not shown) connecting the battery box 8 to the container unit 800 are inserted into a bottom surface of the casing 100.

As shown in FIG. 15, a key attachment 128 that is configured to detachably attach a key 126 thereto is disposed on the rear surface of the casing 100. Attachment/detachment of the key 126 to/from the key attachment 128 is realized by inserting/removing the key 126 to/from the key attachment 128. Supply of electric power from the battery packs 112 to the motor 150 (which will be described later) is cut off when the key 126 is removed from the key attachment 128. Supply of electric power from the battery packs 112 to the motor 150 is allowed when the key 126 is attached to the key attachment 128.

(Chassis Frame 10)

As shown in FIG. 1, the chassis frame 10 includes the frame plate 130, a right frame pipe 132, a left frame pipe 134, and a central frame pipe 136. All of the frame plate 130, the right frame pipe 132, the left frame pipe 134, and the central frame pipe 136 are constituted of a steel material. The frame plate 130 includes a floor plate 130a having a substantially rectangular shape where its long side is along the right-left direction and its short side is along the front-rear direction, a front flange 130b that is bent downward from a front end of the floor plate 130a, and a rear flange 130c that is bent downward from a rear end of the floor plate 130a (see FIGS. 36 and 38). On a lower surface of the frame plate 130, multiple reinforcing ribs (not shown) are arranged along the front-rear direction and the right-left direction between the front flange 130b and the rear flange 130c. The rear wheel unit 14 is attached to the frame plate 130. Rear ends of the right frame pipe 132 and the left frame pipe 134 are welded to the frame plate 130, and the right frame pipe 132 and the left frame pipe 134 extend forward. An interval between the right frame pipe 132 and the left frame pipe 134 increases from the rear to the front. Front ends of the left frame pipe 134 and the right frame pipe 132 are attached to the front wheel unit 12. The central frame pipe 136 is disposed in the vicinity of the front wheel unit 12, a right end thereof is welded to the right frame pipe 132, and a left end thereof is welded to the left frame pipe 134. The power supply cable 156a (see FIG. 17) connecting the right headlight 156 and the left headlight 158 to the battery box 8 and a cable cover 138 that protects a power cable (not shown) connecting the battery box 8 to the motor 150 are attached to the right frame pipe 132.

(Front Wheel Unit 12)

Figure 17:
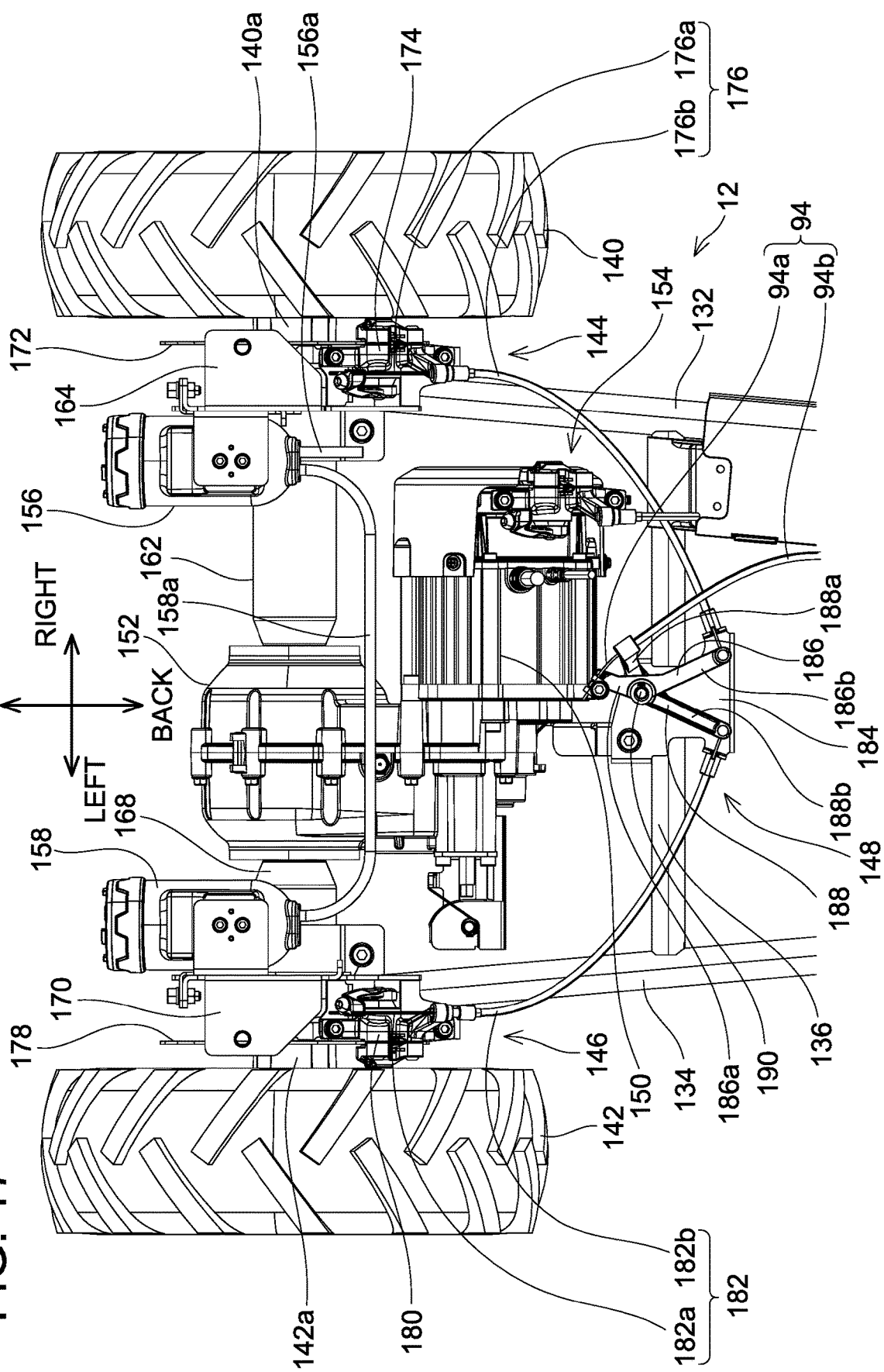
FIG. 17 is a top view of a front wheel unit 12 according to the embodiment.

As shown in FIG. 17, the front wheel unit 12 includes a right front wheel 140, a left front wheel 142, a right front wheel brake 144, a left front wheel brake 146, a brake equalizer 148, the motor 150, a gearbox 152, a dead man's brake 154, the right headlight 156, and the left headlight 158. The right front wheel 140 is connected to the gearbox 152 via a right drive shaft. 160 (see FIGS. 21 and 22). The right drive shaft 160 extends in a right axle case 162 along the right-left direction and is rotatably supported by the right axle case 162 via a bearing (not shown). The right axle case 162 is held by the right frame pipe 132 via a right bracket 164 welded to the right frame pipe 132. The left front wheel 142 is connected to the gearbox 152 via a left drive shaft 166 (see FIGS. 21 and 22). The left drive shaft 166 extends in a left axle case 168 along the right-left direction and is rotatably supported by the left axle case 168 via a bearing (not shown). The left axle case 168 is held by the left frame pipe 134 via a left bracket 170 welded to the left frame pipe 134. All of the right axle case 162, the right bracket 164, the left axle case 168, and the left bracket 170 are constituted of a steel material.

The right front wheel brake 144 includes a disk rotor 172 and a brake caliper 174. The disk rotor 172 is disposed leftward of the right front wheel 140 and is fixed to the right front wheel 140 via a hub 140a. The brake caliper 174 is disposed corresponding to the disk rotor 172. The brake caliper 174 is held by the right bracket 164. A right brake cable 176 is connected to the brake caliper 174. The right brake cable 176 includes an inner cable 176a and an outer cable 176b covering the periphery of the inner cable 176a. When the inner cable 176a of the right brake cable 176 is relatively pulled into the outer cable 176b, the brake caliper 174 has a pair of brake pads (not shown) sandwiching the vicinity of outer edge of the disk rotor 172, which applies a frictional force to the disk rotor 172 to brake the right front wheel 140. When the inner cable 176a of the right brake cable 176 is relatively pushed out from the outer cable 176b, the pair of brake pads is separated from the disk rotor 172 and the braking on the right front wheel 140 is thereby released. The right front wheel brake 144 may be a so-called disk brake as described above, or may be another type of brake such as a drum brake or a band brake.

The left front wheel brake 146 includes a disk rotor 178 and a brake caliper 180. The disk rotor 178 is disposed rightward of the left front wheel 142 and is fixed to the left front wheel 142 via a hub 142a. The brake caliper 180 is disposed corresponding to the disk rotor 178. The brake caliper 180 is held by the left bracket 170. A left brake cable 182 is connected to the brake caliper 180. The left brake cable 182 includes an inner cable 182a and an outer cable 182b covering the periphery of the inner cable 182a. When the inner cable 182a of the left brake cable 182 is relatively pulled into the outer cable 182b, the brake caliper 180 has a pair of brake pads (not shown) sandwiching the vicinity of outer edge of the disk rotor 178, which applies a frictional force to the disk rotor 178 to brake the left front wheel 142. When the inner cable 182a of the left brake cable 182 is relatively pushed out from the outer cable 182b, the pair of brake pads is separated from the disk rotor 178 and the braking on the left front wheel 142 is thereby released. The left front wheel brake 146 may be a so-called disk brake as described above, or may be another type of brake, such as a drum brake or a band brake.

(Brake Equalizer 148)

Figure 18:
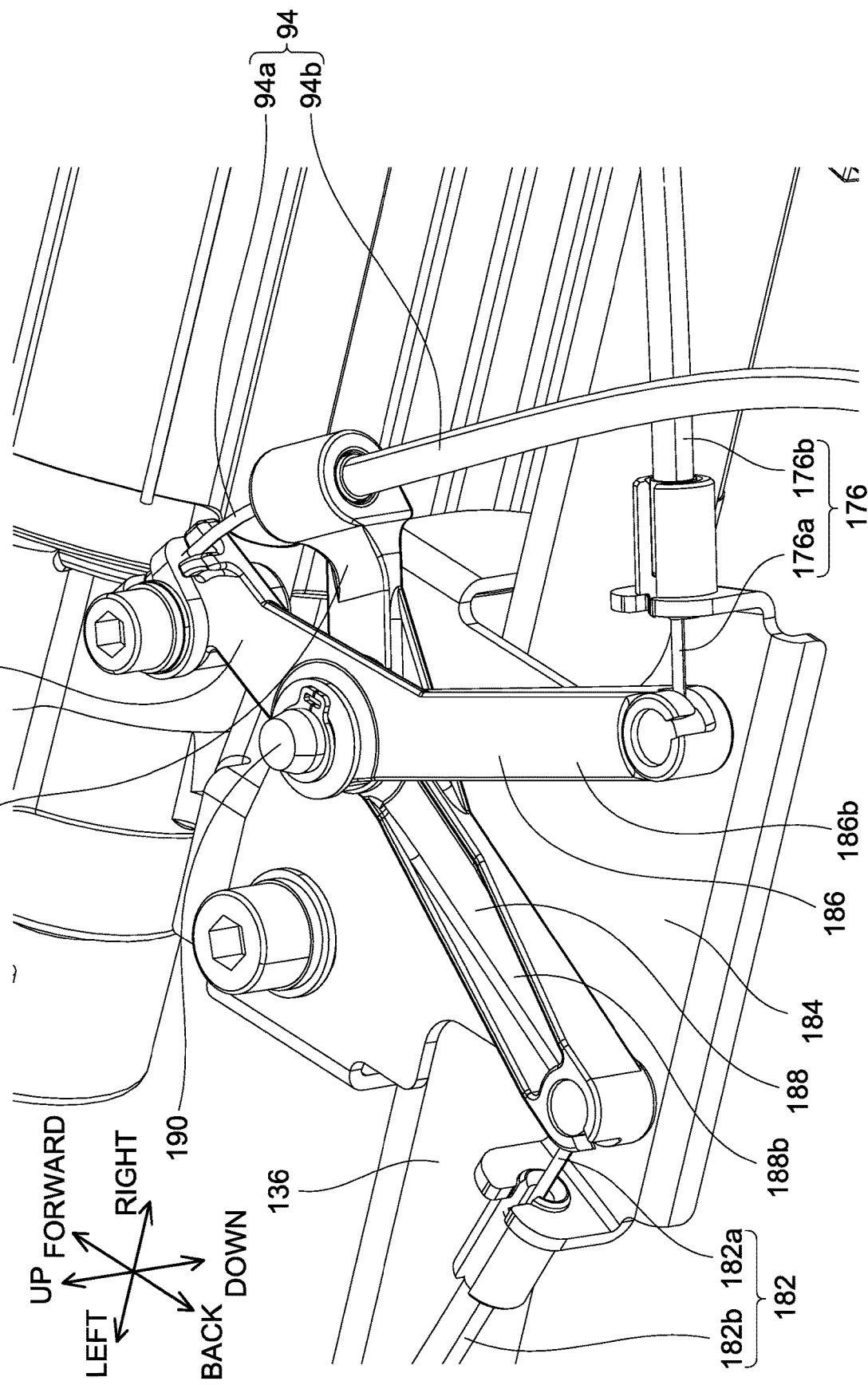
FIG. 18 is a perspective view of a brake equalizer 148 according to the embodiment, when seen from upper-rear-right side.

As shown in FIG. 18, the brake equalizer 148 includes a central bracket 184, a first link member 186, and a second link member 188. The central bracket 184 is constituted of a steel material, and the first link member 186 and the second link member 188 are both constituted of an aluminum material. The central bracket 184 is welded to the vicinity of the center of the central frame pipe 136. The first link member 186 and the second link member 188 are pivotably supported by the central bracket 184 via a pivot axis 190 extending in the up-down direction. The first link member 186 includes an input arm 186a extending rightward and forward from the pivot axis 190 and an output arm 186b extending rightward and rearward from the pivot axis 190. A distal end of the input arm 186a is connected to the inner cable 94a of the brake cable 94 extending from the brake lever 49 of the left handle 20. A distal end of the output arm 186b is connected to the inner cable 176a of the right brake cable 176. The second link member 188 includes an input arm 188a extending rightward and forward from the pivot axis 190 and an output arm 188b extending leftward and rearward from the pivot axis 190. A distal end of the input arm 188a is connected to the outer cable 94b of the brake cable 94 extending from the brake lever 49 of the left handle 20. A distal end of the output arm 188b is connected to the inner cable 182a of the left brake cable 182. The outer cable 176b of the right brake cable 176 and the outer cable 182b of the left brake cable 182 are both fixed to the central bracket 184. In another embodiment, the first link member 186 and the second link member 188 may be pivotably supported by the central bracket 184 via a pivot axis extending in the right-left direction or in the front-rear direction.

A distance from the pivot axis 190 to the distal end of the input arm 186a, a distance from the pivot axis 190 to the distal end of the output arm 186b, and an angle formed by the input arm 186a and the output arm 186b in the first link member 186 are substantially the same as a distance from the pivot axis 190 to the distal end of the input arm 188a, a distance from the pivot axis 190 to the distal end of the output arm 188b, and an angle formed by the input arm 188a and the output arm 188b in the second link member 188.

Figure 19:
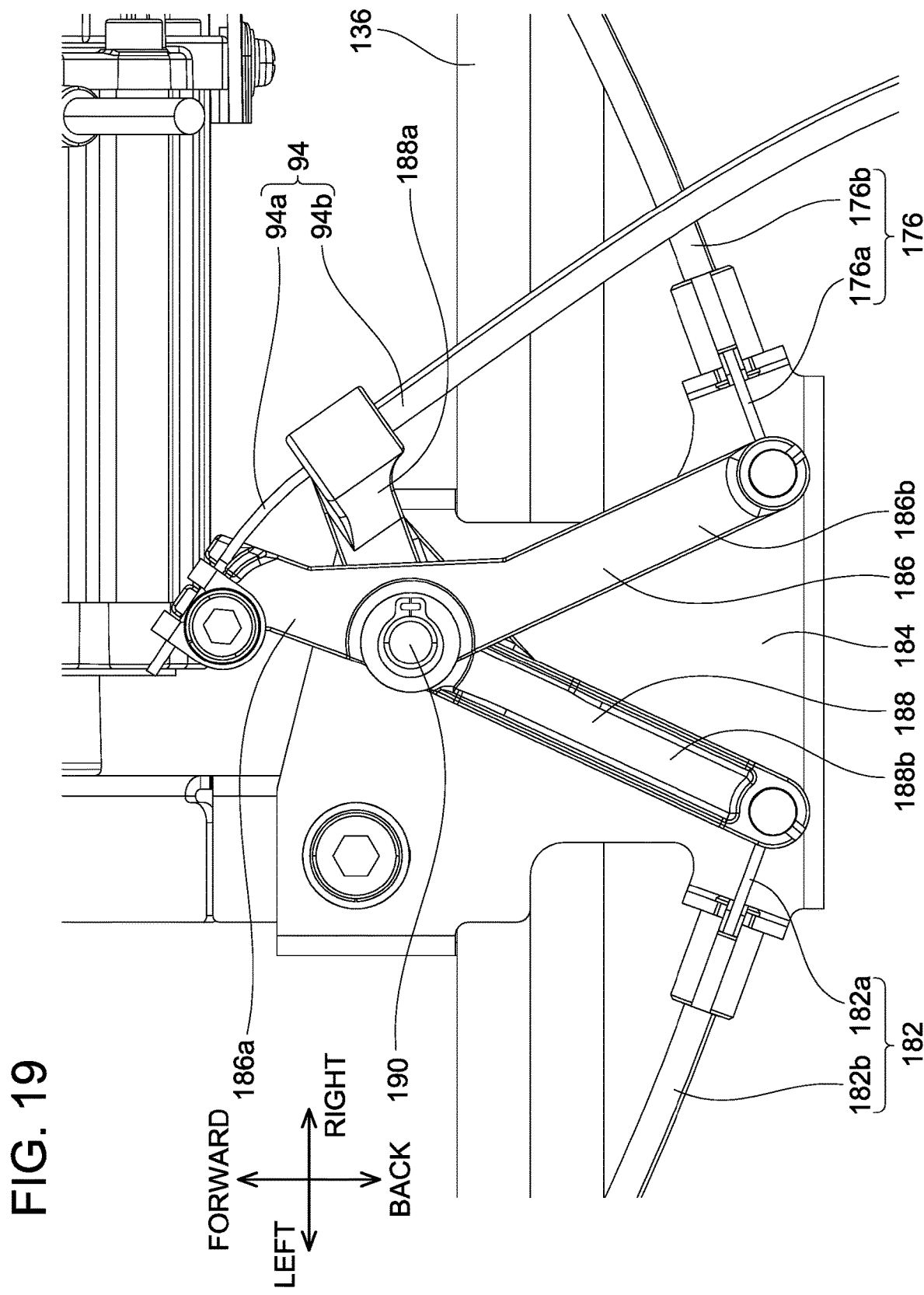
FIG. 19 is a top view of the brake equalizer 148 according to the embodiment.

As shown in FIG. 19, when the brake lever 49 of the left handle 20 is not pushed up by the user, the inner cable 176a of the right brake cable 176 is relatively pushed into the outer cable 176b by the first link member 186 and the inner cable 182a of the left brake cable 182 is relatively pushed into the outer cable 182b by the second link member 188. In this state, the brake on the right front wheel 140 and the left front wheel 142 is released.

Figure 20:
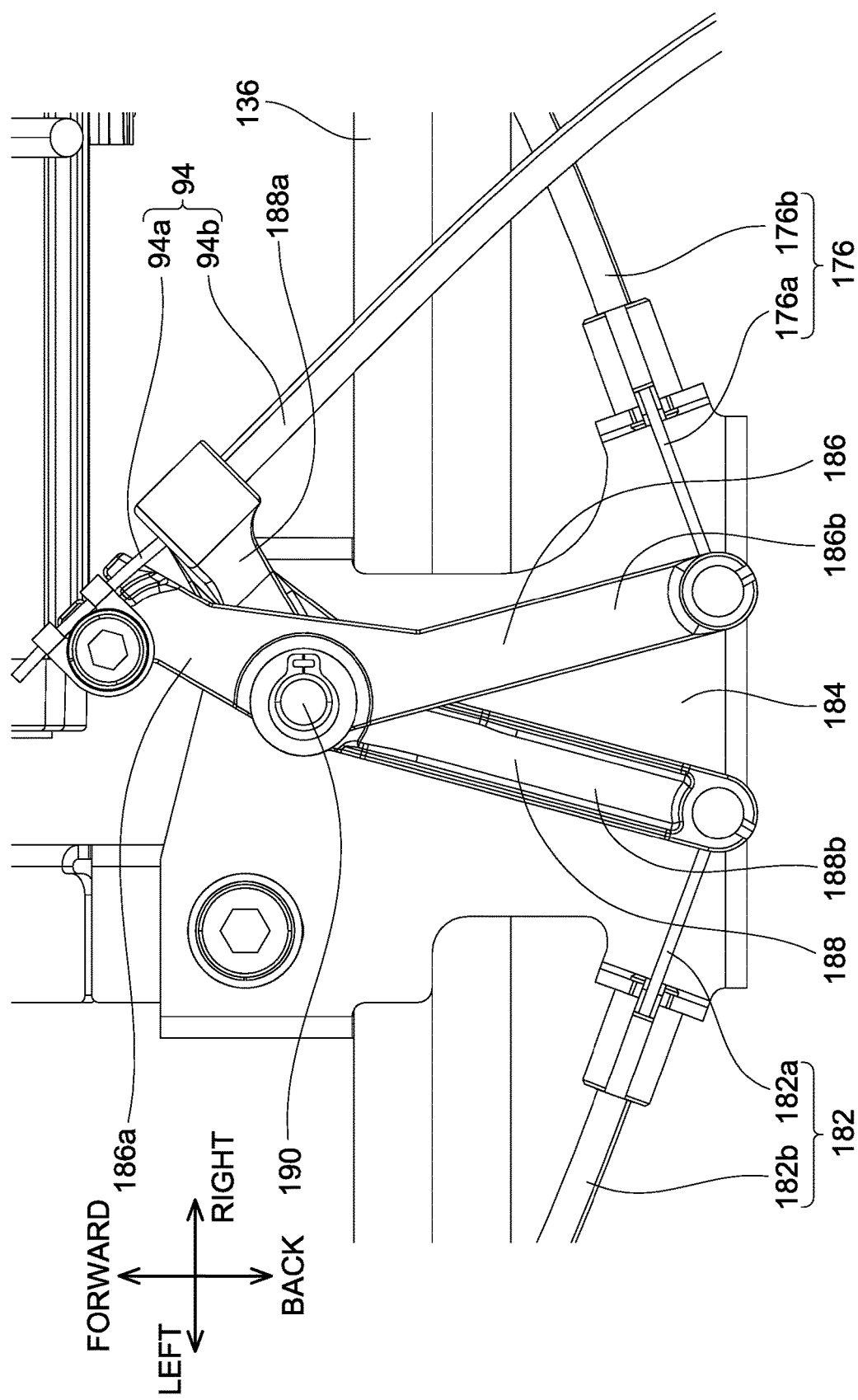
FIG. 20 is a top view of the brake equalizer 148 according to the embodiment with a brake lever 49 pushed upward.

As shown in FIG. 20, when the brake lever 49 of the left handle 20 is pushed up by the user, the inner cable 94a of the brake cable 94 is relatively pulled into the outer cable 94b. This moves the input arm 186a of the first link member 186 rightward and the output arm 186b leftward, as a result of which the inner cable 176a of the right brake cable 176 is relatively pulled out from the outer cable 176b. At the same time, the input arm 188a of the second link member 188 is moved leftward and the output arm 188b is moved rightward, as a result of which the inner cable 182a of the left brake cable 182 is relatively pulled out from the outer cable 182b. As above, the right front wheel 140 and the left front wheel 142 are braked.

Due to adjustment error between the right front wheel brake 144 and the left front wheel brake 146 and/or age deterioration of the right brake cable 176 and the left brake cable 182, the right front wheel brake 144 and the left front wheel brake 146 may operate differently even though the right brake cable 176 and the left brake cable 182 are the same in the pulled-out amount. For example, when the inner cable 94a of the brake cable 94 is relatively pulled into the outer cable 94b, the brake pads contact the disk rotor 172 in the right front wheel brake 144, whereas the brake pads may not contact the disk rotor 178 in the left front wheel brake 146. In such a state, when the inner cable 94a of the brake cable 94 is further pulled into the outer cable 94b, the first link member 186 does not pivot any more but the second link member 188 further pivots, which brings the brake pads into contact with the disk rotor 178 in the left front wheel brake 146. As described, the brake equalizer 148 of this embodiment can cancel out imbalance of tensions acting on the right brake cable 176 and the left brake cable 182 by the pivoting of the first link member 186 and the second link member 188, and can balance out the braking force applied to the right front wheel brake 144 and the braking three applied to the left front wheel brake 146.

The brake equalizer 148 may be configured as shown in FIG. 56. In the configuration shown in FIG. 56, the brake equalizer 148 includes a central bracket 184, a first link member 802, and a second link member 804. A front end of the first link member 802 and a front end of the second link member 804 are pivotably supported by the central bracket 184 via a pivot axis 806 extending in the up-down direction. The inner cable 182a of the left brake cable 182 is connected to a rear end of the first link member 802. The inner cable 176a of the right brake cable 176 is connected to a rear end of the second link member 804. The outer cable 176b of the right brake cable 176 and the outer cable 182b of the left brake cable 182 are both fixed to the central bracket 184. The inner cable 94a of the brake cable 94 is connected to the vicinity of the center of the first link member 802. The outer cable 94b of the brake cable 94 is connected to the vicinity of the center of the second link member 804. A distance from the pivot axis 806 to the position where the inner cable 94*a* is retained and a distance from the pivot axis 806 to the position where the inner cable 182*a* is retained in the first link member 802 are substantially the same as a distance from the pivot axis 806 to the position where the outer cable 94*b* is retained and a distance from the pivot axis 806 to the position where the inner cable 176*a* is retained in the second link member 804, respectively.

When the brake lever 49 of the left handle 20 is not pushed up by the user, the inner cable 182*a* of the left brake cable 182 is relatively pushed in the outer cable 182*b* by the first link member 802 and the inner cable 176*a* of the right brake cable 176 is relatively pushed in the outer cable 176*b* by the second link member 804. In this state, the brake on the right front wheel 140 and the left front wheel 142 is released.

When the brake lever 49 of the left handle 20 is pushed up by the user, the inner cable 94*a* of the brake cable 94 is relatively pulled into the outer cable 94*b*. This causes the first link member 802 to rotate rightward, thus the inner cable 182*a* of the left brake cable 182 is thereby relatively pulled out from the outer cable 182*b*. At the same time, the second link member 804 rotates leftward, thus the inner cable 176*a* of the right brake cable 176 is thereby relatively pulled out from the outer cable 176*b*. As a result, the right front wheel 140 and the left front wheel 142 are braked. As described, the configuration shown in FIG. 56 can also cancel out the imbalance of tensions acting on the right brake cable 176 and the left brake cable 182 by the pivoting of the first link member 802 and the second link member 804, and can balance out the braking force applied to the right front wheel brake 144 and the braking force applied to the left front wheel brake 146.

Figure 57:
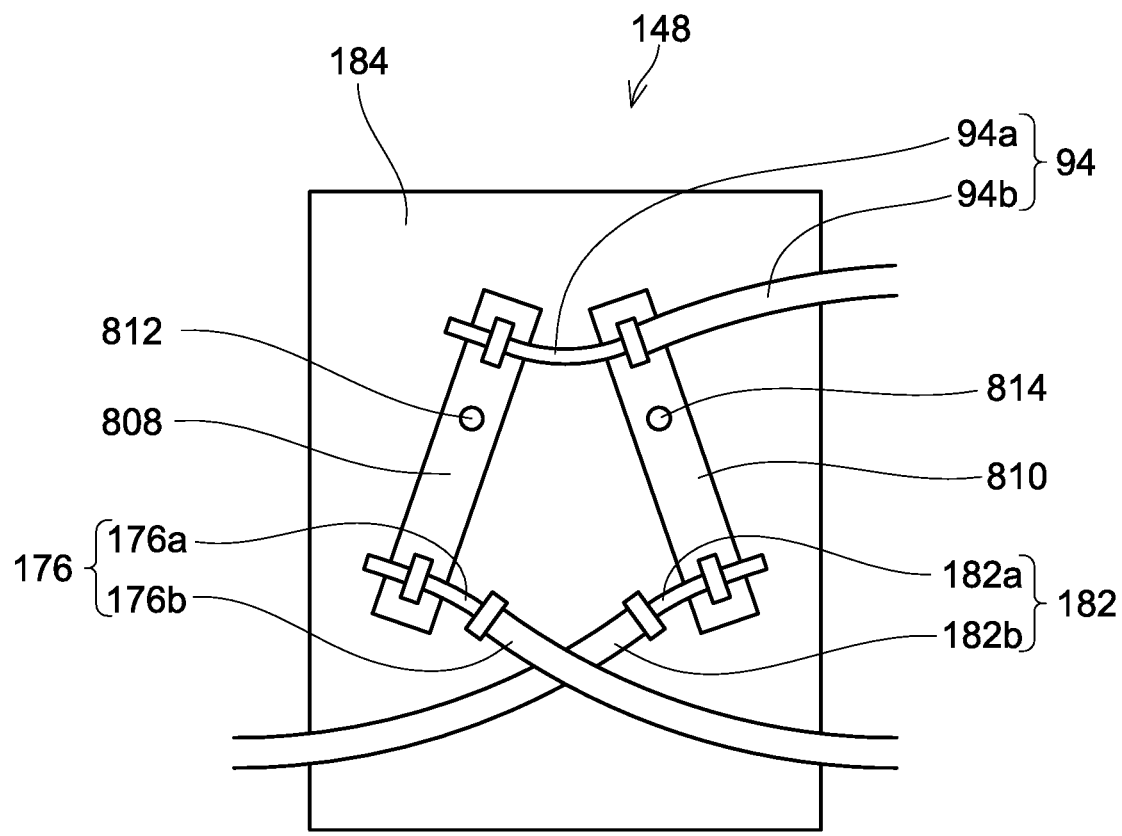
FIG. 57 is a top view of a brake equalizer 148 according to another variant.

Alternatively, the brake equalizer 148 may be configured as shown in FIG. 57. In the configuration shown in FIG. 57, the brake equalizer 148 includes the central bracket 184, a first link member 808, and a second link member 810. The first link member 808 is pivotably supported by the central bracket 184 via a pivot axis 812 extending in the up-down direction. The second link member 810 is pivotably supported by the central bracket 184 via a pivot axis 814 extending in the up-down direction. The inner cable 176*a* of the right brake cable 176 is connected to a rear end of the first link member 808. The inner cable 182*a* of the left brake cable 182 is connected to a rear end of the second link member 810. The outer cable 176*b* of the right brake cable 176 and the outer cable 182*b* of the left brake cable 182 are both fixed to the central bracket 184. The inner cable 94*a* of the brake cable 94 is connected to a front end of the first link member 808. The outer cable 94*b* of the brake cable 94 is connected to a front end of the second link member 810. A distance from the pivot axis 812 to the position where the inner cable 94*a* is retained and a distance from the pivot axis 812 to the position where the inner cable 176*a* is retained in the first link member 808 are substantially the same as a distance from the pivot axis 814 to the position where the outer cable 94*b* is retained and a distance from the pivot axis 814 to the position where the inner cable 182*a* is retained in the second link member 810, respectively.

When the brake lever 49 of the left handle 20 is not pushed up by the user, the inner cable 176*a* of the right brake cable 176 is relatively pushed into the outer cable 176*b* by the first link member 808, and the inner cable 182*a* of the left brake cable 182 is relatively pushed into the outer cable 182*b* by the second link member 810. In this state, the brake on the right front wheel 140 and the left front wheel 142 is released.

When the brake lever 49 of the left handle 20 is pushed up by the user, the inner cable 94*a* of the brake cable 94 is relatively pulled into the outer cable 94*b*. This causes the first link member 808 to pivot such that its front end moves rightward and its rear end moves leftward, thus the inner cable 176*a* of the right brake cable 176 is relatively pulled out from the outer cable 176*b*. At the same time, the second link member 810 pivots such that its front end moves leftward and its rear end moves rightward, thus the inner cable 182*a* of the left brake cable 182 is relatively pulled out from the outer cable 182*b*. As a result, the right front wheel 140 and the left front wheel 142 are braked. As described, the configuration of FIG. 57 can also cancel out the imbalance of tensions acting on the right brake cable 176 and the left brake cable 182 by the pivoting of the first link member 808 and the second link member 810, and can balance out the braking force applied to the right front wheel brake 144 and the braking force applied to the left front wheel brake 146.

(Motor 150)

Figure 21:
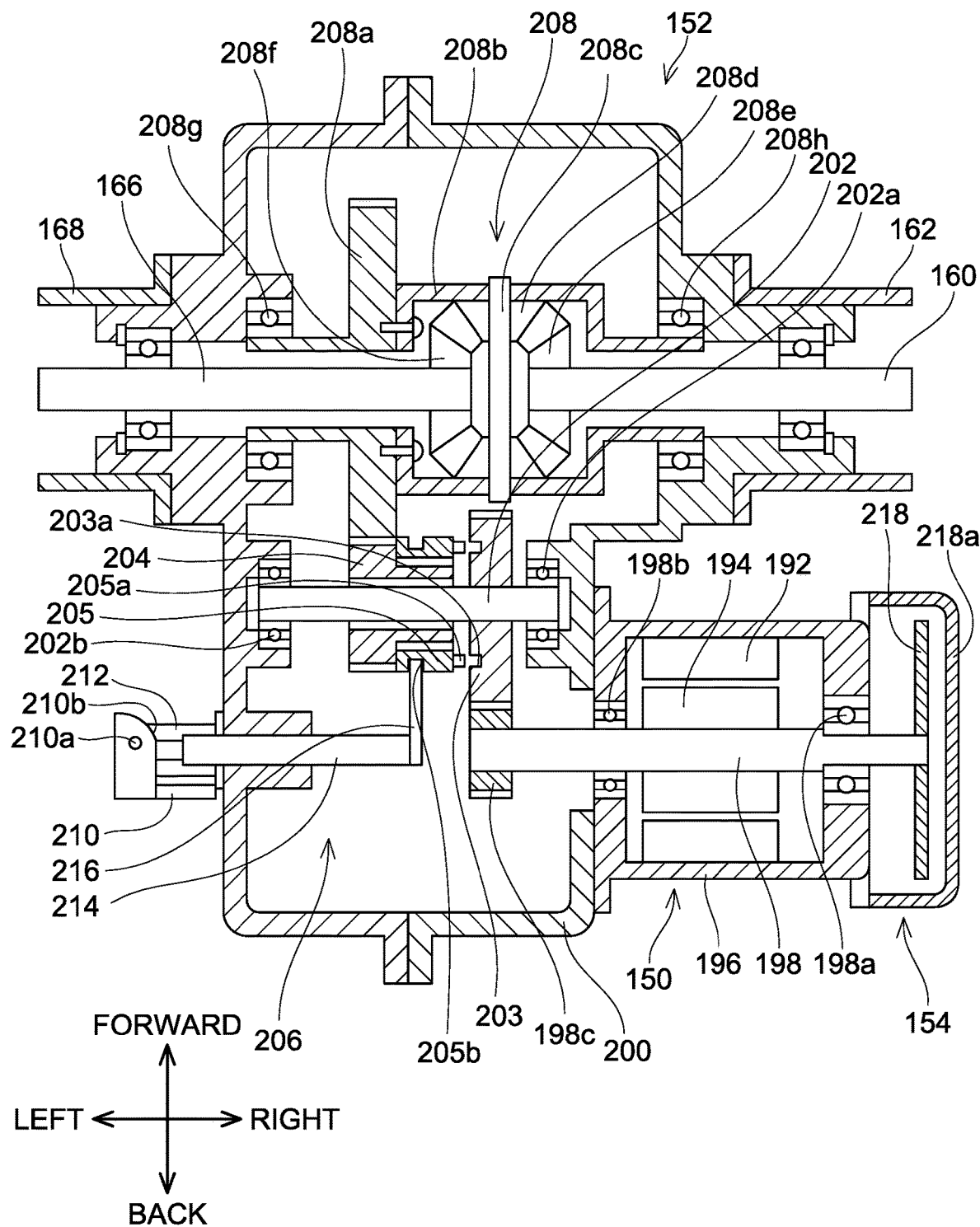
FIG. 21 is a horizontal cross-sectional view of a motor 150 and a gearbox 152 according to the embodiment.

As shown in FIG. 21, the motor 150 includes a stator 192, a rotor 194, and a motor case 196. The motor 150 is, for example, a brushless DC motor. The stator 192 and the rotor 194 are housed in the motor case 196. The motor case 196 is constituted of an aluminum material. The stator 192 is fixed to the motor case 196. The rotor 194 is fixed to a motor shaft 198. The motor shaft 198 extends in the right-left direction and is rotatably supported by the motor case 196 via bearings 198*a* and 198*b*. A left end of the motor shaft 198 is connected to the gearbox 152. A right end of the motor Shaft 198 is located outside of the motor case 196 and is connected to the dead man's brake 154. The motor 150 is connected to the battery box 8 via a power cable (not shown). The motor 150 is supplied with power from the battery packs 112. Operation of the motor 150 is controlled by the control board 108.

(Gearbox 152)

The gearbox 152 includes a gear case 200, an intermediate shaft 202, a clutch mechanism 206, and a differential mechanism 208. The gear case 200 is constituted of an aluminum material. The right axle case 162, the left axle case 168, and the gear case 200 are fixed with screws. The motor case 196 is screwed and fixed to the gear case 200. The gear case 200 is screwed and fixed to the central bracket 184 of the central frame pipe 136 via a support bracket (not shown).

The intermediate shaft 202 extends in the right-left direction and is rotatably supported by the gear case 200 via bearings 202*a* and 202*b*. The intermediate shaft 202 includes a first gear 203, a second gear 204, and a dog clutch 205. The first gear 203 is fixed to the intermediate shaft 202. The first gear 203 meshes with a spur gear 198*c* disposed on the motor shaft 198. The first gear 203 includes an engagement recess 203*a* that is recessed rightward. The second gear 204 is immovable in the right-left direction with respect to the intermediate shaft 202 and is rotatably supported by the intermediate shaft 202. The dog clutch 205 is movable in the right-left direction with respect to the second gear 204 and is supported by the second gear 204 in a non-rotatable manner. The dog clutch 205 includes an engagement projection 205*a* that projects rightward and is configured to engage with the engagement recess 203*a* of the first gear 203 and an engagement groove 205*b* that circumferentially extends in an outer circumferential surface of the dog clutch 205.

The clutch mechanism 206 includes a clutch lever 210, a support bracket 212, a rod 214, and a selector 216. The clutch lever 210 and the support bracket 212 are disposed outside the gear case 200. The support bracket 212 is screwed and fixed to the gear case 200. The clutch lever 210 is pivotably supported by the support bracket 212 about a pivot axis 210*a*. The clutch lever 210 includes a cam surface 210*b*. The rod 214 extends in the right-left direction and penetrates the gear case 200 from the inside to the outside thereof. The rod 214 is supported by the gear case 200 and is slidable in the right-left direction. A left end of the rod 214 is located to face the cam surface 210*b* of the clutch lever 210. The selector 216 is fixed to a right end of the rod 214, and the selector 216 is engaged with the engagement groove 205*b* of the dog clutch 205. The rod 214 is biased leftward with respect to the gear case 200 by a compression spring (not shown). Thus, the left end of the rod 214 is always in contact with the cam surface 210*b* of the clutch lever 210. The cam surface 210*b* of the clutch lever 210 has a shape that allows the rod 214 to move leftward when the clutch lever 210 is pushed toward the support bracket 212 (see FIG. 21) and allows the rod 214 to move rightward when the clutch lever 210 is pulled away from the support bracket 212 (see FIG. 22).

The differential mechanism 208 includes a ring gear 208*a*, a pillion case 208*b*, a pinion shaft 208*c*, a pinion gear 208*d*, a right drive gear 208*e*, and a left drive gear 208*f*. The ring gear 208*a* meshes with the second gear 204 of the intermediate shaft 202. The pinion case 208*b* is screwed and fixed to the ring gear 208*a* and rotates integrally with the ring gear 208*a*. The ring gear 208*a* is rotatably supported by the gear case 200 via a bearing 208*g*, and the pinion case 208*b* is rotatably supported by the gear case 200 via a bearing 208*h*. The pinion shaft 208*c* is rotatably supported by the pinion case 208*b*. The pinion gear 208*d* is fixed to the pinion shaft 208*c*. The right drive gear 208*e* is fixed to the right drive shaft 160 and meshes with the pinion gear 208*d*. The left drive gear 208*f* is fixed to the left drive shaft 166 and meshes with the pinion gear 208*d*.

As shown in FIG. 21, when the clutch lever 210 of the clutch mechanism 206 is pushed down, the rod 214 and the selector 216 moves leftward and the engagement projection 205*a* of the dog clutch 205 separates from the engagement recess 203*a* of the first gear 203. In this state, the second gear 204 does not rotate even when the first gear 203 rotates. Thus, power from the motor shaft 198 is not transmitted to the ring gear 208*a* of the differential mechanism 208. In this case, when one of the right drive shaft 160 and the left drive shaft 166 rotates, the differential mechanism 208 rotates the other of the right drive shaft 160 and the left drive shaft 166 at the same rotational speed in the opposite direction.

Figure 22:
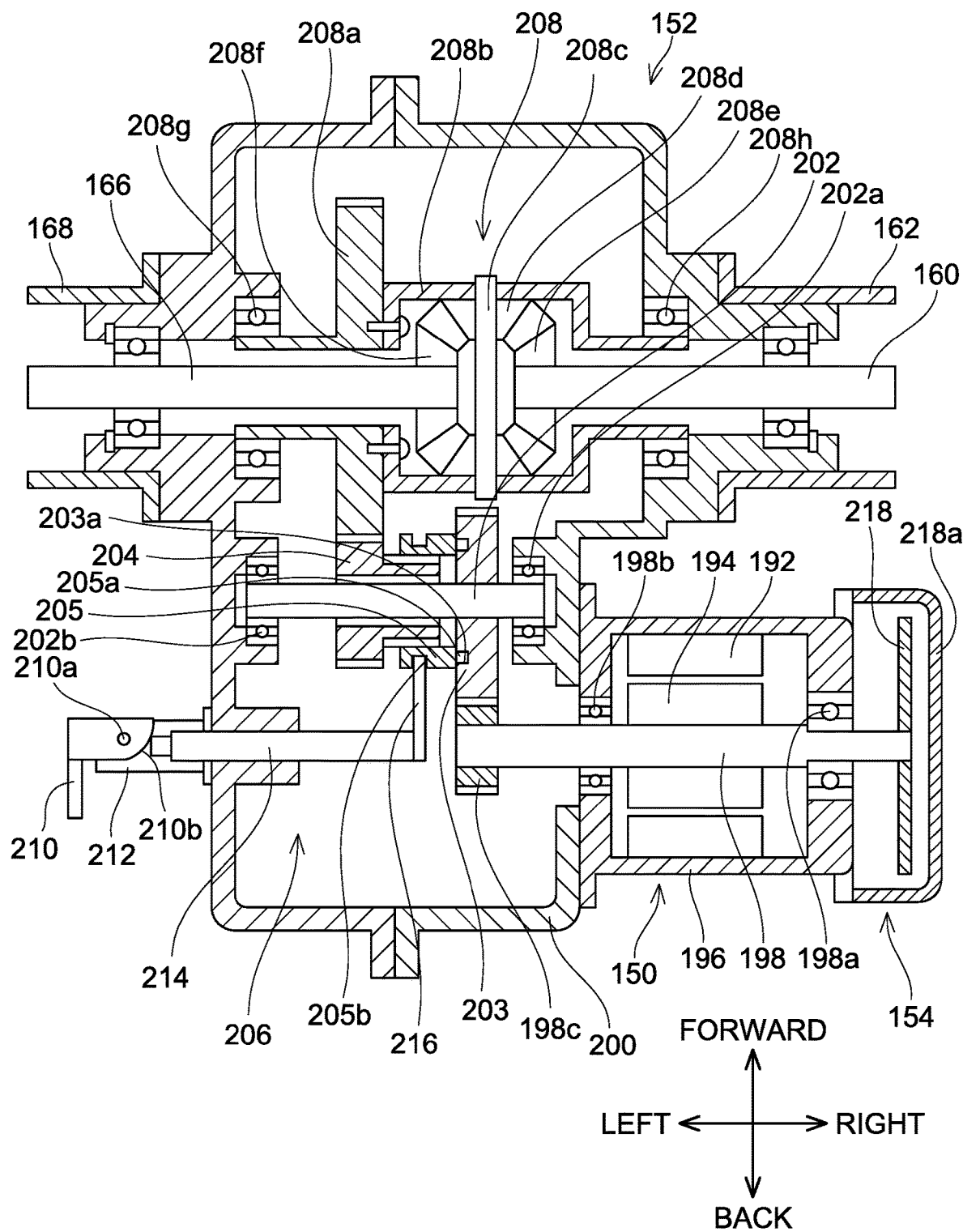
FIG. 22 is a horizontal cross-sectional view of the motor 150 and the gearbox 152 according to the embodiment with a clutch lever 210 pulled up.

As shown in FIG. 22, when the clutch lever 210 of the clutch mechanism 206 is pulled up, the rod 214 and the selector 216 moves rightward and the engagement projection 205*a* of the dog clutch 205 engages with the engagement recess 203*a* of the first gear 203. In this state, the second gear 204 rotates when the first gear 203 rotates. Thus, the power from the motor shaft 198 is transmitted to the ring gear 208*a* of the differential mechanism 208 via the intermediate shaft 202. In this case, the differential mechanism 208 rotates the right drive shaft 160 and the left drive shaft 166 according to the power transmitted to the ring gear 208*a*.

(Dead Man's Brake 154)

Figure 23:
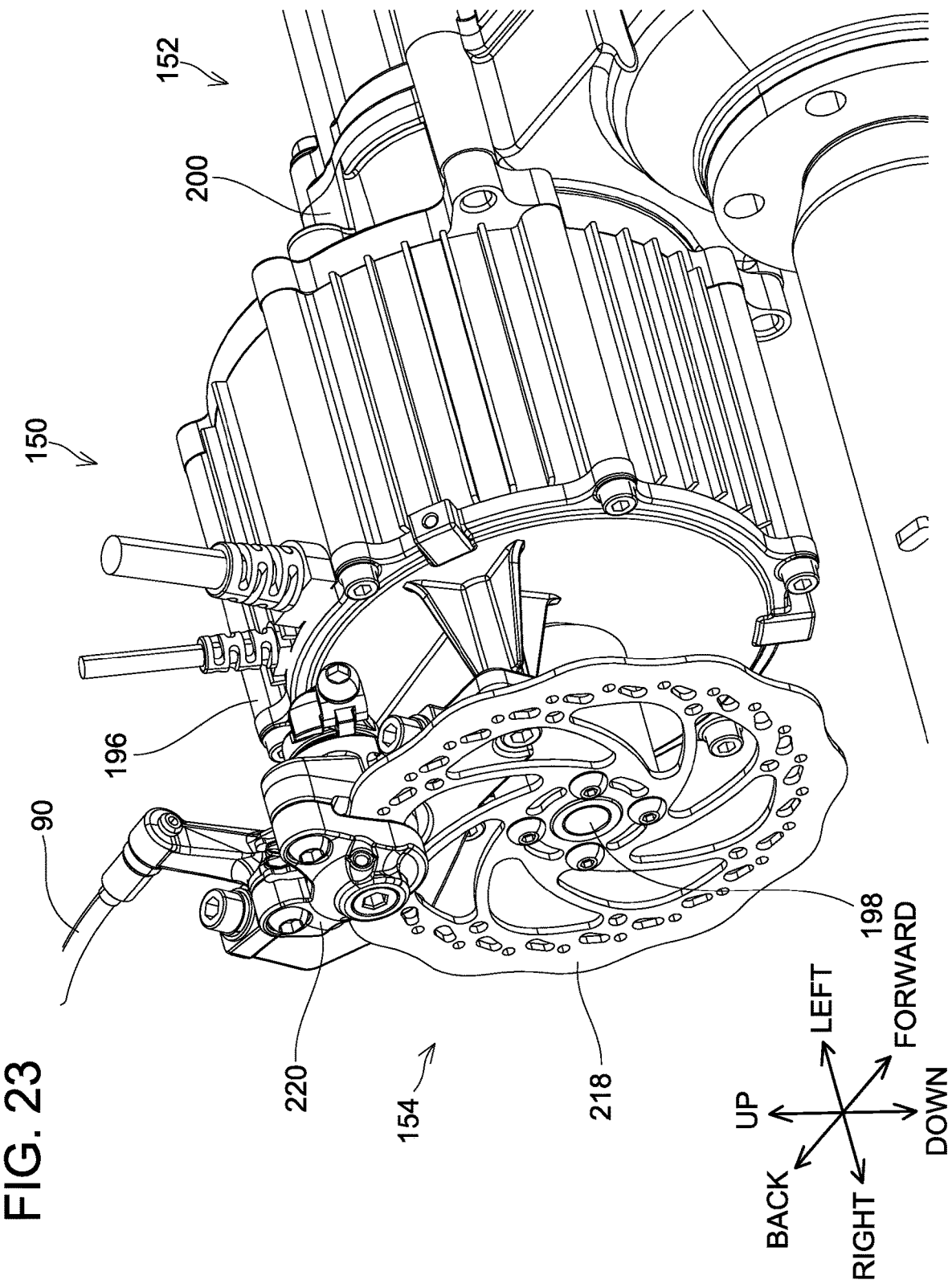
FIG. 23 is a perspective view of a dead man's brake 154 according to the embodiment, when seen from upper-front-right side.

As shown in FIG. 23, the dead man's brake 154 includes a disk rotor 218 and a brake caliper 220. The disk rotor 218 is fixed to the right end of the motor shaft 198 of the motor 150. Although not shown in FIG. 23, the disk rotor 218 is covered by a disk cover 218*a* (see FIGS. 21 and 22) fixed to the motor case 196. The brake caliper 220 is disposed corresponding to the disk rotor 218. The brake caliper 220 is supported by the motor case 196. The dead man's cable 90 extending from the right handle 18 is connected to the brake caliper 220. The brake caliper 220 biases a pair of brake pads (not shown) by a return spring (not shown) in a direction that brings the pair to sandwich the vicinity of outer edge of the disk rotor 218. Thus, when the inner cable 90*a* of the dead man's cable 90 is relatively pushed out from the outer cable 90*b*, the pair of brake pads sandwich the vicinity of the outer edge of the disk rotor 218, which applies a frictional force to the disk rotor 218 and brakes the motor shaft 198. When the inner cable 90*a* of the dead man's cable 90 is relatively pulled into the outer cable 90*b*, the pair of brake pads separates away from the disk rotor 218 against the biasing force of the return spring, which releases the brake on the motor shaft 198. The dead man's brake 154 may be a so-called disk brake as described above, or may be another type of brake such as a drum brake or a band brake.

While the right front wheel 140 and left front wheel 142 are rotated by the power of the motor 150, the motor shaft 198 is rotated at high rotational speed and low torque, whereas the right drive shaft 160 and left drive shaft 166 are rotated at low rotational speed and high torque. Since braking the motor shaft 198 by the dead man's brake 154 requires small torque for the brake as compared to braking the right front wheel 140 by the right front wheel brake 144 and braking the left front wheel 142 by the left front wheel brake 146, it can surely stop the rotation of the right front wheel 140 and the left front wheel 142.

Figure 58:
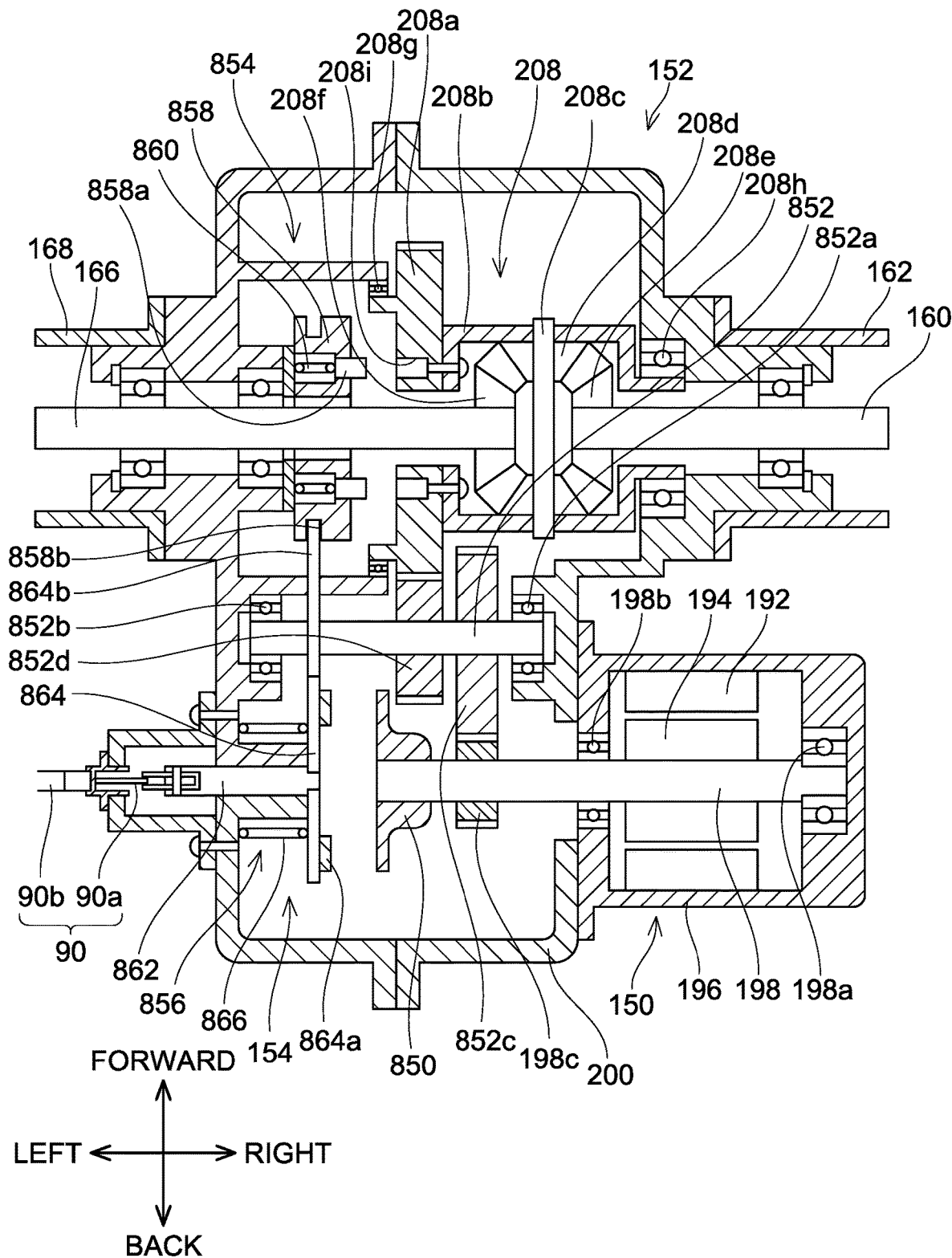
FIG. 58 is a horizontal cross-sectional view of a motor 150 and a gearbox 152 according to a variant.
Figure 59:
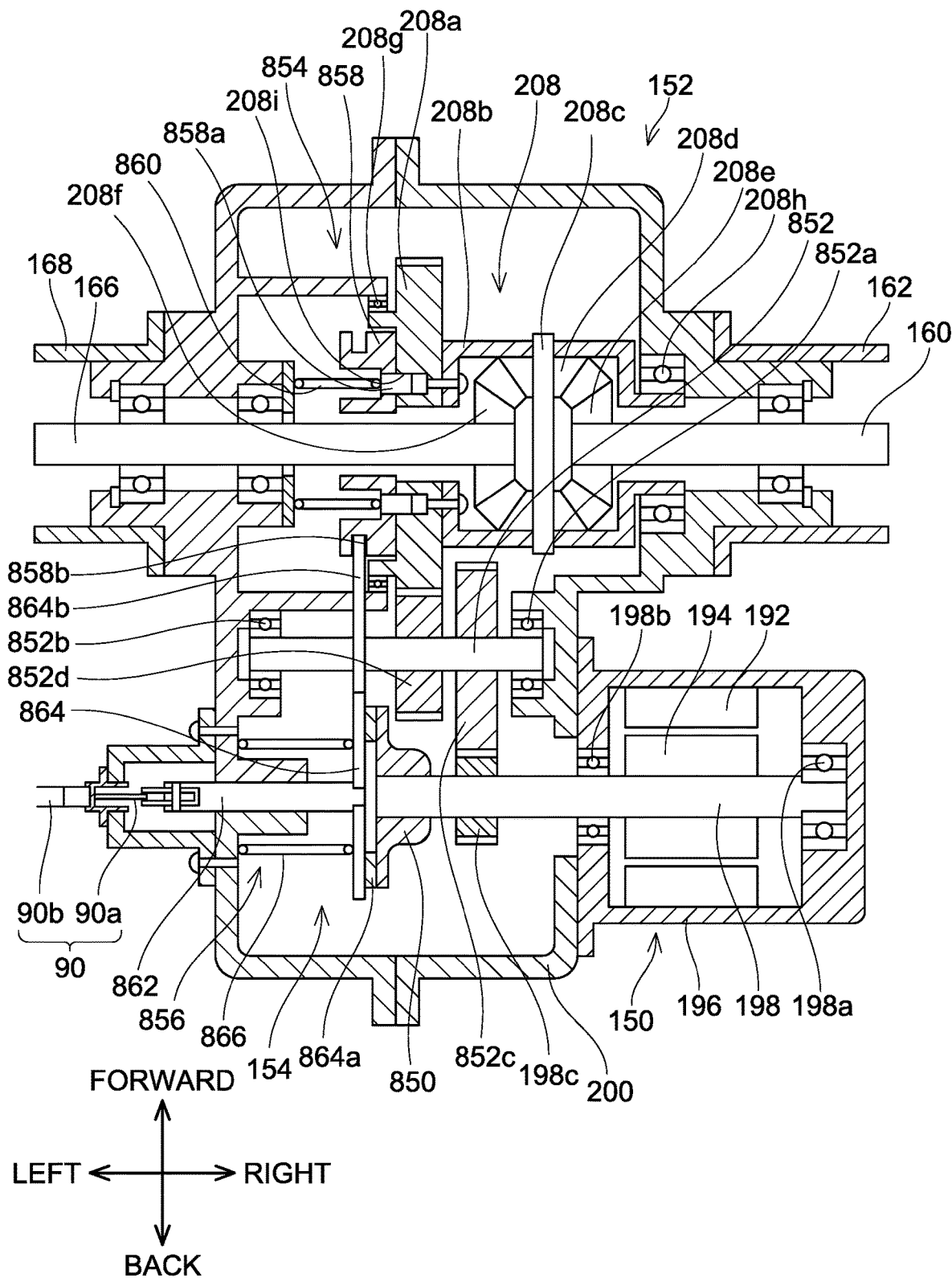
FIG. 59 is a horizontal cross-sectional view of the motor 150 and the gearbox 152 according to the variant with an inner cable 90a of a dead man's cable 90 pushed out relative to an outer cable 90b.

The motor 150, the gearbox 152, and the dead man's brake 154 may be configured as shown in FIGS. 58 and 59. In this configuration, the right end of the motor shaft 198 is not located outside of the motor case 196. Further, a brake disk 850 is fixed to the left end of the motor shaft 198.

In the configuration shown in FIGS. 58 and 59, the gearbox 152 includes the gear case 200, a relay shaft 852, the differential mechanism 208, a differential look mechanism 854, and a brake mechanism 856. In this configuration, the brake disk 850 and the brake mechanism 856 configure the dead man's brake 154. The relay shaft 852 extends in the right-left direction and is rotatably supported by the gear case 200 via bearings 852*a* and 852*b*. The relay shaft 852 includes a spur gear 852*c* and a spur gear 852*d*. The spur gear 852*c* meshes with the spur gear 198*c* disposed on the motor shaft 198. The spur gear 852*d* meshes with the ring gear 208*a* of the differential mechanism 208.

The differential lock mechanism 854 includes a dog clutch 858 and a compression spring 860. The dog clutch 858 is slidable in the right-left direction with respect to the left drive shaft 166 and is supported by the left drive Shaft 166 to rotate integrally with the left drive shaft 166. The dog clutch 858 includes an engagement projection 858*a* projecting rightward and an engagement groove 858*b* circumferentially extending in an outer circumferential surface of dog clutch 858. In this configuration, the ring gear 208*a* of the differential mechanism 208 includes an engagement recess 208*i* configured to engage with the engagement projection 858*a* of the dog clutch 858. The compression spring 860 biases the dog clutch 858 rightward (i.e., in a direction that brings the dog clutch 858 close to the ring gear 208*a*) with respect to the gear case 200.

The brake mechanism 856 includes a rod 862, a brake plate 864, and a compression spring 866. The rod 862 extends in the right-left direction and penetrates the gear case 200 from the inside to the outside thereof. The rod 862 is supported by the gear case 200 and is slidable in the right-left direction. The inner cable 90*a* of the dead man's cable 90 is connected to a left end of the rod 862. The outer cable 90b of the dead man's cable 90 is connected to the gear case 200. The brake plate 864 is fixed to a right end of the rod 862. The brake plate 864 is provided with a brake shoe 864a disposed corresponding to the brake disk 850 and a selector 864b configured to engage with the engagement groove 858b of the dog clutch 858. The compression spring 866 biases the brake plate 864 rightward (i.e., in a direction that brings the brake plate 864 close to the brake disk 850) with respect to the gear case 200.

As shown in FIG. 59, when the inner cable 90a of the dead man's cable 90 is relatively pushed out from the outer cable 90b, the rod 862 and the brake plate 864 is moved rightward by the biasing force of the compression spring 866 and the brake shoe 864a is pressed against the brake disk 850. This applies a frictional force to the brake disk. 850 and brakes the motor shaft 198. Further, when the selector 864b disposed on the brake plate 864 is moved rightward, the dog clutch 858 is also moved rightward by the biasing three of the compression spring 860 and the engagement projection 858a of the dog clutch 858 engages with the engagement recess 208i of the ring gear 208a. In this case, at the differential mechanism 208, the ring gear 208a is fixed to the left drive shaft 166, and the right drive shaft 160 and the left drive shaft 166 rotate at the same rotational speed in the same direction. Braking the rotation of the motor shah 198 by the dead man's brake 154 results in braking the rotation of the ring gear 208a, thereby braking the rotation of the right drive shaft 160 and the left drive shaft 166.

As shown in FIG. 58, when the inner cable 90a of the dead man's cable 90 is relatively pulled into the outer cable 90b, the rod 862 and the brake plate 864 are moved leftward and the brake shoe 864a is separated away from the brake disk 850. This releases the brake on the motor shaft 198. Further, when the selector 864b disposed on the brake plate 864 is moved leftward; the dog clutch 858 is also moved leftward and the engagement projection 858a of the dog clutch 858 is separated from the engagement recess 208i of the ring gear 208a. In this case, the differential mechanism 208 rotates the right drive shaft 160 and the left drive shaft 166 according to the power transmitted from the motor shaft 198 to the ring gear 208a via the relay shaft 852.

(Right Headlight 156 and Left Headlight 158)

As shown in FIG. 17, the right headlight 156 is supported by the right bracket 164. The right headlight 156 is connected to the battery box 8 via the power supply cable 156a. The left headlight 158 is supported by the left bracket 170. The left headlight 158 is connected to the right headlight 156 via a relay cable 158a. The right headlight 156 and the left headlight 158 are supplied with electric power from the battery packs 112. Operations of the right headlight 156 and the left headlight 158 are controlled by the control board 108.

(Rear Wheel Unit 14)

Figure 24:
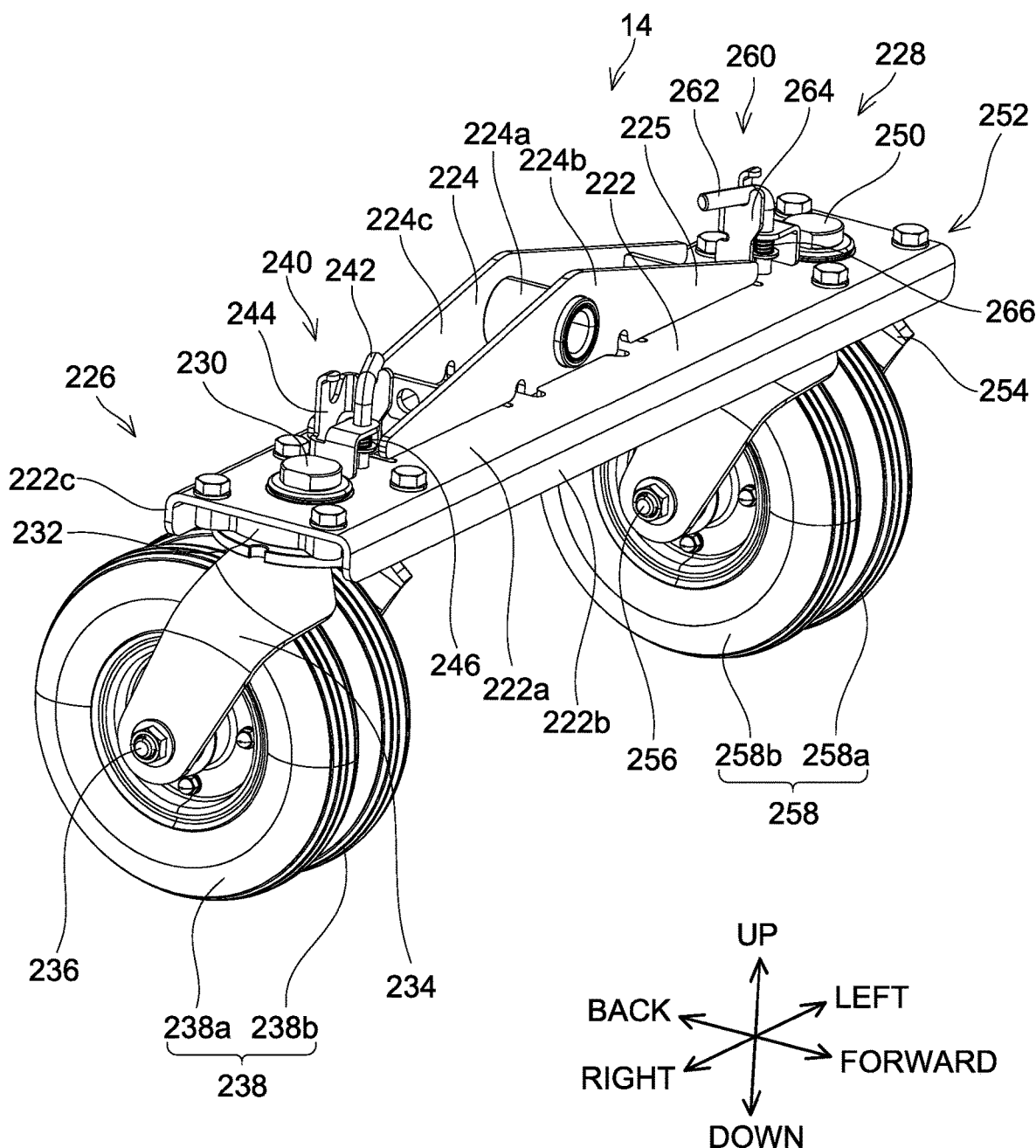
FIG. 24 is a perspective view of a rear wheel unit 14 according to the embodiment, when seen from upper-front-right side.
Figure 25:
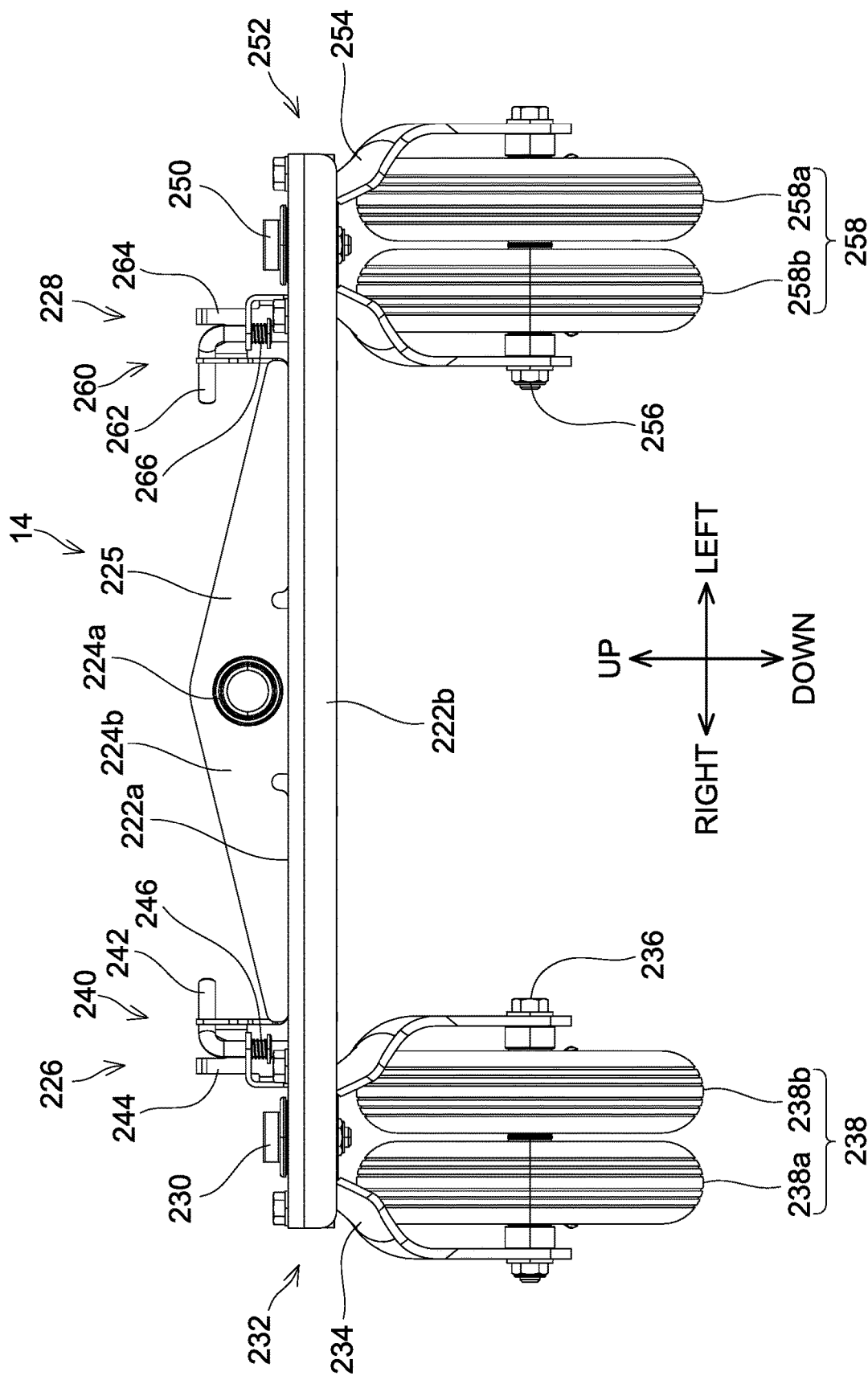
FIG. 25 is a front view of the rear wheel unit 14 according to the embodiment.
Figure 26:
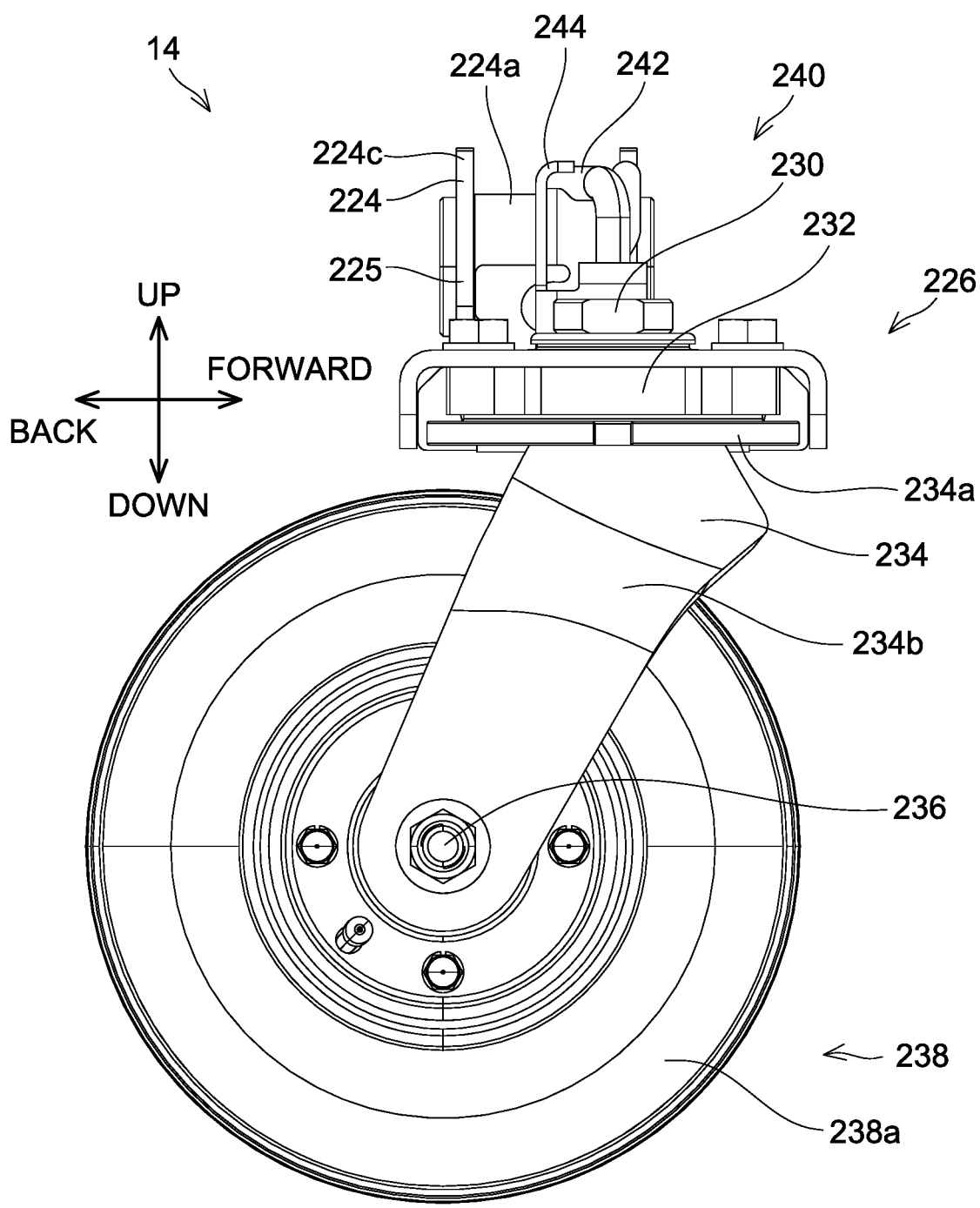
FIG. 26 is a right side view of the rear wheel unit 14 according to the embodiment.

As shown in FIGS. 24, 25, and 26, the rear wheel unit 14 includes a base plate 222, a hinge 224, a right caster 226, and a left caster 228. The base plate 222 and the hinge 224 are both constituted of a steel material. The base plate 222 includes a web 222a extending along the front-rear direction and the right-left direction, a front flange 222b bent downward from a front end of the web 222a, and a rear flange 222c bent downward from a rear end of the web 222a. The hinge 224 includes a support pipe 224a extending in the front-rear direction, a front support plate 224b extending in the up-down direction and the right-left direction, and a rear support plate 224c extending in the up-down direction and the right-left direction. The front support plate 224b has a substantially triangular shape and is welded to the vicinity of a front end of the support pipe 224a with the support pipe 224a penetrating the center of the front support plate 224b. The rear support plate 224c has a substantially triangular shape and is welded to the vicinity of a rear end of the support pipe 224a with the support pipe 224a penetrating the center of the rear support plate 224c. Lower ends of the front support plate 224b and the rear support plate 224c are welded to an upper surface of the web 222a of the base plate 222. In the following description, the base plate 222 and the hinge 224 may be collectively referred to as a rear wheel frame 225.

(Right Caster 226)

The right caster 226 includes a center pin 230, a top plate 232, a bracket 234, a wheel shaft 236, a right rear wheel 238, and a lock mechanism 240.

Figure 27:
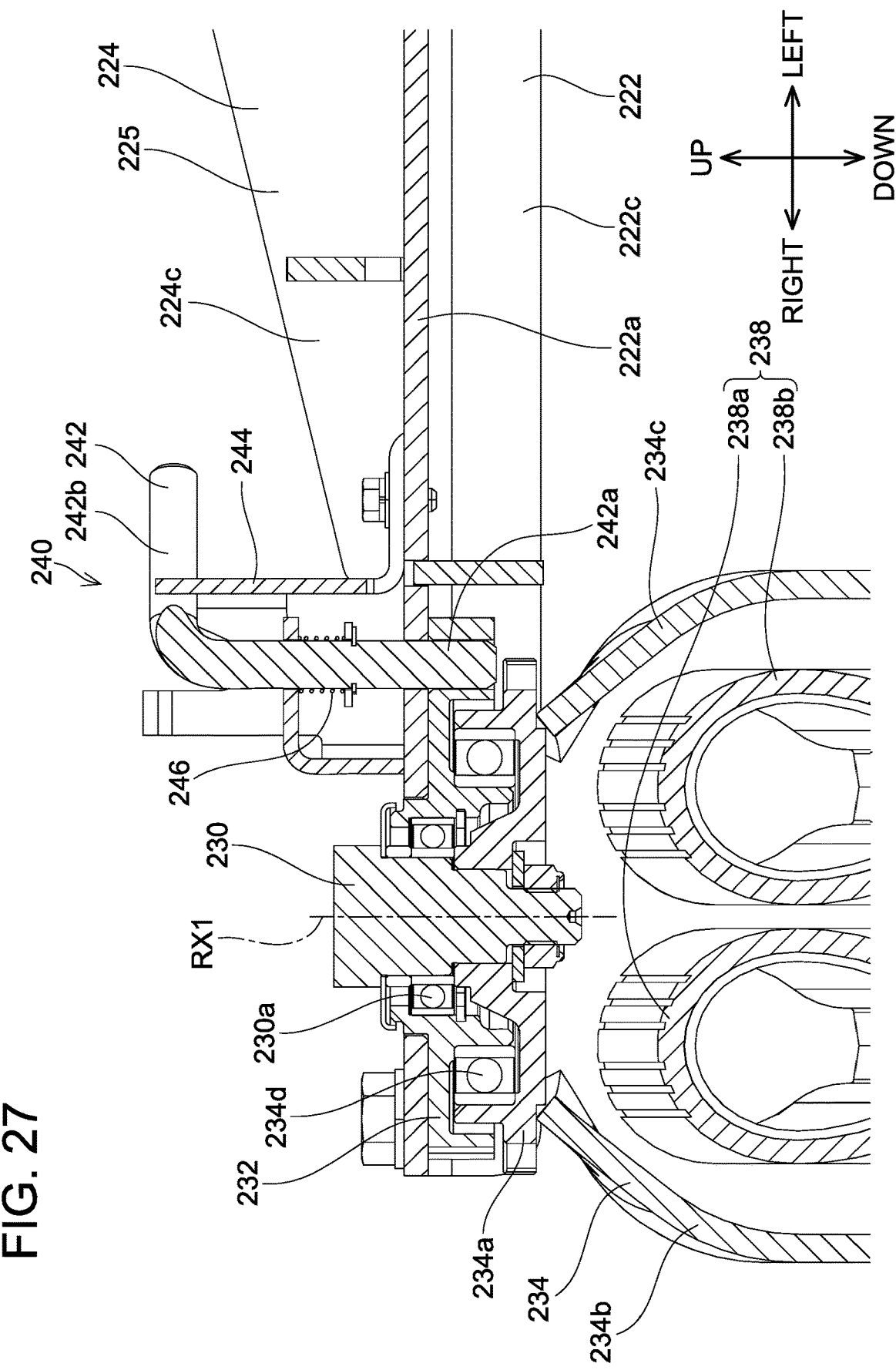
FIG. 27 is a vertical cross-sectional view of a center pin 230, a top plate 232, a bracket 234, and a lock mechanism 240 of a right caster 226 according to the embodiment.

As shown in FIG. 27, the center pin 230 penetrates the web 222a of the base plate 222 in the up-down direction. The center pin 230 is rotatably supported by the top plate 232 via a bearing 230a. The top plate 232 is screwed and fixed to the base plate 222 with an upper surface of the top plate 232 being in contact with a lower surface of the web 222a of the base plate 222. The bracket 234 includes a retainer 234a, a right arm 234b, and a left arm 234c. The retainer 234a, the right arm 234b, and the left arm 234c are configured integrally. The center pin 230 penetrates the retainer 234a in the up-down direction. The retainer 234a is fixed to a lower end of the center pin 230. The retainer 234a is rotatably supported by the top plate 232 via a bearing 234d. The right arm 234b extends rearward and downward from a right end of the retainer 234a. The left arm 234c extends rearward and downward from a left end of the retainer 234a.

Figure 28:
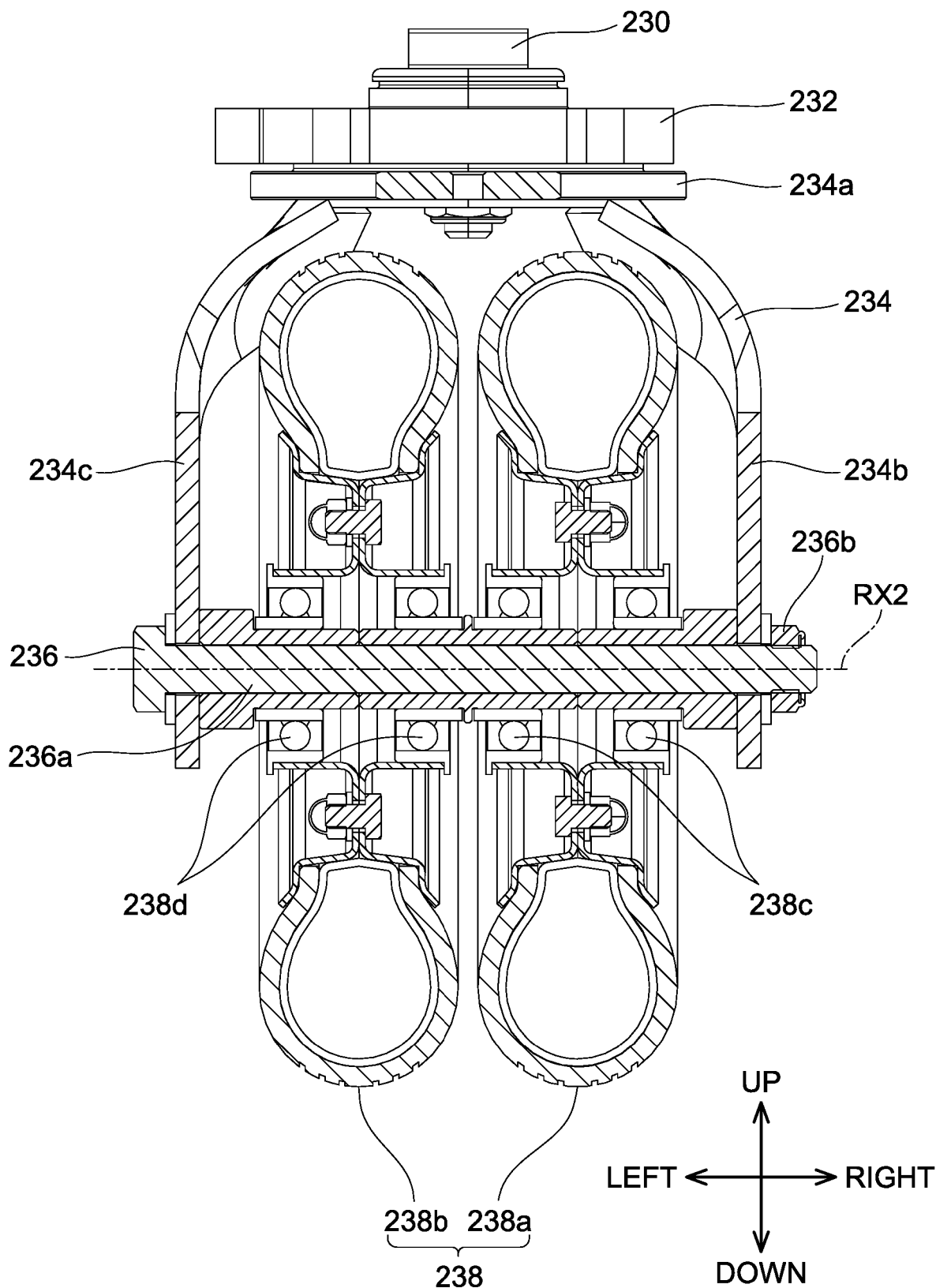
FIG. 28 is a vertical cross-sectional view of the bracket 234, a wheel shaft 236, and a right rear wheel 238 of the right caster 226 according to the embodiment.

As shown in FIG. 28, the wheel shaft 236 extends in the right-left direction. The wheel shaft 236 is configured of a bolt 236a that penetrates a distal end portion of the left arm 234c to a distal end portion of the right arm 234b and a nut 236b that is screwed to the bolt 236a from the distal end side of the right arm 234b. A right end of the wheel shaft 236 is fixed to the distal end of the right arm 234b, and a left end of the wheel shaft 236 is fixed to the distal end of the left arm 234c. The right rear wheel 238 includes a first right rear wheel 238a and a second right rear wheel 238b. The first right rear wheel 238a is rotatably supported by the wheel shaft 236 via a bearing 238c. The second right rear wheel 238b is rotatably supported by the wheel shaft 236 via a bearing 238d. That is, the first right rear wheel 238a and the second right rear wheel 238b are rotatable about a rotation axis RX2, which is a central axis of the wheel shaft 236, independently of each other. Diameters of the first right rear wheel 238a and the second right rear wheel 238b are, for example, 200 mm, and widths of the first right rear wheel 238a and the second right rear wheel 238b are, for example, 100 mm. An interval between the first right rear Wheel 238a and the second right rear wheel 238b is, for example, 6 mm±2 mm.

Figure 61:
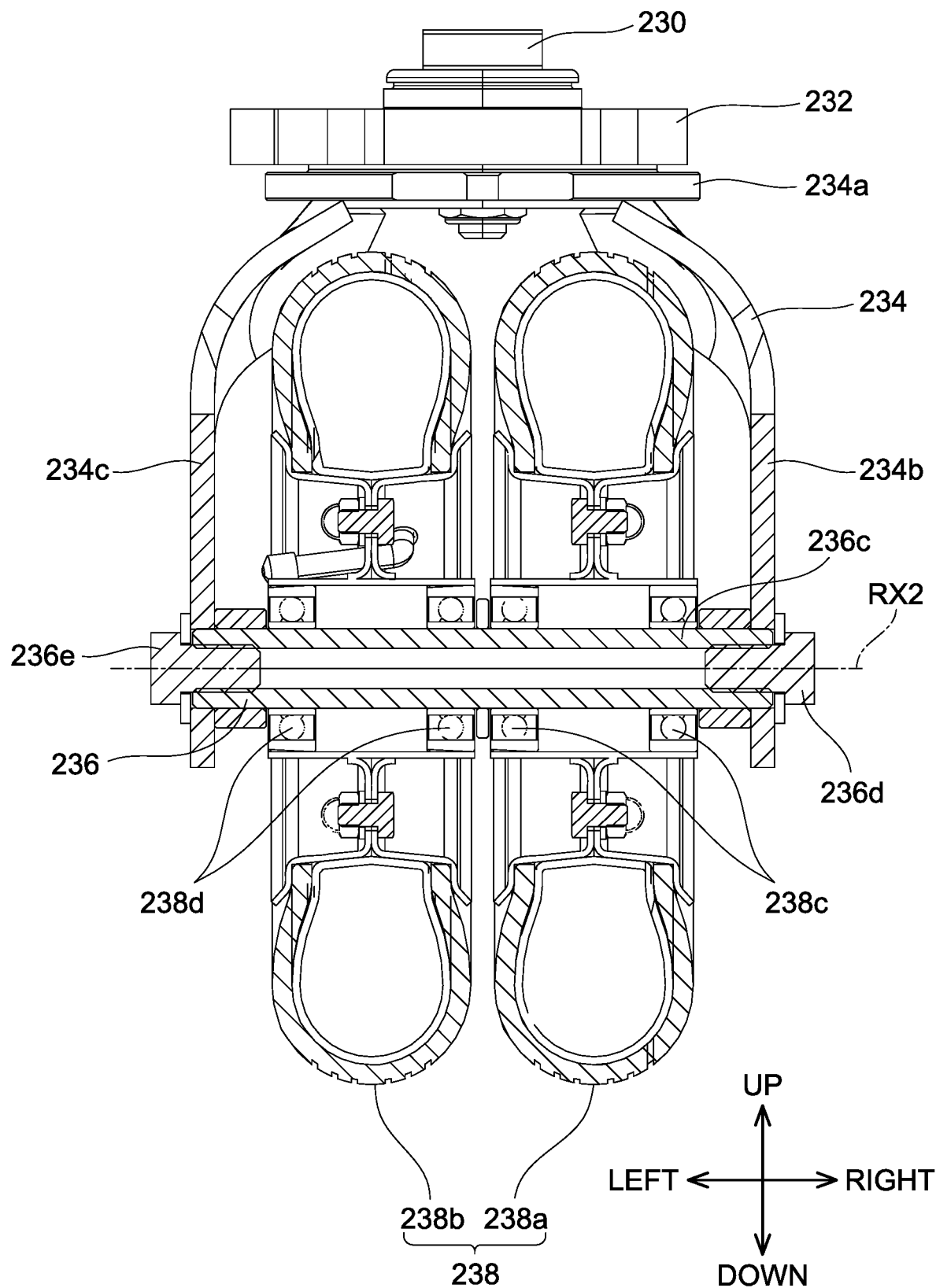
FIG. 61 is a vertical cross-sectional view of a bracket 234, a wheel shaft 236, and a right rear wheel 238 of a right caster 226 according to a variant.

As shown in FIG. 61, the wheel shaft 236 may be configured of a sleeve 236c that penetrates the distal end portion of the left arm 234c and the distal end portion of the right arm 234b and includes a threaded inner surface, a bolt 236d that is screwed into the sleeve 236c from the distal end side of the right arm 234b, and a bolt 236e that is screwed into the sleeve 236c from the distal end side of the left arm 234c, in the configuration in which the wheel shaft 236 is configured of the bolt 236a and the nut 236b as shown in FIG. 28, the tip of the bolt 236a protrudes from the nut 236b when the nut 236b is screwed to the bolt 236a, which results in increased protrusion from the bracket 234 and may diminish the aesthetic appearance of the product. The configuration in which the wheel shaft 236 is configured of the sleeve 236c and the bolts 236d and 236e, as shown in FIG. 61, can reduce the protrusion from the bracket 234 and improves the aesthetic appearance of the product.

In the right caster 226, the bracket 234, the wheel shaft 236, and the right rear wheel 238 integrally pivot, with respect to the top plate 232, on a pivot axis RX1 which is a central axis of the center pin 230. Thus, a traveling direction of the right rear wheel 238 can be changed in accordance with a traveling direction of the rear wheel unit 14.

Figure 34:
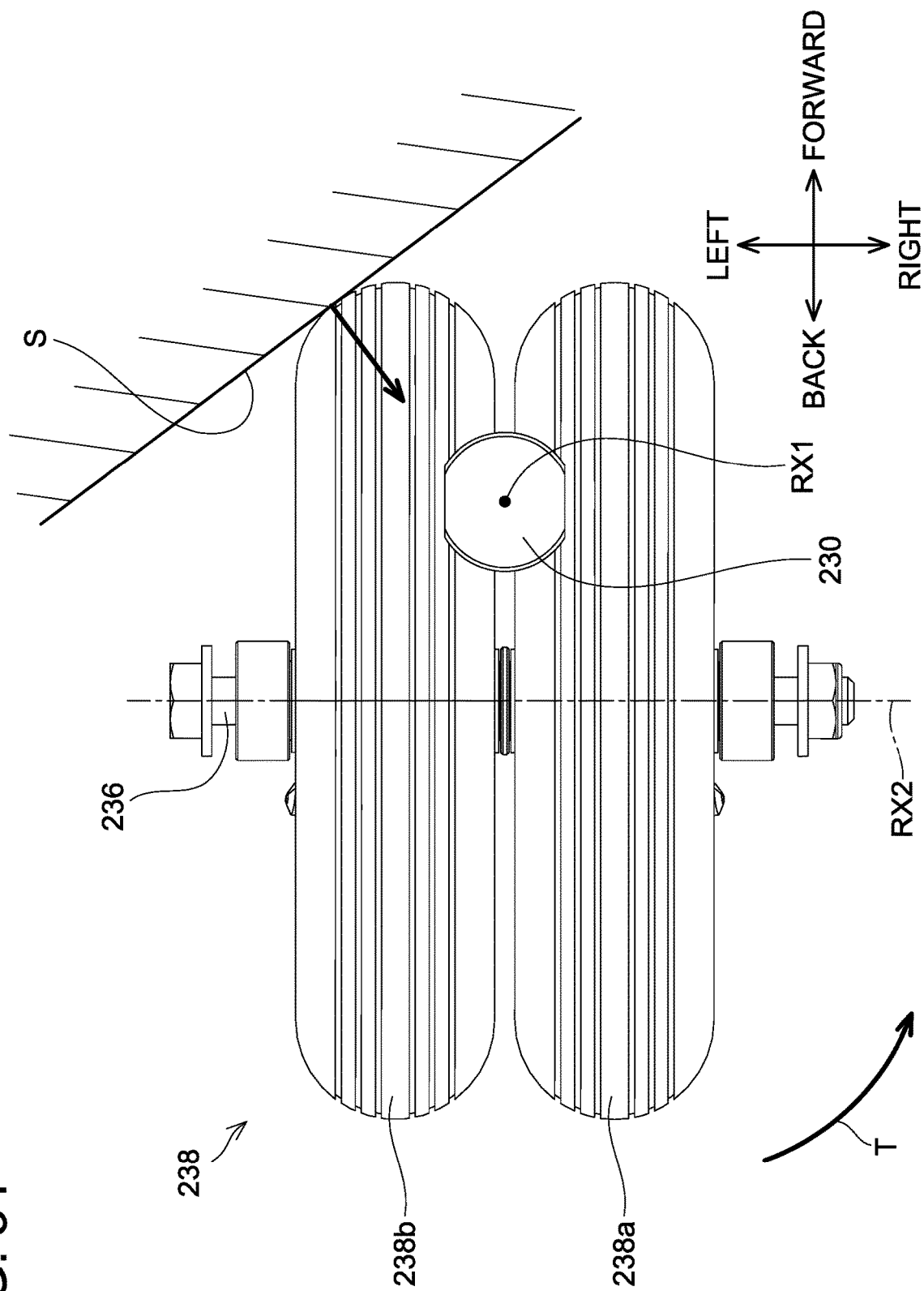
FIG. 34 is a top view of a right rear wheel 238 according to the embodiment with the right rear wheel 238 obliquely collided with a bump S.
Figure 35:
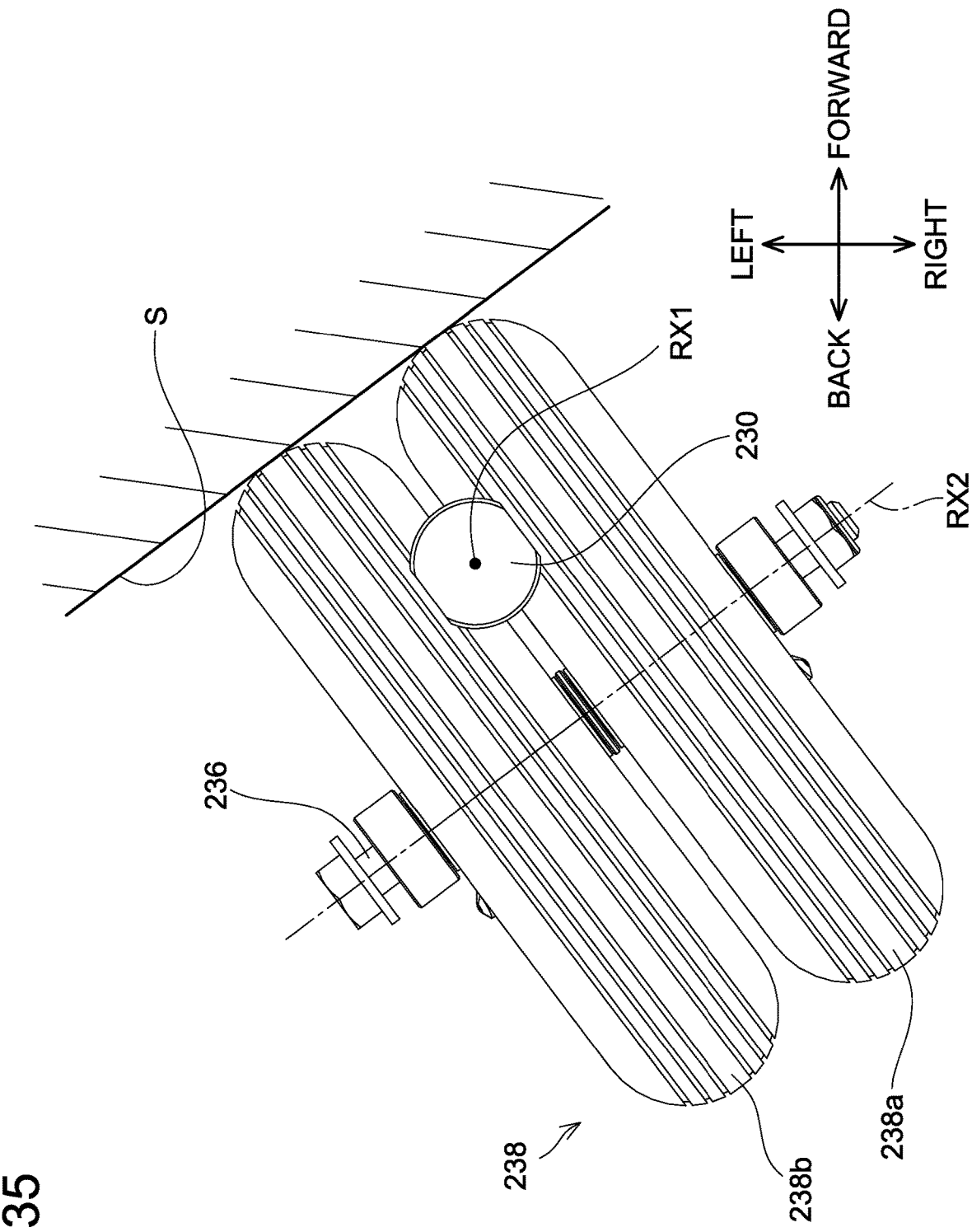
FIG. 35 is a top view of the right rear wheel 238 according to the embodiment with the right rear wheel 238 facing the bump S.

As shown in FIGS. 34 and 35, in a top plan view of the right caster 226, the rotation axis RX2, which is the central axis of the wheel shaft 236, is offset from the pivot axis RX1, which is the central axis of the center pin 230. A distance from the pivot axis RX1 to the rotation axis RX2 in the top plan view of the right caster 226 is, for example, within a range of 50 mm to 60 mm, and the distance is, for example, 55 mm.

Figure 29:
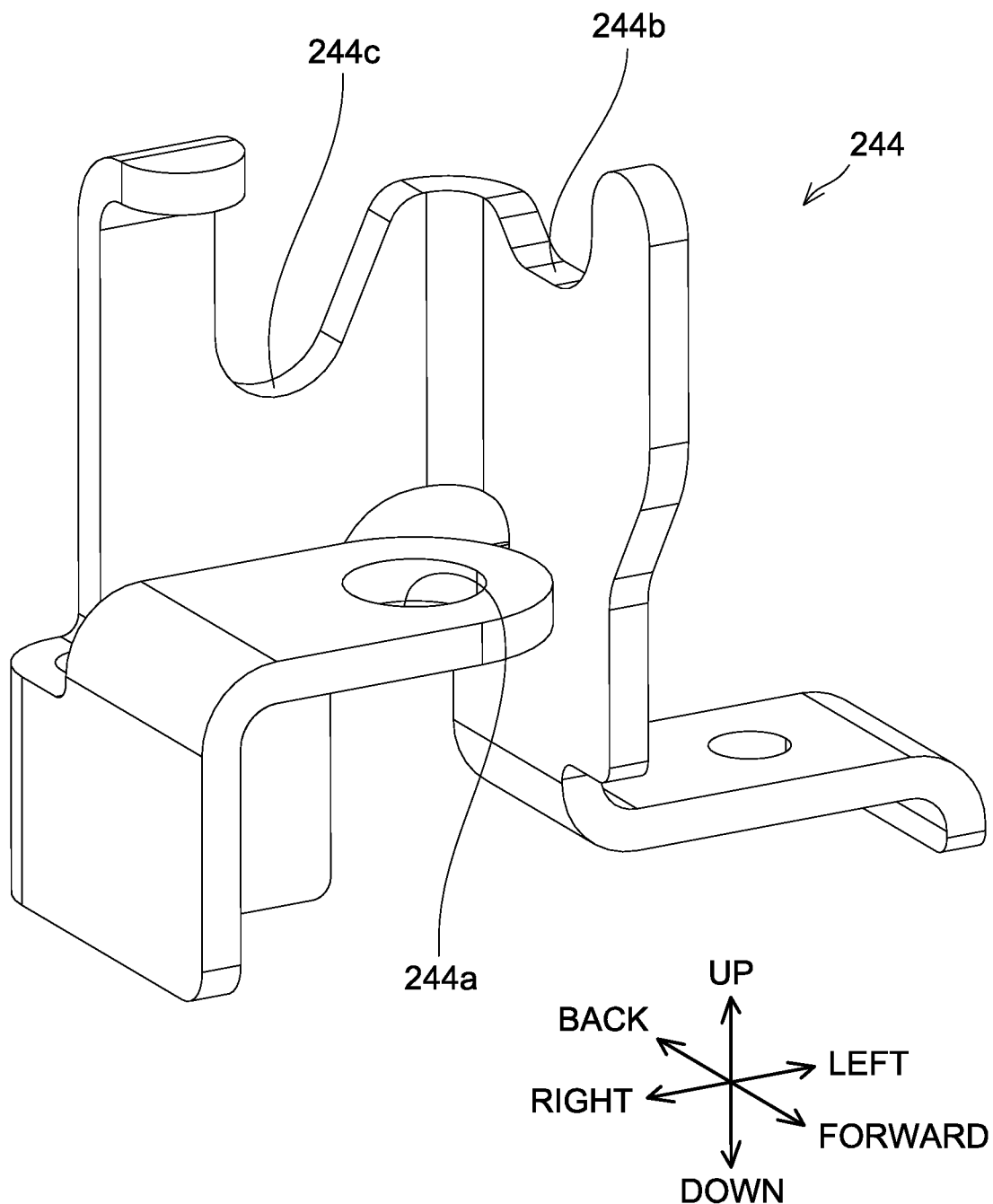
FIG. 29 is a perspective view of a support plate 244 of the lock mechanism 240 according to the embodiment, when seen from upper-front-right side.

As shown in FIG. 27, the lock mechanism 240 includes a lock pin 242, a support plate 244, and a compression spring 246. The lock pin 242 is a substantially L-shaped rod member. The lock pin 242 includes a first shaft portion 242a extending in the up-down direction and a second shaft portion 242b that is bent at an upper end of the first shaft portion 242a. The support plate 244 is screwed and fixed to the upper surface of the web 222a of the base plate 222. As shown in FIG. 29, the support plate 244 includes a through hole 244a through which the first shaft portion 242a of the lock pin 242 passes in the up-down direction. An upper end of the support plate 244 is provided with a first retainer portion 244b configured to retain the second shaft portion 242b of the lock pin 242 at a first height and a second retainer portion 244c configured to retain the second shaft portion 242b of the lock pin 242 at a second height that is lower than the first height. As shown in FIG. 27, the compression spring 246 biases the lock pin 242 downward relative to the support plate 244.

Figure 30:
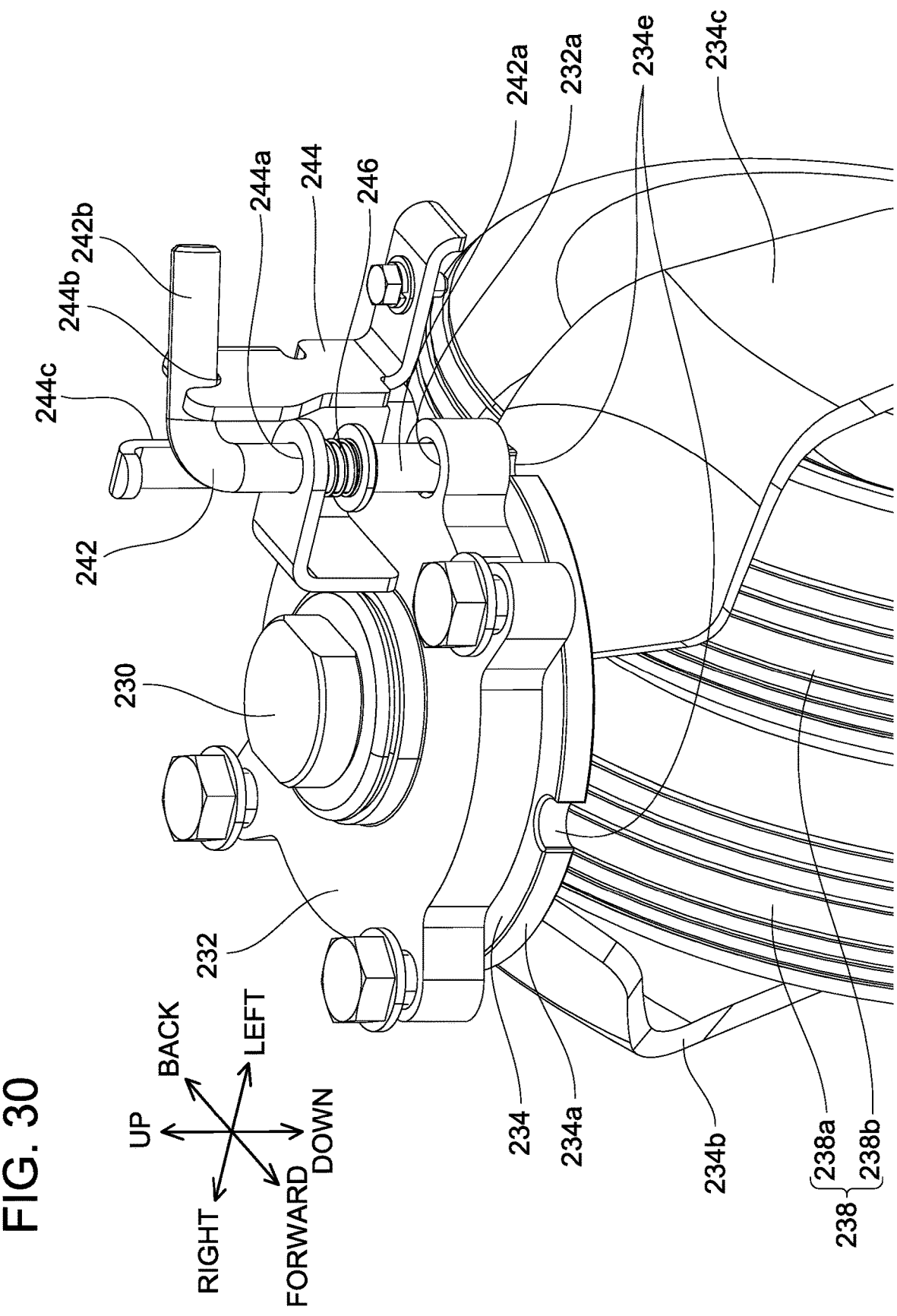
FIG. 30 is a perspective view of the right caster 226 according to the embodiment with a lock pin 242 retained by a first retainer portion 244b, when seen from upper-front-left side.
Figure 31:
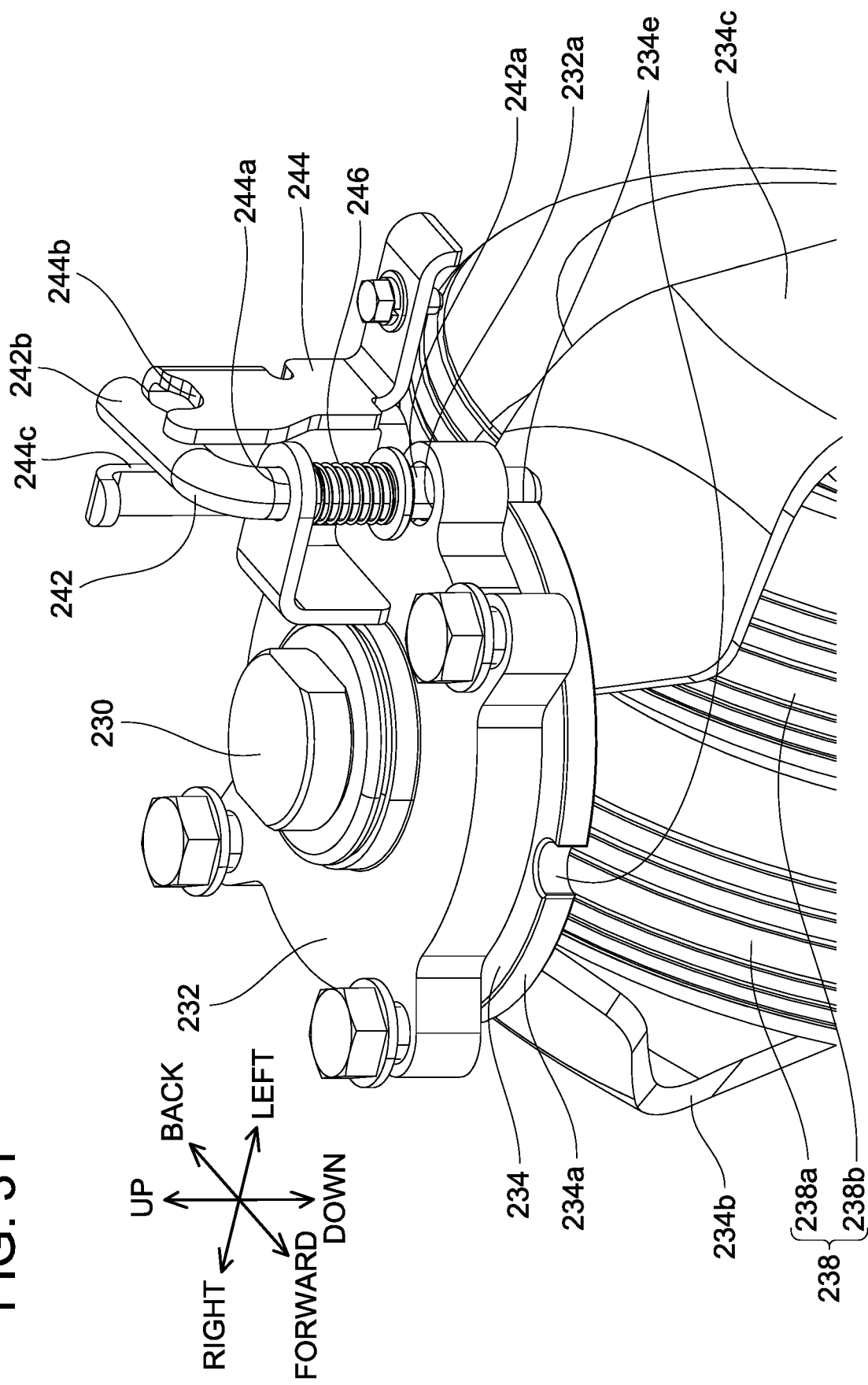
FIG. 31 is a perspective view of the right caster 226 according to the embodiment with the lock pin 242 retained by a second retainer portion 244c, when seen from upper-front-left side.

As shown in FIGS. 30 and 31, the top plate 232 is provided with a through hole 232a through which the first shaft portion 242a of the lock pin 242 passes. Engagement grooves 234e with which the first shaft portion 242a of the lock pin 242 engages are disposed in the retainer 234a of the bracket 234 at predetermined angular intervals. As shown in FIG. 30, when the second shaft portion 242b of the lock pin 242 is retained by the first retainer portion 244b of the support plate 244, the first shaft portion 242a of the lock pin 242 is through the through hole 232a of the top plate 232 but is not engaged with any of the engagement grooves 234e of the bracket 234. This state allows the bracket 234, the wheel shaft 236, and the right rear wheel 238 to integrally pivot with respect to the top plate 232. The position of the lock pin 242 in this state may be referred to as an unlocked position. As shown in FIG. 31, when the second shaft portion 242b of the lock pin 242 is retained by the second retainer portion 244c of the support plate 244, the first shaft portion 242a of the lock pin 242 is through the through hole 232a of the top plate 232 and is further engaged with one of the engagement grooves 234e of the bracket 234. This state prohibits the bracket 234, the wheel shaft 236, and the right rear wheel 238 from integrally pivoting with respect to the top plate 232. The position of the lock pin 242 in this state may be referred to as a locking position. By switching the position of the lock pin 242 between the locking position and the unlocked position, the user of the cart 2 can switch the state of right caster 226 between the state that allows the integral pivoting of the bracket 234, the wheel shaft 236, and the right rear wheel 238 and the state that prohibits the integral pivoting.

Figure 32:
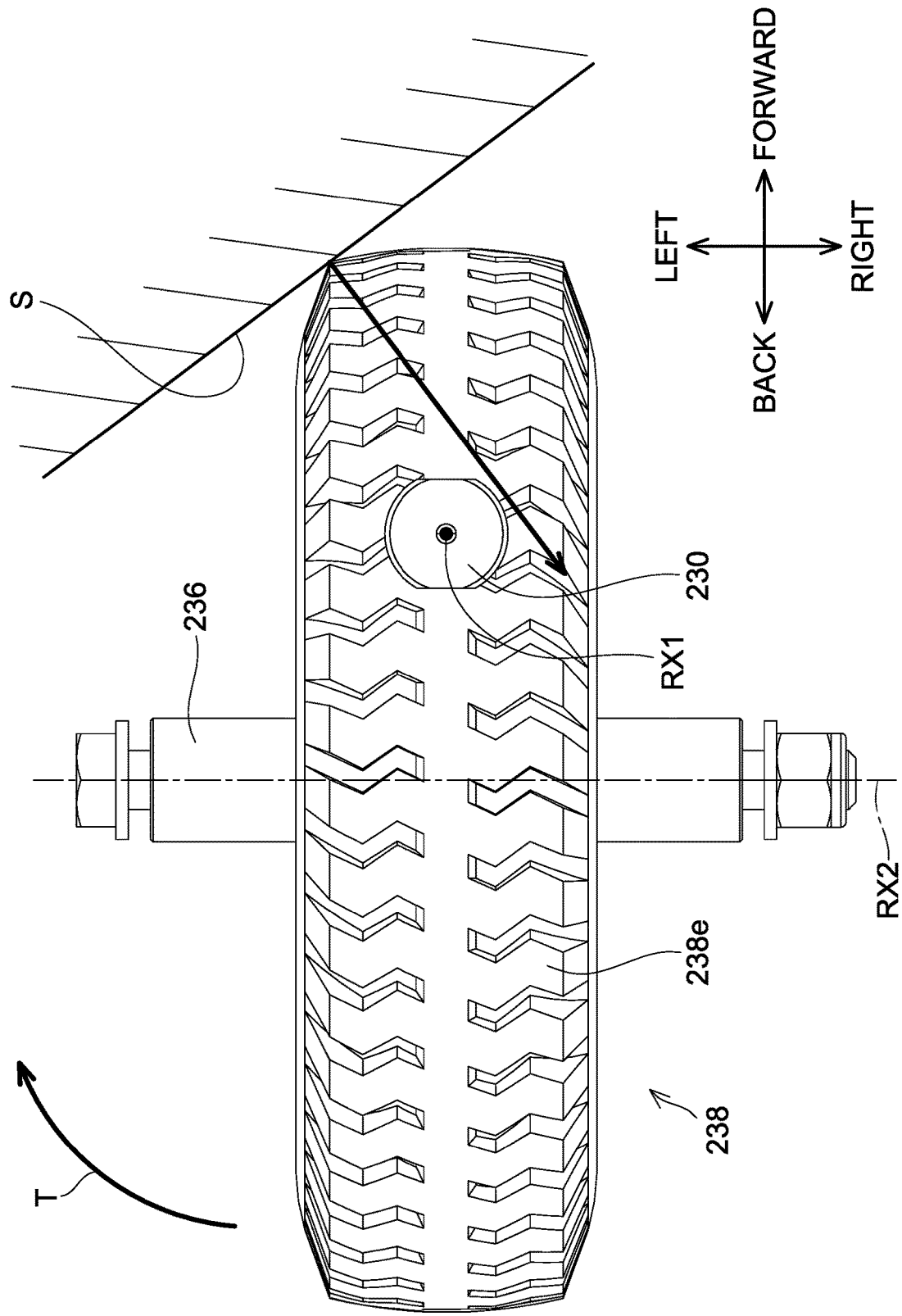
FIG. 32 is a top view of a right rear wheel 238 according to a variant with the right rear wheel 238 obliquely collided with a bump S.
Figure 33:
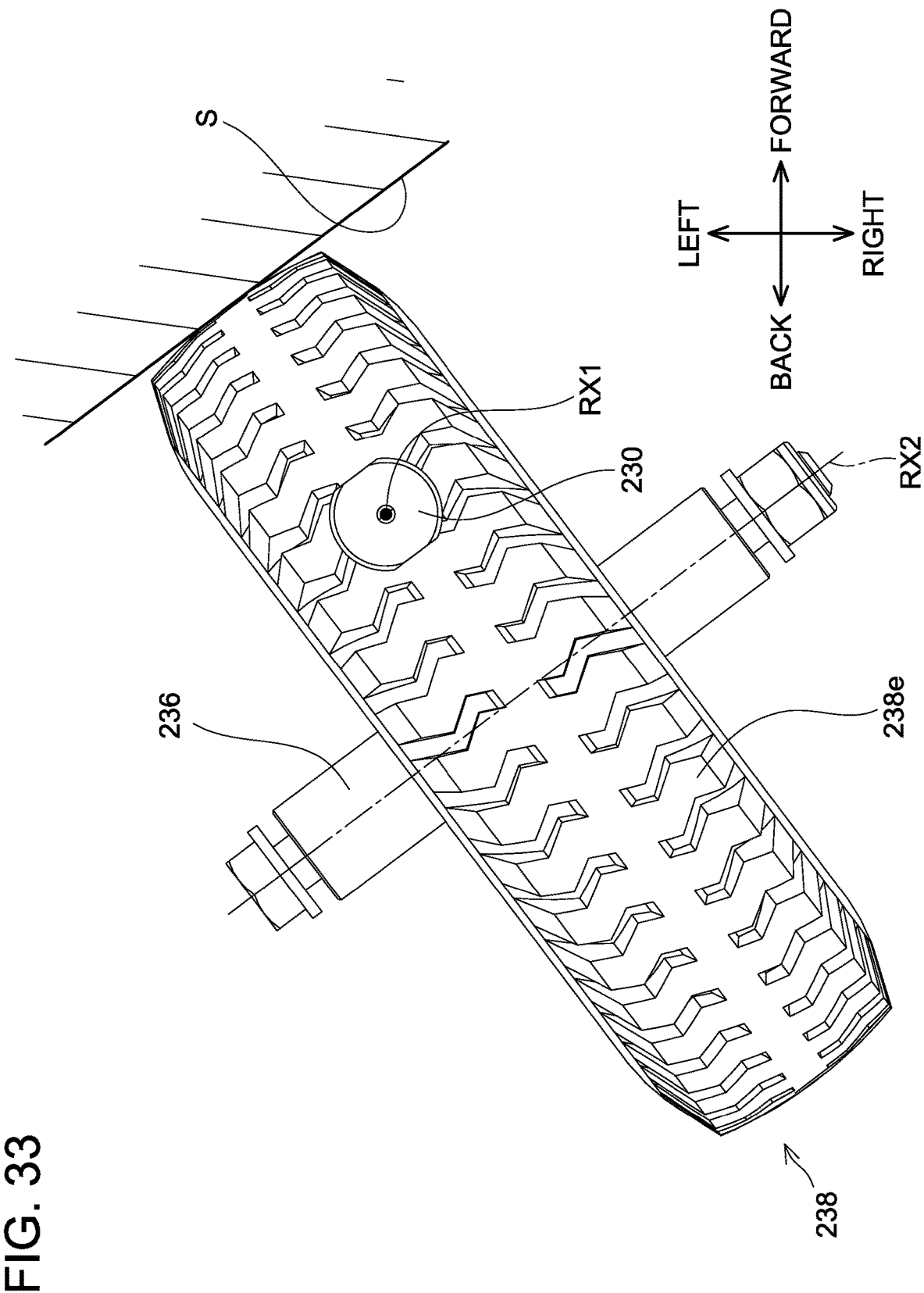
FIG. 33 is a top view of the right rear wheel 238 according to the variant with the right rear wheel 238 facing the bump S.
Figure 60:
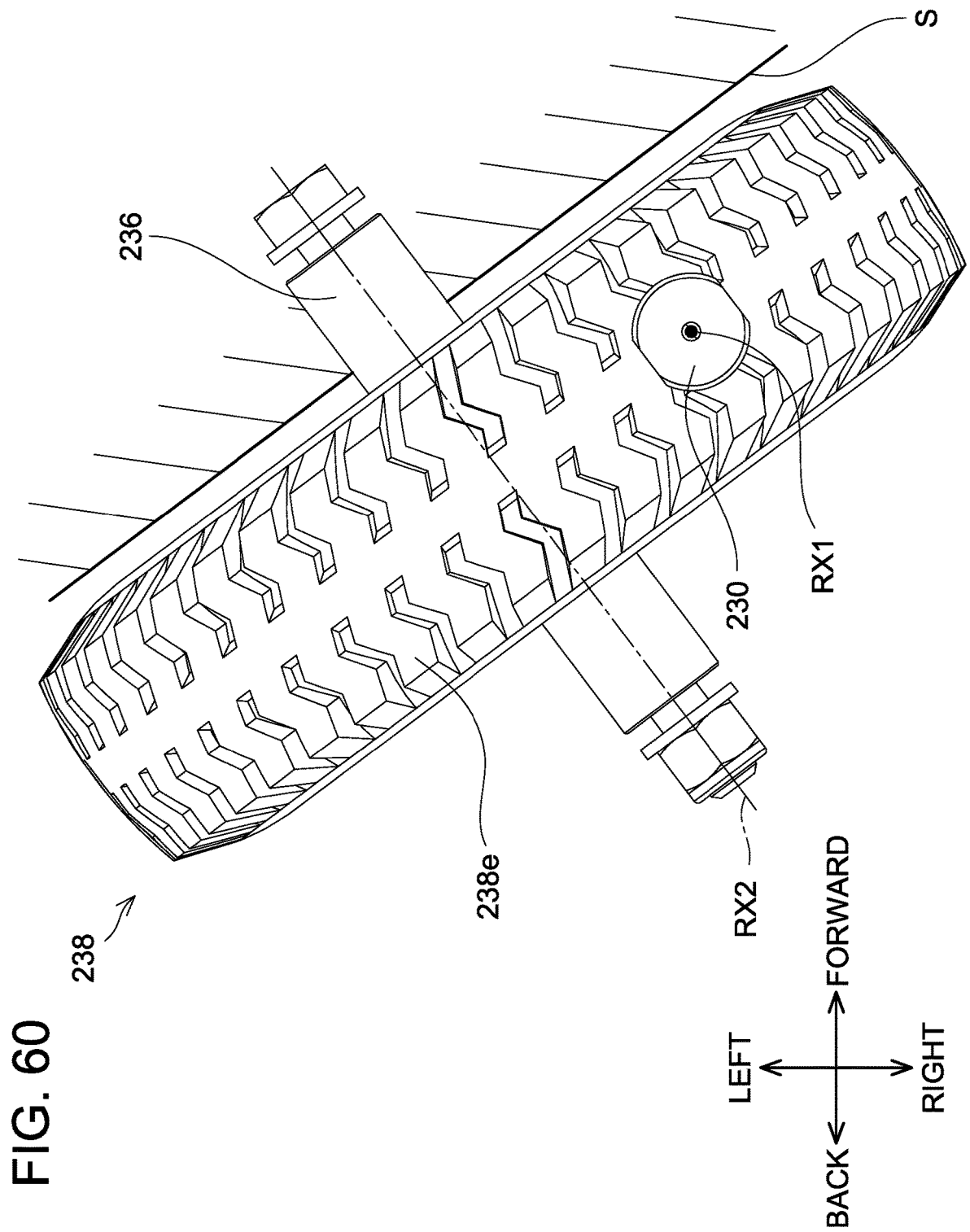
FIG. 60 is a top view of a right rear wheel 238 according to the variant with the right rear wheel 238 pivoted such that a side surface thereof contacts a bump S.

For a configuration in which the right rear wheel 238 includes only a single wheel 238e, FIG. 32 shows a positional relationship between the center pin 230, the wheel shaft 236, and the wheel 238e in the top view of the right caster 226. For example, when the right rear wheel 238 obliquely collides with a bump S, the right rear wheel 238 would easily cross over the bump S if the wheel shaft 236 and the wheel 238e are pivoted such that the traveling direction of the wheel 238e becomes perpendicular to the bump S as shown in FIG. 33. However, torque T, which is due to the force the wheel 238e receives from the bump S shown in FIG. 32, acts in the opposite direction to the above-mentioned pivot direction, thus the wheel 238e pivots such that a side surface of the wheel 238e comes into contact with the bump S as shown in FIG. 60. With the wheel 238e pivoted as such, the right rear wheel 238 cannot cross over the bump S.

On the other hand, in the cart 2 of the present embodiment, the right rear wheel 238 includes the first right rear wheel 238a and the second right rear wheel 238b as shown in FIG. 34. For example, when the right rear wheel 238 obliquely collides with the bump S, the right rear wheel 238 would easily cross over the bump S if the first right rear wheel 238a and the second right rear wheel 238b pivot such that the traveling direction of the first right rear wheel 238a and the second right rear wheel 238b becomes perpendicular to the bump S as shown in FIG. 35. In the present embodiment, torque T, which is due to the force the second right rear wheel 238b receives from the bump S shown in FIG. 34, acts in the same direction as the above-mentioned pivot direction, thus the right rear wheel 238 can easily cross over the bump S.

In the cart 2 of the present embodiment, the first right rear wheel 238a and the second right rear wheel 238b are rotatable to the wheel shaft 236 independent of each other. Thus, as shown in FIG. 34, for example, when the right rear wheel 238 obliquely collides with the bump S and the second right rear Wheel 238b comes into contact with the bump 5, rotating the first right rear wheel 238a, which is not in contact with the bump S, relative to the second right rear wheel 238b can easily change the traveling direction of the right rear wheel 238 to become perpendicular to the bump S as shown in FIG. 35, and the right rear wheel 238 can thereby easily cross over the bump S.

(Left Caster 228)

Similar to the right caster 226, the left caster 228 includes a center pin 250, a top plate 252, a bracket 254, a shaft 256, a left rear wheel 258, and a lock mechanism 260. The bracket 254 includes a retainer 254a, a right arm 254b, and a left arm 254c. The left rear wheel 258 includes a first left rear wheel 258a and a second left rear wheel 258b. The lock mechanism 260 includes a lock pin 262, a support plate 264, and a compression spring 266. Detailed description for the configuration of the left caster 228 is omitted because it is the same as horizontally inverted configuration of the right caster 226.

(Coupling Site of Rear Wheel Unit 14 and Chassis Frame 10)

Figure 36:
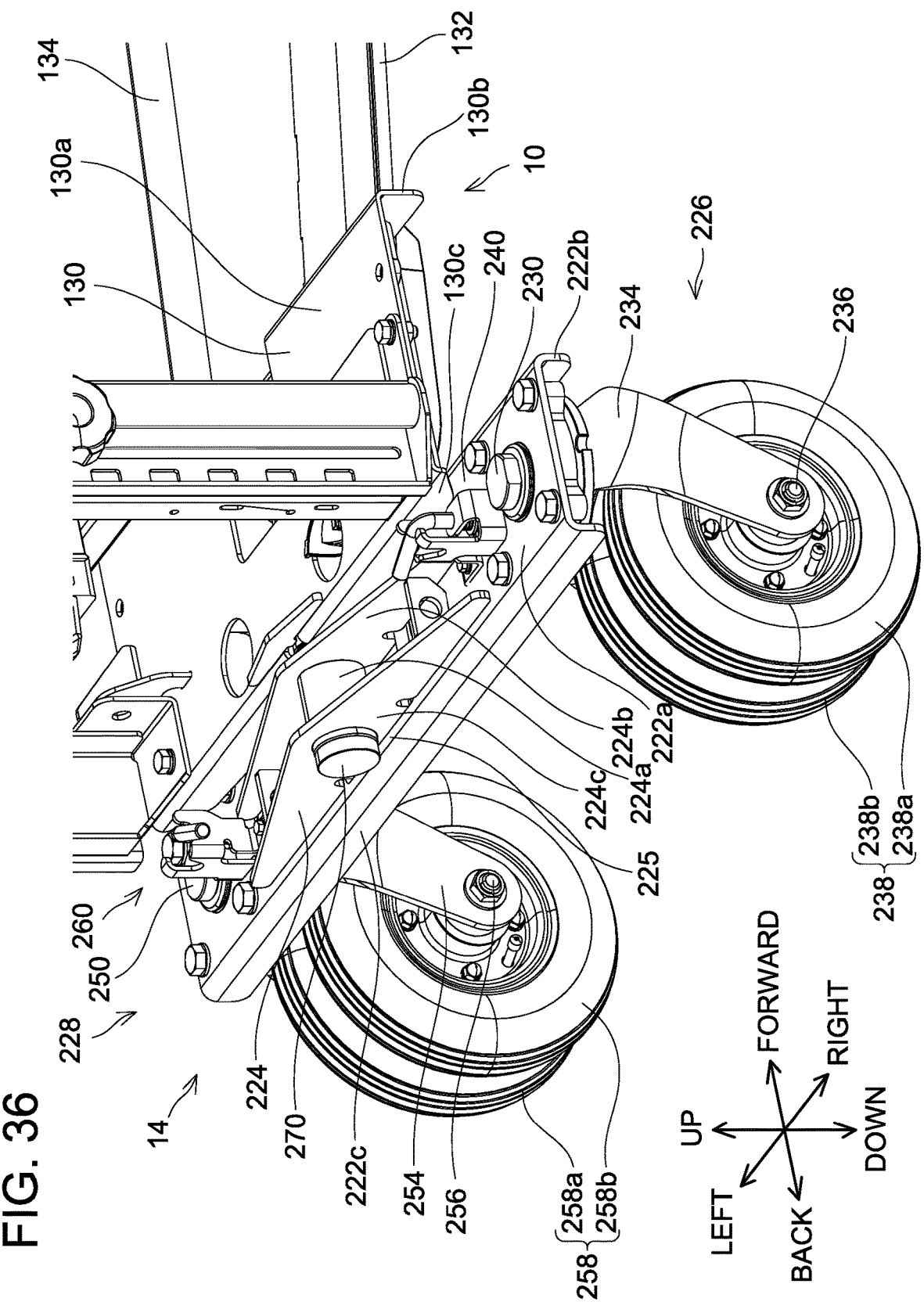
FIG. 36 is a perspective view of a coupling site of a chassis frame 10 and the rear wheel unit 14 according to the embodiment, when seen from upper-rear-right side.
Figure 37:
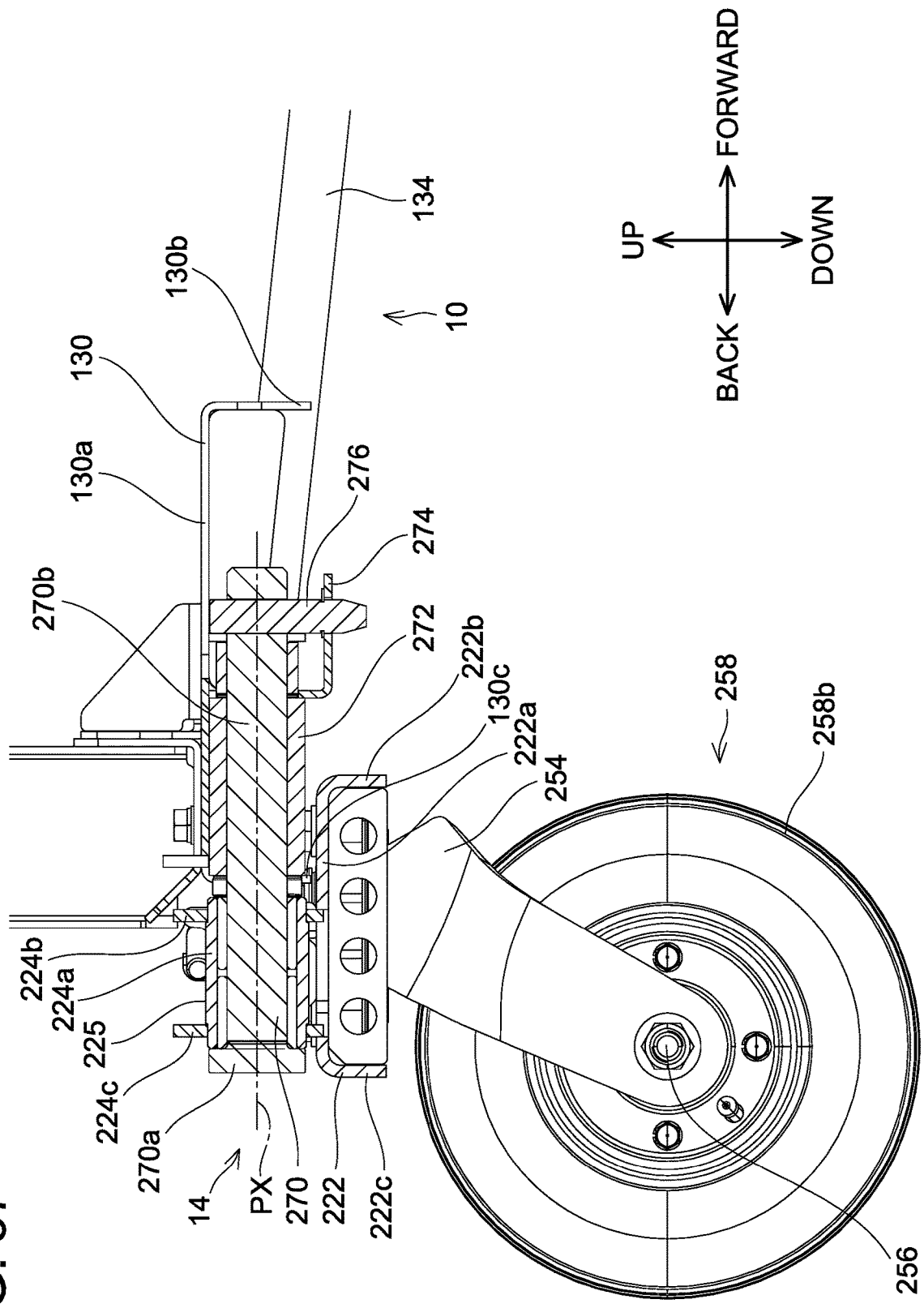
FIG. 37 is a vertical cross-sectional view of the coupling site of the chassis frame 10 and the rear wheel unit 14 according to the embodiment.

As shown in FIG. 36, the rear wheel unit 14 is connected to the chassis frame 10 via a coupling shaft 270 extending in the front-rear direction. As shown in FIG. 37, a coupling pipe 272 and a support plate 274 are welded to the lower surface of the frame plate 130 of the chassis frame 10. The coupling pipe 272 extends along the front-rear direction, a front end thereof penetrates the support plate 274, and a rear end thereof penetrates the rear flange 130c. The coupling shaft 270 includes a head 270a and a shaft 270b. The shaft 270b of the coupling shaft 270 is inserted into the support pipe 224a of the rear wheel unit 14 from the rear and penetrates the support pipe 224a, and further penetrates the coupling pipe 272 of the chassis frame 10. A front end of the coupling shaft 270 is fixed to the support plate 274 with a coupling pin 276.

Figure 38:
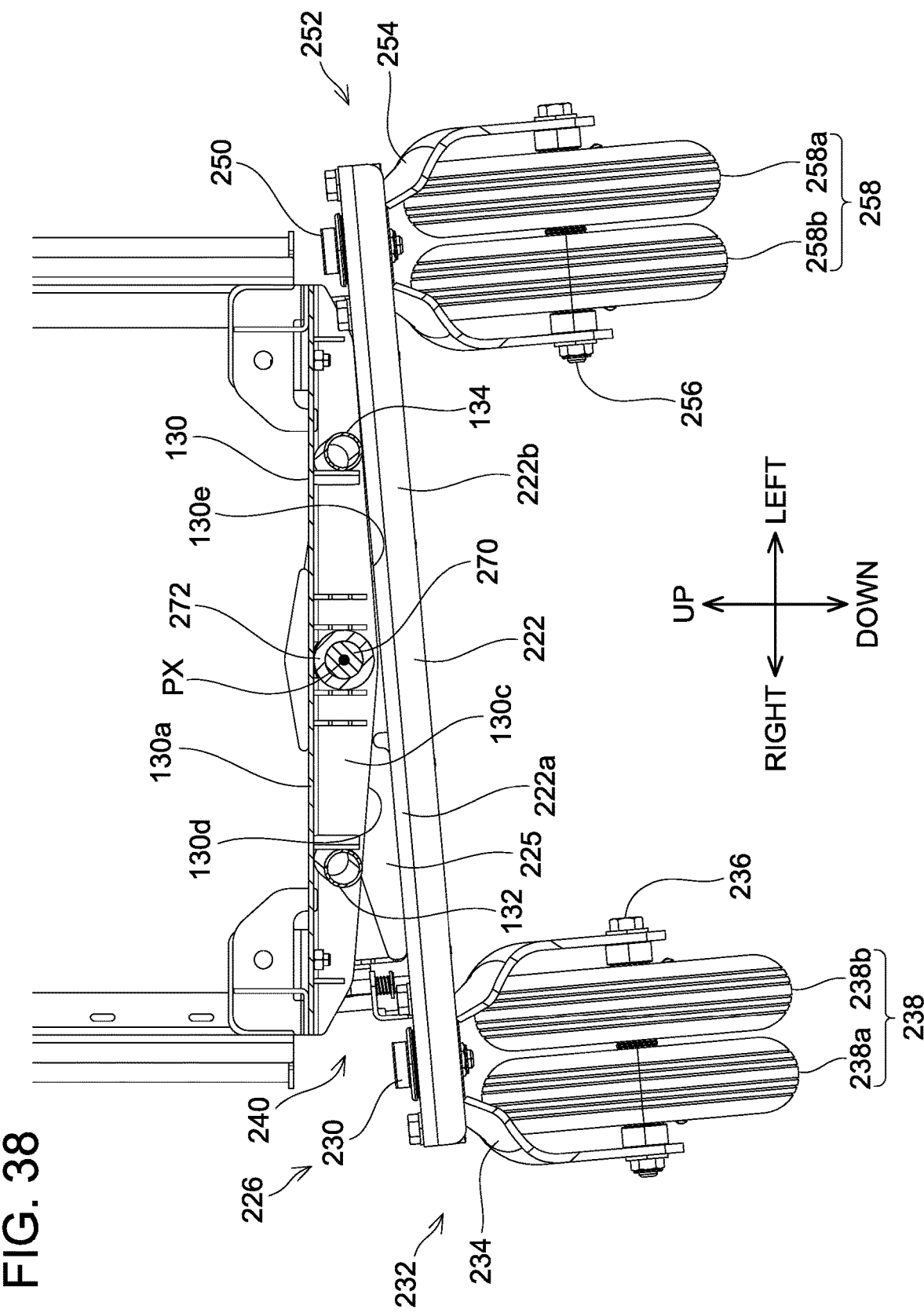
FIG. 38 is a vertical cross-sectional view of the chassis frame 10 according to the embodiment with the rear wheel unit 14 pivoted.

The support pipe 224a is slidable relative to the coupling shaft 270. Thus, as shown in FIG. 38, the rear wheel unit 14 is supported by the chassis frame 10 such that it is swingable about a swing axis PX which is a central axis of the coupling shaft 270. This configuration allows the rear wheel unit 14 to swing with respect to the chassis frame 10 when the cart 2 travels on an uneven surface, which helps the cart 2 to well follow the surface. Further, as Shown in FIG. 10, in a rear plan view of the chassis unit 4, the swing axis PX of the rear wheel unit 14 is located above a straight line L passing through an upper end of the right rear wheel 238 and an upper end of the left rear wheel 258. This secures the minimum ground clearance and suppresses vibrations of the chassis frame 10 while the cart 2 travels. As shown in FIG. 38, the rear flange 130c of the chassis frame 10 is provided with a right stopper surface 130d located rightward of the coupling shaft 270 and a left stopper surface 130e located leftward of the coupling shaft 270. The right stopper surface 130d is inclined upward from the left toward the light. The right stopper surface 130d contacts the floor plate 130a of the chassis frame 10 when the rear wheel unit 14 swings with respect to the chassis frame 10 in a direction that moves the right rear wheel 238 upward, thereby limiting the swing angle of the rear wheel unit 14 with respect to the chassis frame 10. The left stopper surface 130e is inclined upward from the right to the left. The left stopper surface 130e contacts the floor plate 130a of the chassis frame 10 when the rear wheel unit 14 swings with respect to the chassis frame 10 in a direction that moves the left rear wheel 258 upward, thereby limiting the swing angle of the rear wheel unit 14 with respect to the chassis frame 10. In another embodiment, the rear wheel unit 14 may be supported by the chassis frame 10 such that it is not swingable about the swing axis PX with respect to the chassis frame 10.

In the chassis unit 4 of the present embodiment, the right front wheel 140 and the left front wheel 142 are drive wheels, while the right rear wheel 238 and the left rear wheel 258 are non-drive wheels. In another embodiment, the right front wheel 140 and/or the left front wheel 142 may be non-drive wheel(s), and the right rear wheel 238 and/or the left rear wheel 258 may be drive wheel(s). Further, in another embodiment, one of the front wheel unit 12 and the rear wheel unit 14 may include only one wheel, and the other of the front wheel unit 12 and the rear wheel unit 14 may include a plurality of wheels. In yet another embodiment, the chassis unit 4 may not include the rear wheel unit 14, and the front wheel unit 12 may include only one drive wheel. In yet another embodiment, the chassis unit 4 may include a crawler that is driven by a prime mover, instead of the right front wheel 140, the left front wheel 142, the right rear wheel 238 and the left rear wheel 258.

In the chassis unit 4 of the present embodiment, the prime mover for rotating the drive wheel(s) is the motor 150, and the motor 150 is driven by the power from the battery packs 112 in the battery box 8. In another embodiment, the prime mover for rotating the drive wheel(s) may be an engine. In yet another embodiment, the motor 150 may be driven by power supplied via a power cord from an external power supply. In yet another embodiment, the motor 150 may be a motor other than a brushless motor, such as a motor with brush. In yet another embodiment, the motor 150 may be an in-wheel motor corresponding to each of the drive wheel(s).

The chassis unit 4 of the present embodiment includes the right handle 18 and the left handle 20 which extend in the up-down direction on the right side and the left side of the user, of which upper ends are bent rearward, and of which rear ends are provided with the grips 38 and 48. In another embodiment, the chassis unit 4 may include a so-called looped handle in which support portions extend in the up-down direction on the right side and the left side of the user and upper ends of the support portions are connected by a grip portion extending in the right-left direction. In this case, the taillight 74 may be disposed on the support portion on the right side of the user and/or the support portion on the left side of the user, and/or may be disposed in the vicinity of right end and/or left end of the grip portion extending in the right-left direction. Alternatively, the chassis unit 4 may include a so-called T-shaped handle in which a support portion extends in the up-down direction at the center in the right-left direction and an upper end of the support portion is connected to a grip portion extending in the right-left direction. In this case, the taillight 74 may be disposed in the vicinity of right end and/or left end of the grip portion extending in the right-left direction.

(First Container Unit 300)

Figure 39:
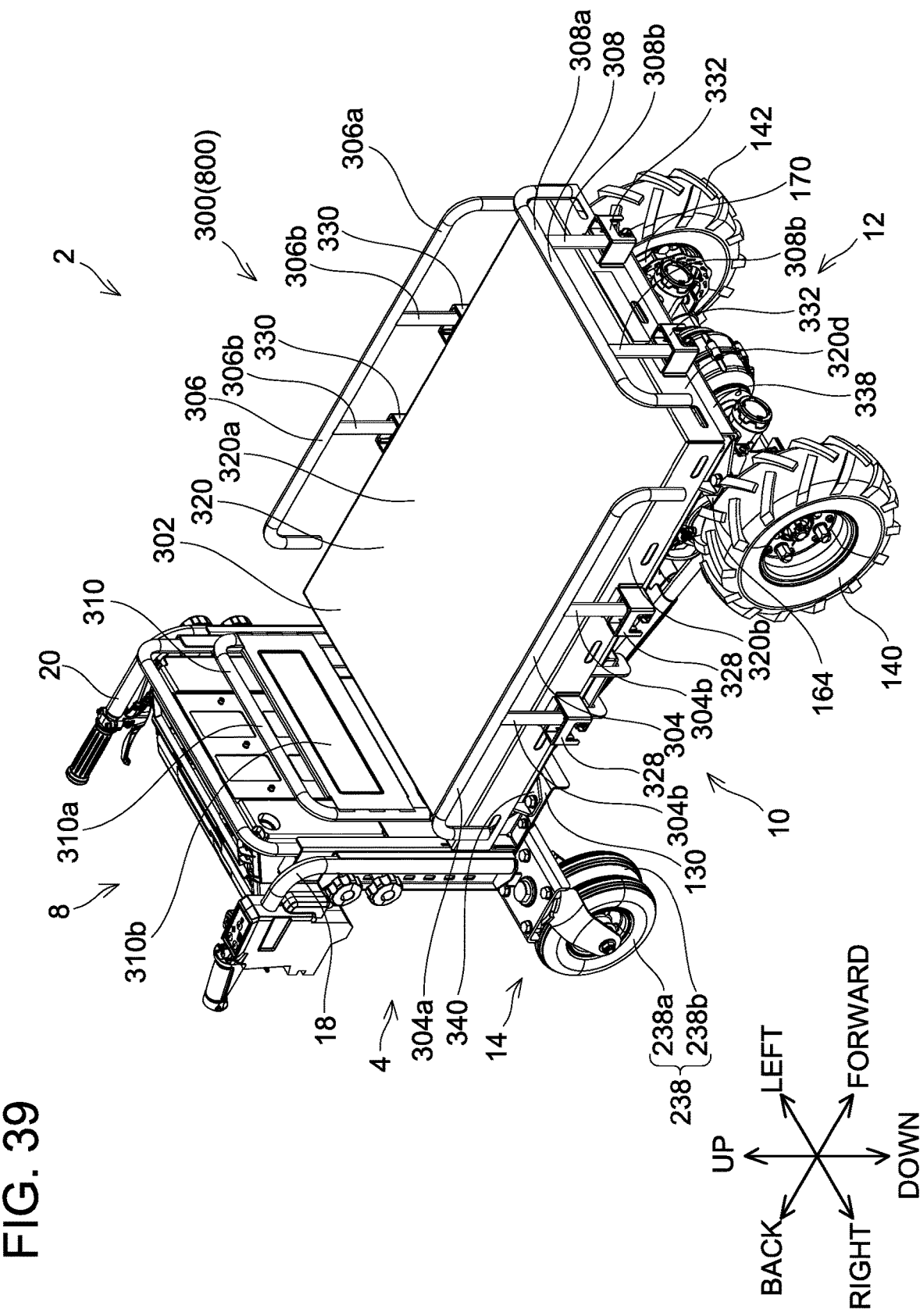
FIG. 39 is a perspective view of the cart 2 according to the embodiment with a first container unit 300 attached to the chassis unit 4, when seen from upper-front-right side.
Figure 40:
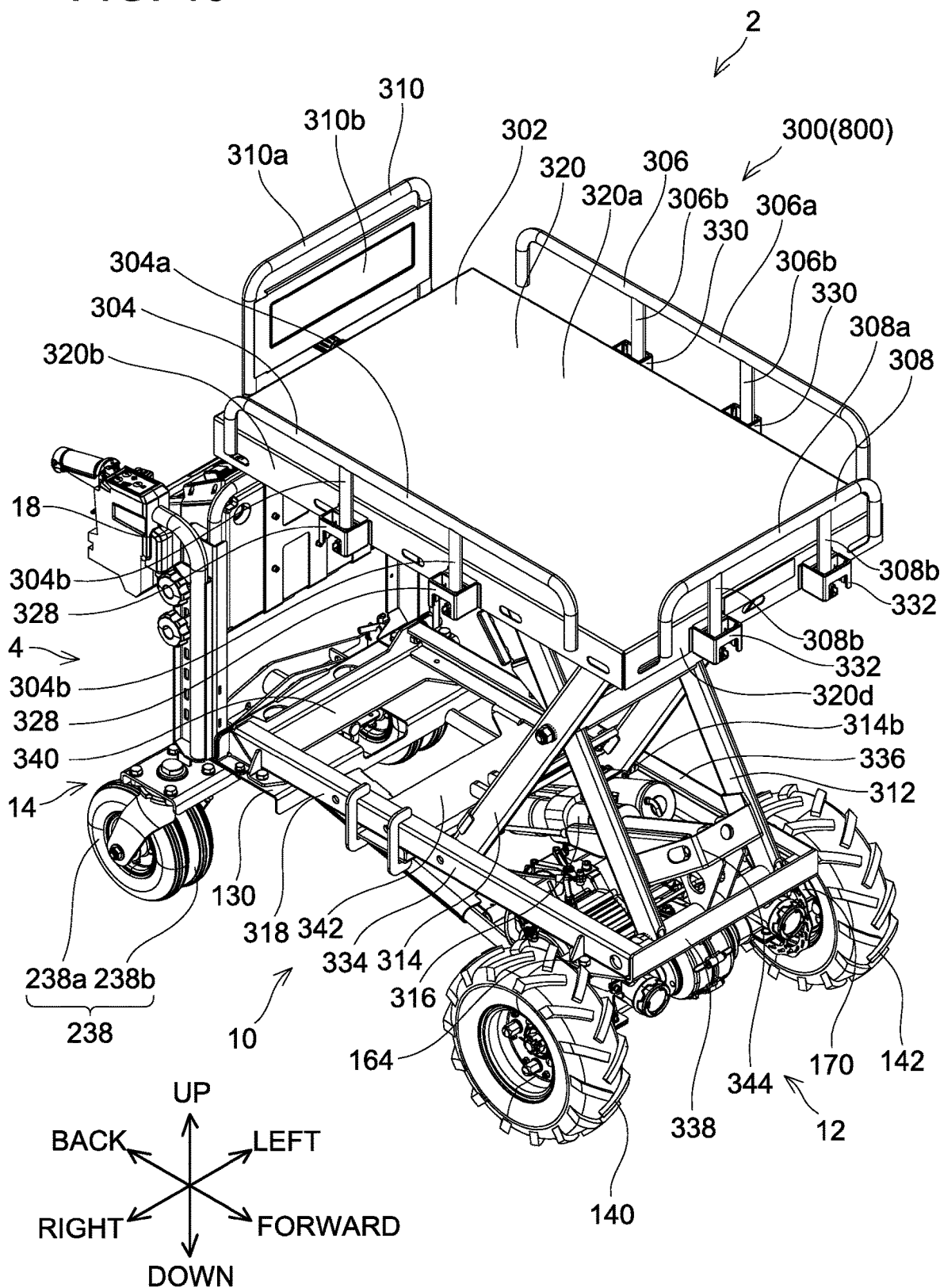
FIG. 40 is a perspective view of the cart 2 according to the embodiment with the first container unit 300 attached to the chassis unit 4 and a container 302 lifted, when seen from upper-front-right side.

As shown in FIGS. 39 and 40, the first container unit 300 includes a container 302, a right guard 304, a left guard 306, a front guard 308, a rear guard 310, first arms 312, second arms 314, an actuator 316, and a support base 318. The support base 318 of the first container unit 300 is screwed and fixed to the chassis unit 4. The first container unit 300 is configured to move the container 302 in the up-down direction relative to the support base 318 by the actuator 316.

As shown in FIGS. 39, 40, and 41, the container 302 includes a container plate 320, a right channel 322, a left Channel 324, reinforcement channels 326, right guard retaining portions 328, left guard retaining portions 330, and front guard retaining portions 332. All of the container plate 320, the right channel 322, the left channel 324, the reinforcement channels 326, the right guard retaining portions 328, the left guard retaining portions 330, and the front guard retaining portions 332 are constituted of a steel material. The container plate 320 includes a top plate 320a that extends in the front-rear direction and in the right-left direction and has a substantially rectangular shape with a longitudinal direction in the front-rear direction, a right flange 320b that is bent downward from a right end of the top plate 320a, a left flange 320c that is bent downward from a left end of the top plate 320a, a front flange 320d that is bent downward from a front end of the top plate 320a, and a rear flange 320e that is bent downward from a rear end of the top plate 320a. An upper surface of the top plate 320a configures a flat surface on which a load is to be placed. The right channel 322 and the left channel 324 extend in the front-rear direction between the front flange 320d and the rear flange 320e along a lower surface of the top plate 320a and are welded to the container plate 320. The right channel 322 has a cross-sectional shape with its left side opened, and the left channel 324 has a cross-sectional shape with its right side opened. The reinforcement channels 326 extend along the lower surface of the top plate 320a between the right flange 320b and the right channel 322 and between the left flange 320c and the left channel 324, and are welded to the container plate 320. The right guard retaining portions 328 are welded to a right surface of the right flange 320b. The right guard retaining portions 328 are located in the vicinity of connection site of the reinforcement channels 326 and the right flange 320b, The left guard retaining portions 330 are welded to a left surface of the left flange 320c. The left guard retaining portions 330 are located in the vicinity of connection site of the reinforcement channels 326 and the left flange 320c. The front guard retaining portions 332 are welded to a front surface of the front flange 320d. The front guard retaining portions 332 are located in the vicinity of connection site of the right channel 322 and the front flange 320d and in the vicinity of connection site of the left channel 324 and the front flange 320d.

The right guard 304 includes a guard pipe 304a and a support pipe 304b. Both of the guard pipe 304a and the support pipe 304b are constituted of a steel material. The guard pipe 304a extends in the front-rear direction and is bent downward at its front and rear ends. The support pipe 304b extends in the up-down direction and its upper end is welded to a lower surface of the guard pipe 304a. The left guard 306 includes a guard pipe 306a and a support pipe 306b. Both of the guard pipe 306a and the support pipe 306b are constituted of a steel material. The guard pipe 306a extends in the front-rear direction and is bent downward at its front and rear ends. The support pipe 306b extends in the up-down direction and its upper end is welded to a lower surface of the guard pipe 306a. The front guard 308 includes a guard pipe 308a and support pipes 308b. All of the guard pipe 308a and the support pipes 308b are constituted of a steel material. The guard pipe 308a extends in the right-left direction and is bent downward at its right and left ends. The support pipes 308b extend in the up-down direction and their upper ends are welded to a lower surface of the guard pipe 308a. The rear guard 310 includes a guard pipe 310a and a guard plate 310b. Both of the guard pipe 310a and the guard plate 310b are constituted of a steel material. The guard pipe 310a extends in the right left direction, is bent downward at its right and left ends, and has the ends fixed to the rear flange 320e of the container plate 320. The guard plate 310b extends in the up-down direction and the right-left direction, and has its left and right ends welded to the guard pipe 310a.

Figure 42:
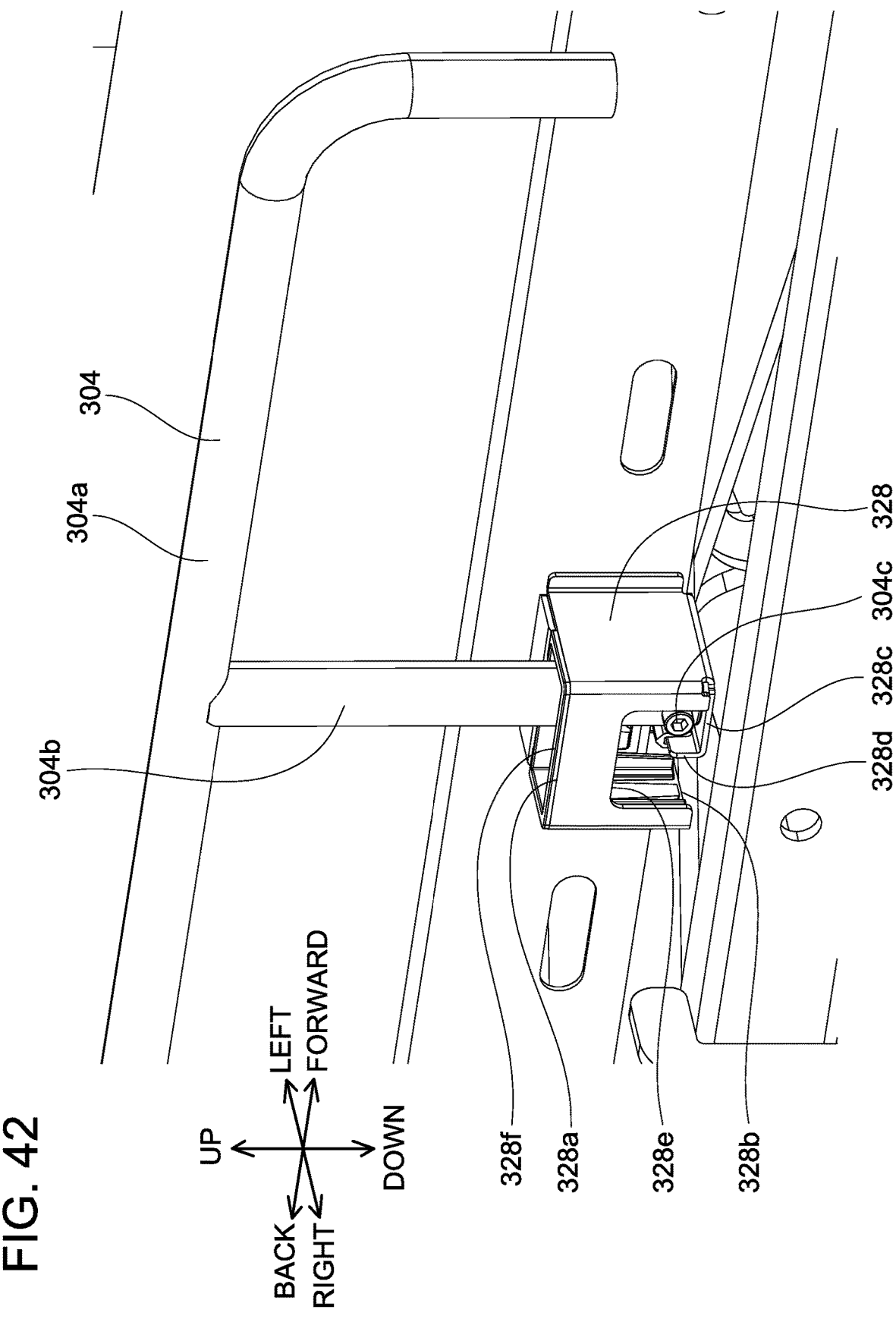
FIG. 42 is a perspective view of a right guard retaining portion 328 according to the embodiment with a lower end of a support pipe 304b being in contact with a support plate 328c, when seen from upper-front right side.

As shown in FIG. 42, the right guard retaining portion 328 has a substantially rectangular tube shape and includes an upper opening 328a and a lower opening 328b. An inner space of the right guard retaining portion 328 is slightly larger than an outer diameter of the support pipe 304b of the right guard 304 in the right-left direction and is at least twice the outer diameter of the support pipe 304b of the right guard 304 in the front-rear direction. A support plate 328c extending along the front-rear direction and the right-left direction is disposed at a lower front portion of the right guard retaining portion 328. A flange 328d that is bent upward is disposed at a rear end of the support plate 328c. A right surface of the right guard retaining portion 328 is provided with a right opening 328e that is continuous from the lower opening 328b. A retaining screw 304c is attached to the vicinity of lower end of the support pipe 304b of the right guard 304. The retaining screw 304c is attached to the support pipe 304b through the right opening 328e with the support pipe 304b inserted in the right guard retaining portion 328 from above. The retaining screw 304c engages with an edge of the right opening 328e when the support pipe 304b is moved upward relative to the right guard retaining portion 328 to prevent the support pipe 304b from getting out from the right guard retaining portion 328. An inner surface of the right guard retaining portion 328 is provided with a rubber 328f for suppressing damage due to contact with the support pipe 304b.

When the lower end of the support pipe 304b is in contact with the support plate 328c as shown in FIG. 42, the right guard 304 is retained by the right guard retaining portion 328 such that the upper end of the guard pipe 304a is positioned higher than the upper surface of the top plate 320a as shown in FIG. 39. In this state, the right guard 304 can prevent a load placed on the container plate 320 front falling off from the right side. The state of the right guard 304 shown in FIG. 42 may be referred to as a first state.

Figure 43:
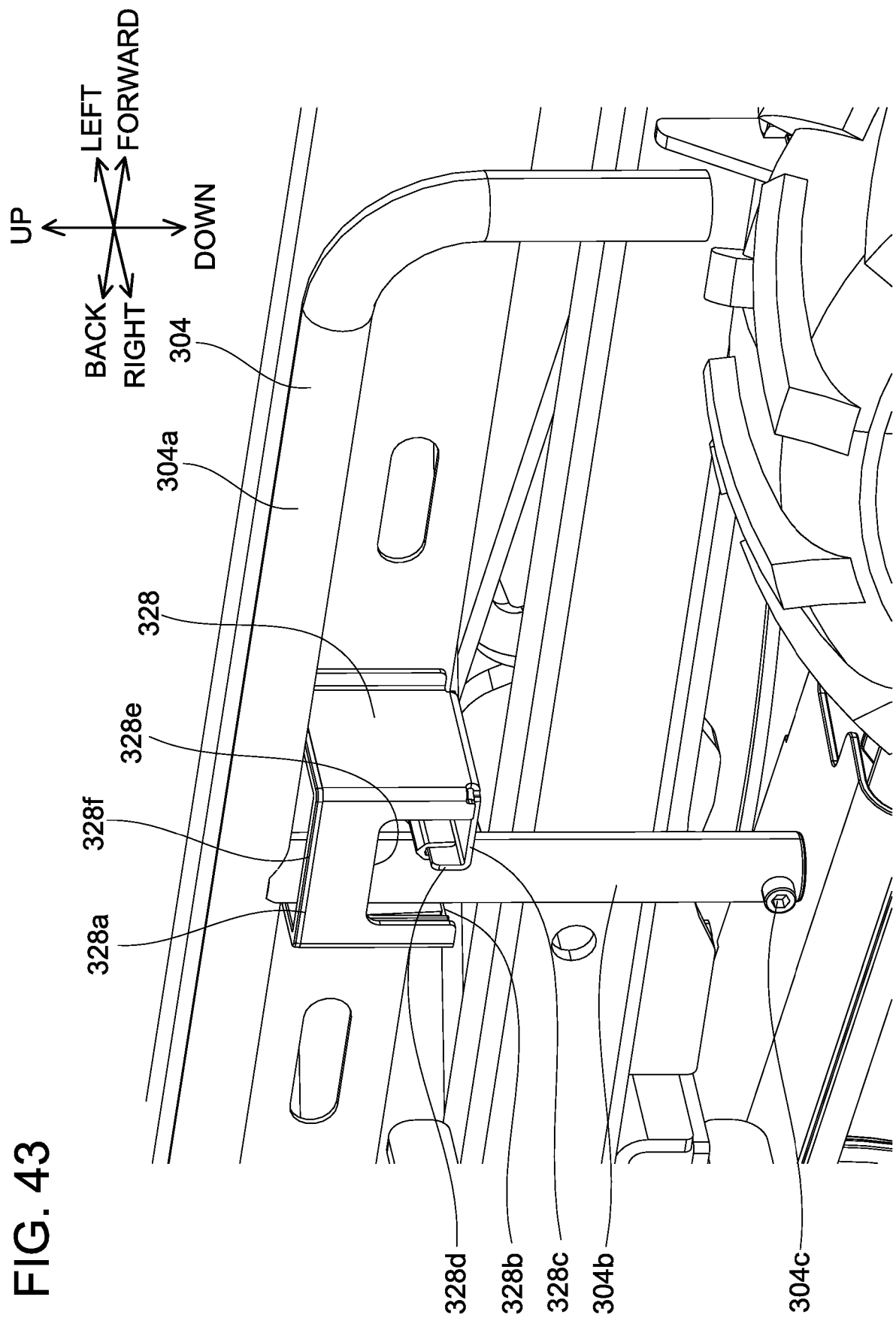
FIG. 43 is a perspective view of the right guard retaining portion 328 according to the embodiment with a lower surface of a guard pipe 304a being in contact with an edge of the right guard retaining portion 328, when seen from upper-front-right side.
Figure 44:
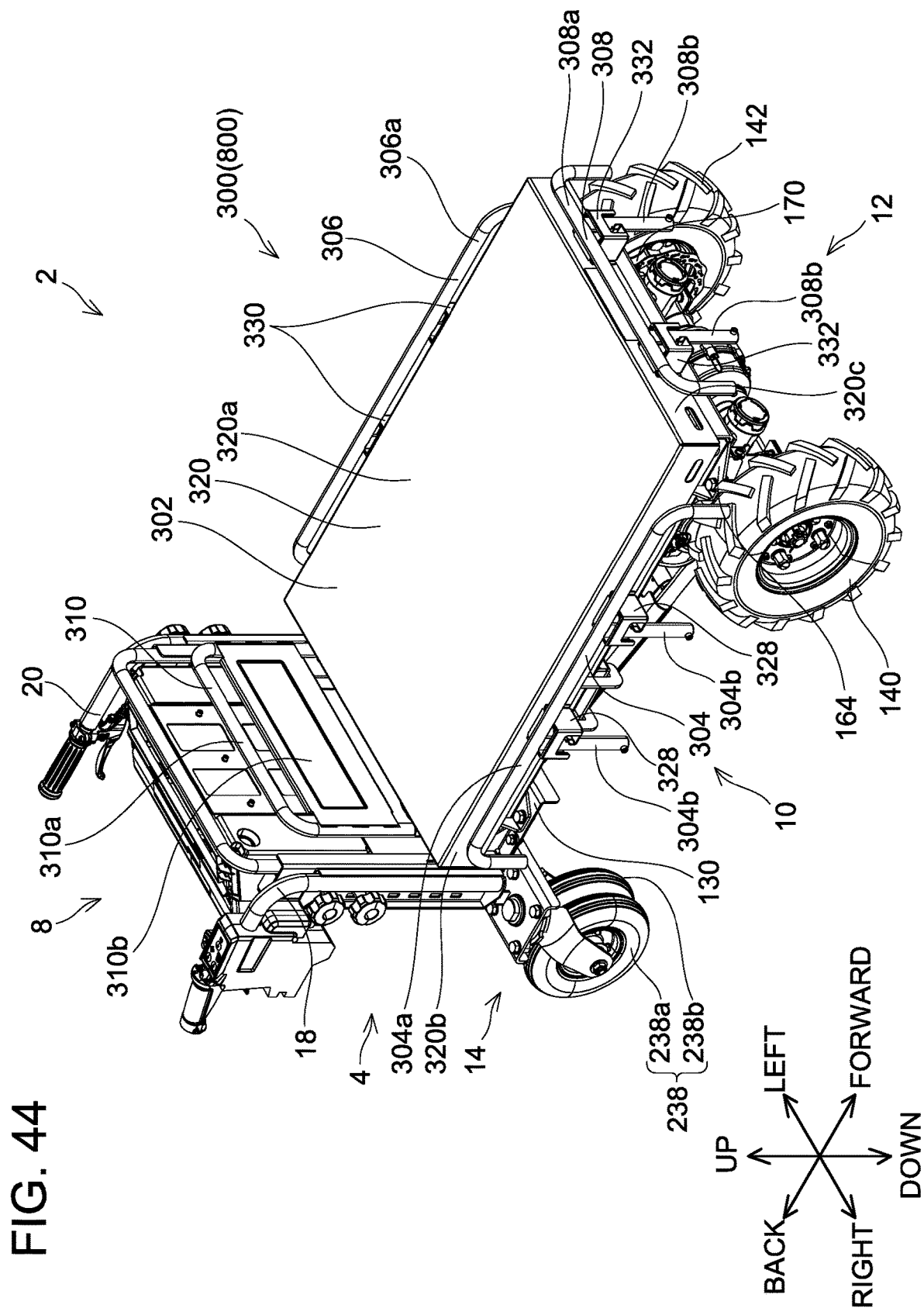
FIG. 44 is a perspective view of the cart 2 according to the embodiment with the first container unit 300 attached to the chassis unit 4 and a right guard 304, a left guard 306, and a front guard 308 retained at a low position, when seen from upper-front-right side.

When the right guard 304 is lifted upward, moved rearward, and then moved downward in the first state of FIG. 42, the support pipe 304b penetrates through the right guard retaining portion 328 and the lower surface of the guard pipe 304a makes contact with an edge of the upper opening 328a of the right guard retaining portion 328 as shown in FIG. 43. In this case, as shown in FIG. 44, the right guard 304 is retained by the right guard retaining portion 328 such that the upper end of the guard pipe 304a is positioned lower than the upper surface of the top plate 302a. In this state, the right guard 304 does not interrupt loading and unloading of a load onto/from the container plate 320, which improves loading/unloading efficiency. The state of the right guard 304 shown in FIG. 43 may be referred to as a second state. When the right guard 304 is lifted upward, moved forward, and then moved downward in the second state of FIG. 43, the right guard 304 is brought back to the first state shown in FIG. 42. In the first container unit 300 of the present embodiment, the right guard 304 is not brought from the first state of FIG. 42 to the second state of FIG. 43 unintentionally because the flange 328d is disposed at the rear end of the support plate 328e.

In the present embodiment, the height of the right guard 304 relative to the container plate 320 can be changed by moving the right guard 304 in the up-down direction and front-rear direction, without moving it in the right-left direction. For example, in a top plan view of the first container unit 300 with the first state of FIG. 42, an interval between the right guard 304 and the container plate 320 is 30 mm±5 mm, and in a top plan view of the first container unit 300 with the second state of FIG. 43, an interval between the right guard 304 and the container plate 320 is 30 mm±5 mm. In the top view of the first container unit 300, change in the interval between the right guard 304 and the container plate 320 when the right guard 304 is brought from the first state of FIG. 42 to the second state of FIG. 43 and when the right guard 304 is brought from the second state of FIG. 43 to the first state of FIG. 42 is within a range of ±5 mm. This configuration enables height change of the right guard 304 relative to the container plate 320 even in a situation where a wide working space in the right-left direction cannot be secured. In the first state of FIG. 42 and the second state of FIG. 43, an interval into which the user can insert his/her finger(s) is left between the right guard 304 and the container plate 320, thus the user can easily grip the right guard 304.

Further, in the present embodiment, the height of the right guard 304 relative to the container plate 320 can be changed without substantially changing the angle of the right guard 304 relative to the container plate 320. For example, the angle of the right guard 304 relative to the container plate 320 is 90 degrees±3 degrees in the first state shown in FIG. 42, and the angle of the right guard 304 relative to the container plate 320 is 90 degrees±3 degrees in the second state shown in FIG. 43. Further, change in the angle of the right guard 304 relative to the container plate 320 when the right guard 304 transitions from the first state of FIG. 42 to the second state of FIG. 43 and when the right guard 304 transitions from the second state of FIG. 43 to the first state of FIG. 42 is within a range of ±3 degrees. This configuration enables height change of the right guard 304 relative to the container plate 320 even in a situation where a wide working space in the right-left direction cannot be secured.

The left guard retaining portion 330 has a configuration similar to that of the right guard retaining portion 328. In the state shown in FIG. 39, the left guard 306 is retained by the left guard retaining portion 330 such that an upper end of the guard pipe 306a is positioned higher than the upper surface of the top plate 320a. When the left guard 306 is lifted upward, moved rearward, and then moved downward in this state, the left guard 306 is retained by the left guard retaining portion 330 such that the upper end of the guard pipe 306a is positioned lower than the upper surface of the top plate 302a, as shown in FIG. 44. When the left guard 306 is lifted upward, moved forward, and then moved downward in the state of FIG. 44, the left guard 306 is brought back to the state of FIG. 39.

The front guard retaining portion 332 also has a similar configuration to that of the right guard retaining portion 328. In the state shown in FIG. 39, the front guard 308 is retained by the front guard retaining portion 332 such that an upper end of the guard pipe 308a is positioned higher than the upper surface of the top plate 320a. When the front guard 308 is lifted upward, moved leftward, and then moved downward in this state, the front guard 308 is retained by the front guard retaining portion 332 such that the upper end of the guard pipe 308a is positioned lower than the upper surface of the top plate 302a, as shown in FIG. 44. When the front guard 308 is lifted upward, moved rightward, and then moved downward in the state of FIG. 44, the front guard 308 is brought back to the state of FIG. 39.

As shown in FIG. 41, the support base 318 includes a right channel 334, a left channel 336, a front plate 338, a rear plate 340, and a reinforcement frame 342. All of the right channel 334, the left channel 336, the front plate 338, the rear plate 340, the reinforcement frame 342 are constituted of a steel material. The right channel 334 and the left channel 336 extend in the front-rear direction. The right channel 334 has a cross-sectional shape with its left side opened, and the left channel 336 has a cross-sectional shape with its right side opened. The front plate 338 is welded to a front end of the right channel 334 and a front end of the left channel 336. The rear plate 340 is welded to a rear end of the right channel 334 and a rear end of the left channel 336. As shown in FIG. 40, the first container unit 300 is fixed to the chassis unit 4 by screwing the front plate 338 to the right bracket 164 and the left bracket 170 of the front wheel unit 12 and also screwing the rear plate 340 to the frame plate 130 of the chassis frame 10. The reinforcement frame 342 extends in the right-left direction, a right end thereof is welded to the right channel 334, and a left end thereof is welded to the left channel 336.

As shown in FIG. 41, the first arms 312 and the second arms 314 are connected to each other to be pivotable about a pivot axis, which is the right-left direction. The first arms 312 and the second arms 314 are both constituted of a steel material. Lower ends of the first arms 312 are supported at the vicinity of the front end of the right channel 334 and at the vicinity of the front end of the left channel 336 of the support base 318 such that they are pivotable about a pivot axis, which is the right-left direction. Upper ends of the first arms 312 include rollers 312a and 312b, respectively. The rollers 312a and 312b are supported by the right channel 322 and left channel 324 of the container 302, respectively.

Upper ends of the second arms 314 are supported at the vicinity of the front end of the container plate 320 of the container 302 such that they are pilotable about a pivot axis, which is the right-left direction. Lower ends of the second arms 314 include rollers 314a and 314b (see FIG. 40), respectively. The rollers 314a and 314b are supported by the right channel 334 and the left channel 336 of the support base 318, respectively. A reinforcement frame 344 is welded to the first arms 312.

The actuator 316 is a linear actuator configured to contract and expand, for example, a hydraulic cylinder. One end of the actuator 316 is supported by the reinforcement frame 342 of the support base 318 to be pivotable about a pivot axis, which is the right-left direction. Another end of the actuator 316 is supported by the reinforcement frame 344 of the first arms 312 to be pivotable about a pivot axis, which is the right-left direction. The actuator 316 is connected to the battery box 8 via a power cable (not shown). The actuator 316 is supplied with the power from the battery packs 112. Operation of the actuator 316 is controlled by the control board 108. When the actuator 316 contracts, the first arms 312 are pivoted in a direction that brings the upper ends of the first arms 312 close to the support base 318 and the second arms 314 are also pivoted in a direction that brings the lower ends of the second arms 314 close to the container 302, as a result of which the container 302 is lowered to the support base 318 as shown in FIG. 39. When the actuator 316 expands, the first arms 312 are pivoted in a direction that brings the upper ends of the first arms 312 away from the support base 318 and the second arms 314 are also pivoted in a direction that brings the lower ends of the second arms 314 away from the container 302, as a result of which the container 302 is lifted relative to the support base 318 as shown in FIG. 40. The control board 108 controls the actuator 316 to expand while the user presses an upper portion of the container operation switch 120e. The control board 108 controls the actuator 316 to contract while the user presses a lower portion of the container operation switch 120e.

(Second Container Unit 400)

Figure 45:
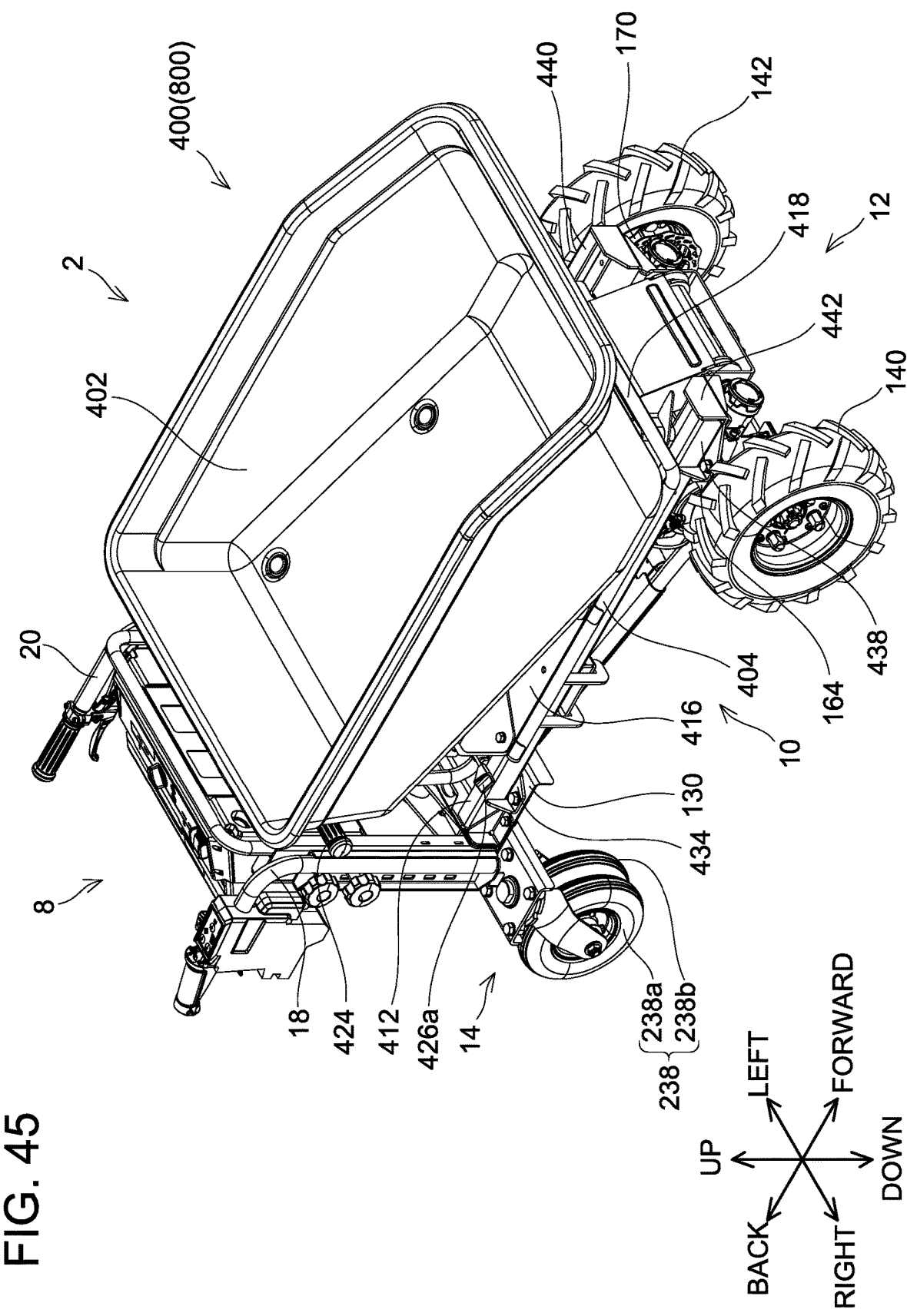
FIG. 45 is a perspective view of the cart 2 according to the embodiment with a second container unit 400 attached to the chassis unit 4, when seen from upper-front-right side.
Figure 46:
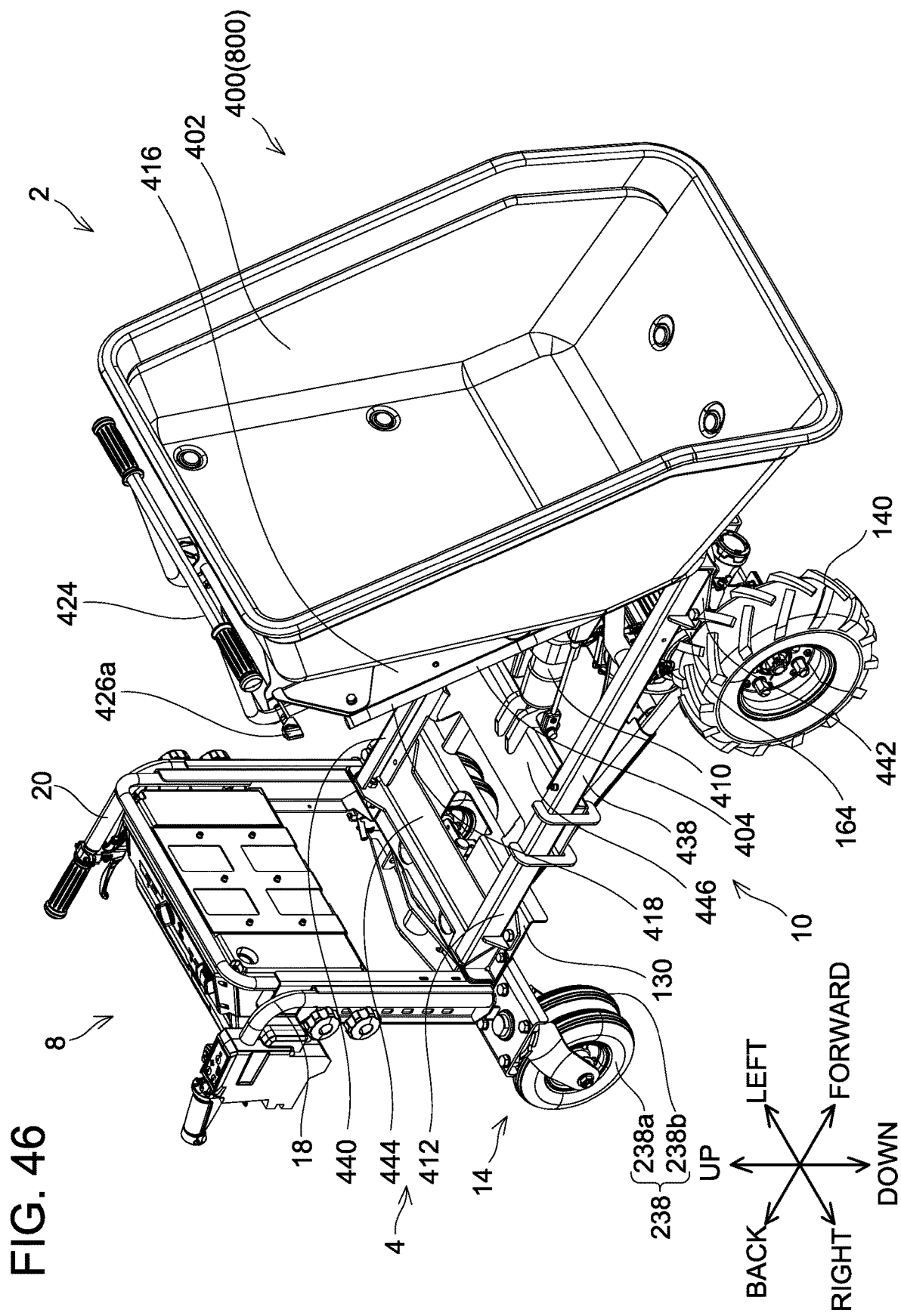
FIG. 46 is a perspective view of the cart 2 according to the embodiment with the second container unit 400 attached to the chassis unit 4 and a movable support base 408 tilted relative to a fixed support base 412, when seen from upper-front-right side.
Figure 47:
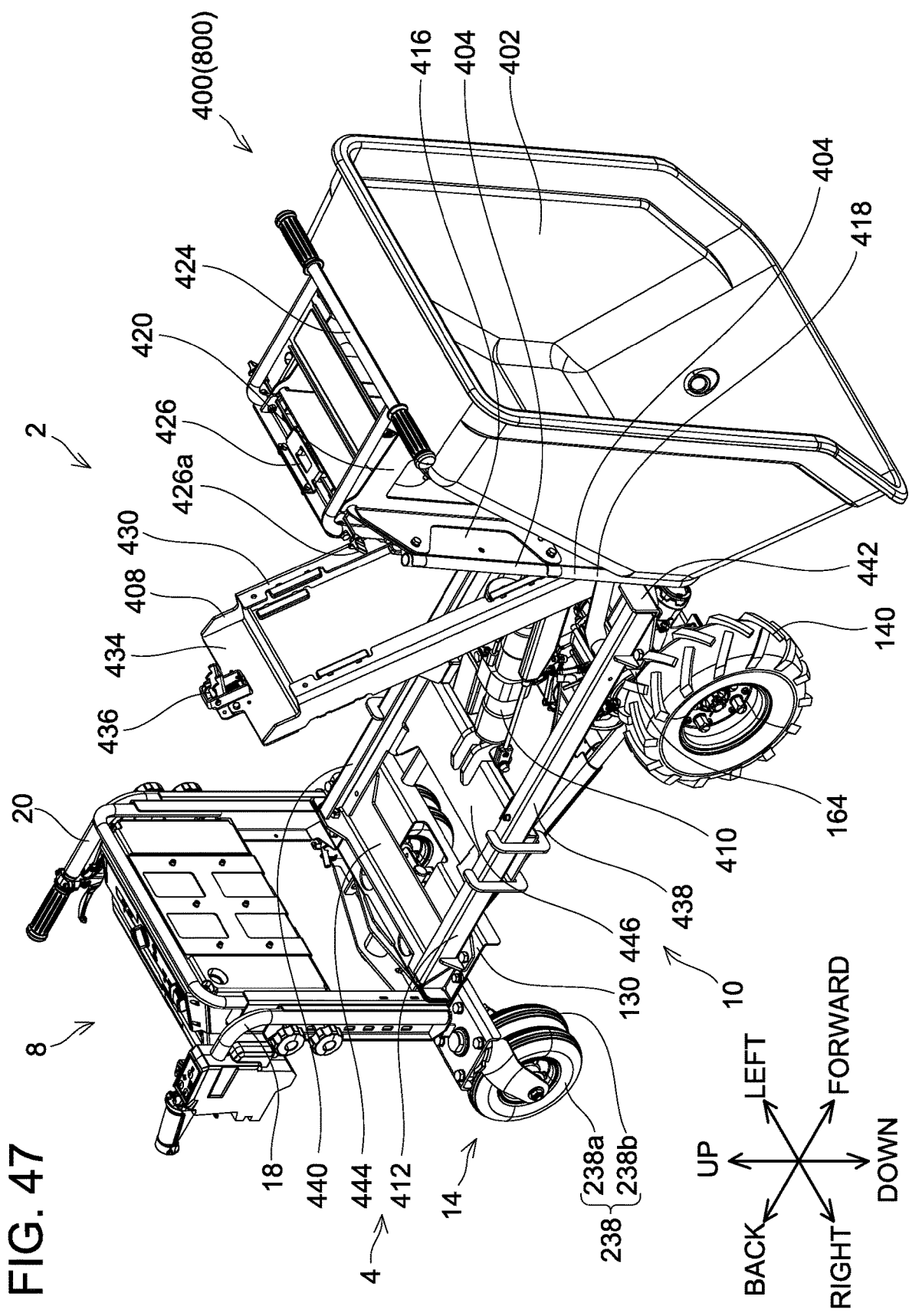
FIG. 47 is a perspective view of the cart 2 according to the embodiment with the second container unit 400 attached to the chassis unit 4, the movable support base 408 tilted relative to the fixed support base 412, and a bucket support base 404 tilted relative to the movable support base 408, When seen from upper-front-right side.

As shown in FIGS. 45, 46, and 47, the second container unit 400 includes a bucket 402, a bucket support base 404, support arms 406, a movable support base 408, an actuator 410, and a fixed support base 412. The fixed support base 412 of the second container unit 400 is screwed and fixed to the chassis frame 10. The second container unit 400 is configured to tilt the movable support base 408 relative to the fixed support base 412 by the actuator 410 as shown in FIG. 46. Further, the second container unit 400 is configured to further tilt the bucket 402 relative to the fixed support base 412 as shown in FIG. 47 by the user tilting the bucket support base 404 relative to the movable support base 408.

Figure 48:
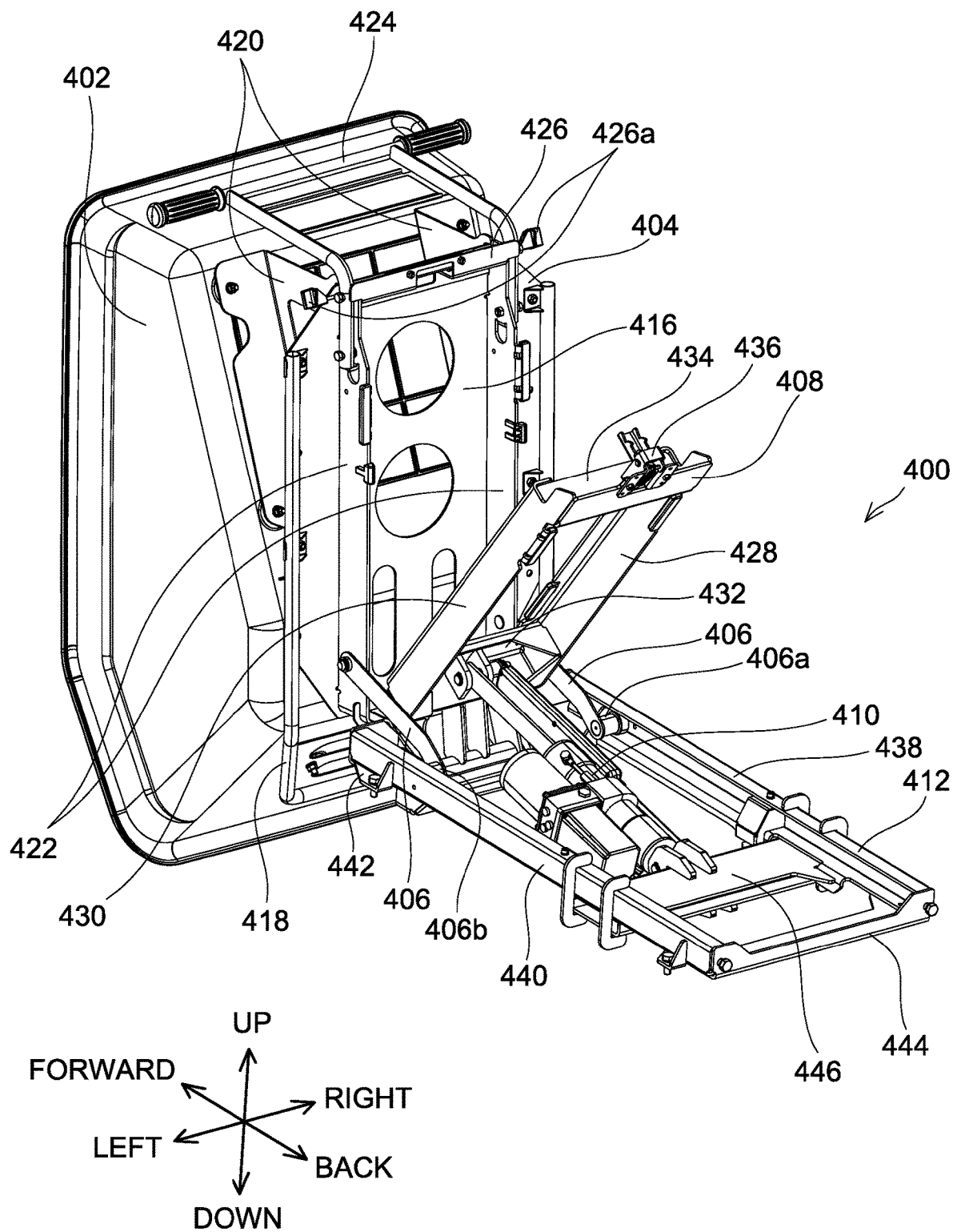
FIG. 48 is a perspective view of the second container unit 400 according to the embodiment with the movable support base 408 tilted relative to the fixed support base 412 and the bucket support base 404 tilted relative to the movable support base 408, when seen from upper-rear-left side.

The bucket 402 has a box shape with its upper side open. As shown in FIG. 48, the bucket support base 404 includes a base plate 416, a base pipe 418, an upper frame 420, a lower frame 422, a handle 424, and a latch mechanism 426. All of the base plate 416, the base pipe 418, the upper frame 420, and the lower frame 422 are constituted of a steel material. The base plate 416 is disposed along the front-rear direction and the right-left direction. The base pipe 418 extends along a lower surface of a front lower portion of the bucket 402 and also extends in the front-rear direction along a lower surface of the base plate 416. The base pipe 418 is screwed to the front lower portion of the bucket 402 and is also screwed to the base plate 416. The upper frame 420 is disposed between a lower surface of a rear lower portion of the bucket 402 and the upper surface of the base plate 416, along the front-rear direction and the up-down direction. The upper frame 420 is screwed to the rear lower portion of the bucket 402 and is also screwed to the base plate 416. The lower frame 422 extends in the front-rear direction along the lower surface of the base plate 416. The lower frame 422 is welded to the base plate 416. The handle 424 is disposed rearward of the bucket 402. The handle 424 is screwed to the lower frame 422. The latch mechanism 426 is disposed below the handle 424. The latch mechanism 426 is fixed to the base plate 416 and the lower frame 422.

The movable support base 408 includes a right frame 428, a left frame 430, a front frame 432, a rear frame 434, and a latch receiver 436. All of the right frame 428, the left frame 430, the front frame 432, and the rear frame 434 are constituted of a steel material. The right frame 428 and the left frame 430 extend in the front-rear direction. A front end of the right frame 428 and a front end of the left frame 430 are connected to a front end of the lower frame 422 of the bucket support base 404 to be pivotable about a pivot axis, which is the right-left direction. The front frame 432 extends in the right-left direction between the vicinity of the front end of the right frame 428 and the vicinity of the front end of the left frame 430. The front frame 432 is welded to the right frame 428 and the left frame 430. The rear frame 434 extends in the right-left direction between a rear end of the right frame 428 and a rear end of the left frame 430. The rear frame 434 is welded to the right frame 428 and the left frame 430. The latch receiver 436 is fixed at the vicinity of a center of the rear frame 434. The latch receiver 436 is disposed at a position corresponding to the latch mechanism 426 of the bucket support base 404. When the bucket support base 404 is tilted relative to the movable support base 408 in a direction that brings a rear end of the bucket support base 404 close to a rear end of the movable support base 408, the latch mechanism 426 engages with the latch receiver 436. The latch mechanism 426 includes a unlatch knob 426a. The latch mechanism 426 is disengaged from the latch receiver 436 by the user operating the unlatch knob 426a when the latch mechanism 426 is engaged with the latch receiver 436.

The fixed support base 412 includes a right channel 438, a left channel 440, a front plate 442, a rear plate 444, and a reinforcement frame 446. All of the right channel 438, the left channel 440, the front plate 442, the rear plate 444, and the reinforcement frame 446 are constituted of a steel material. The right channel 438 and the left channel 440 extend in the front-rear direction. The right channel 438 has a cross-sectional shape with its left side opened, and the left channel 440 has a cross-sectional shape with its right side opened. The front plate 442 is welded to a front end of the right channel 438 and a front end of the left channel 440. The rear plate 444 is welded to a rear end of the right channel 438 and a rear end of the left channel 440. As shown in FIGS. 46 and 47, the second container unit 400 is fixed to the chassis unit 4 by screwing the front plate 442 to the right bracket 164 and the left bracket 170 of the front wheel unit 12 and also screwing the rear plate 444 to the frame plate 130 of the chassis frame 10. The reinforcement frame 446 extends in the right-left direction, a right end thereof is welded to the right channel 438, a left end thereof is welded to the left channel 440.

As shown in FIG. 48, upper ends of the support arms 406 are connected to the vicinity of the front end of the lower frame 422 of the bucket support base 404 to be pivotable about a pivot axis, which is the right-left direction. The support arms 406 are constituted of a steel material. Lower ends of the support arms 406 include rollers 406a and 406b, respectively. The rollers 406a and 406b are supported by the right channel 438 and left channel 440 of the fixed support base 412, respectively.

The actuator 410 is a linear actuator configured to contract and expand, for example a hydraulic cylinder. One end of the actuator 410 is supported by the reinforcement frame 446 of the fixed support base 412 to be pivotable about a pivot axis, which is the right-left direction. Another end of the actuator 410 is supported by the front frame 432 of the movable support base 408 to be pivotable about a pivot axis in the right-left direction. The actuator 410 is connected to the battery box 8 of the chassis unit 4 via a power cable (not shown). The actuator 410 is supplied with the power from the battery packs 112. Operation of the actuator 410 is controlled by the control board 108. When the actuator 410 contracts, the movable support base 408 is pivoted relative to the fixed support base 412 in a direction that brings the rear end of the movable support base 408 close to the rear end of the fixed support base 412, as a result of which the movable support base 408 and the bucket support base 404 become substantially parallel to the fixed support base 412 as shown in FIG. 45. When the actuator 410 expands, the movable support base 408 is pivoted relative to the fixed support base 412 in a direction that brings the rear end of the movable support base 408 away from the rear end of the fixed support base 412, as a result of which the movable support base 408 and the bucket support base 404 become tilted relative to the fixed support base 412 as shown in FIG. 46. The control board 108 controls the actuator 410 to expand while the user presses the upper portion of the container operation switch 120e. The control board 108 controls the actuator 410 to contract while the user presses the lower portion of the container operation switch 120e. When the user operates the unlatch knob 426a to disengage the latch mechanism 426 from the latch receiver 436 in the state shown in FIG. 46 and further pivots the handle 424 forward, the bucket support base 404 becomes tilted relative to the movable support base 408 as shown in FIG. 47.

(Third Container Unit 500)

Figure 49:
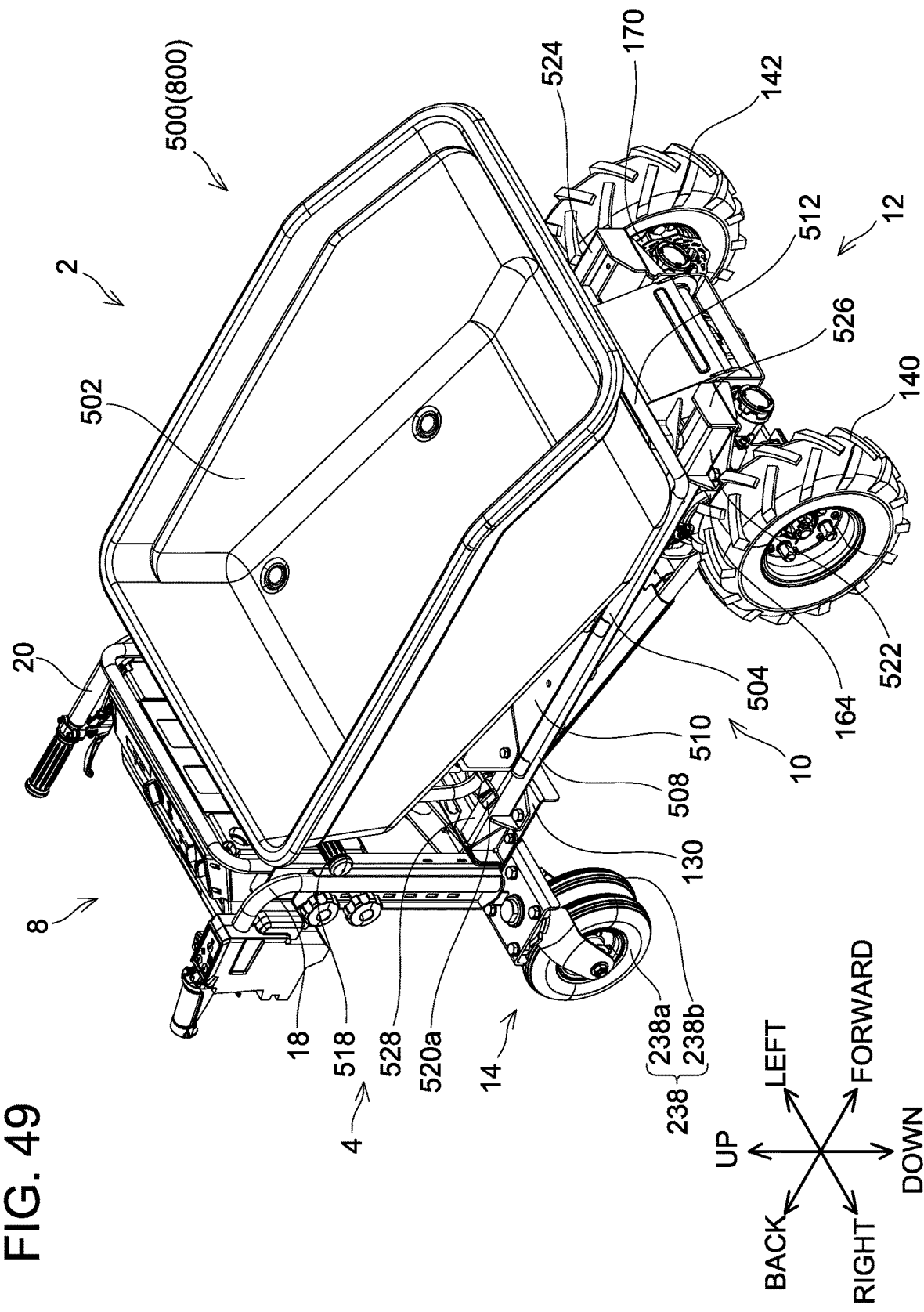
FIG. 49 is a perspective view of the cart 2 according to the embodiment with a third container unit 500 attached to the chassis unit 4, when seen from upper-front-right side.
Figure 50:
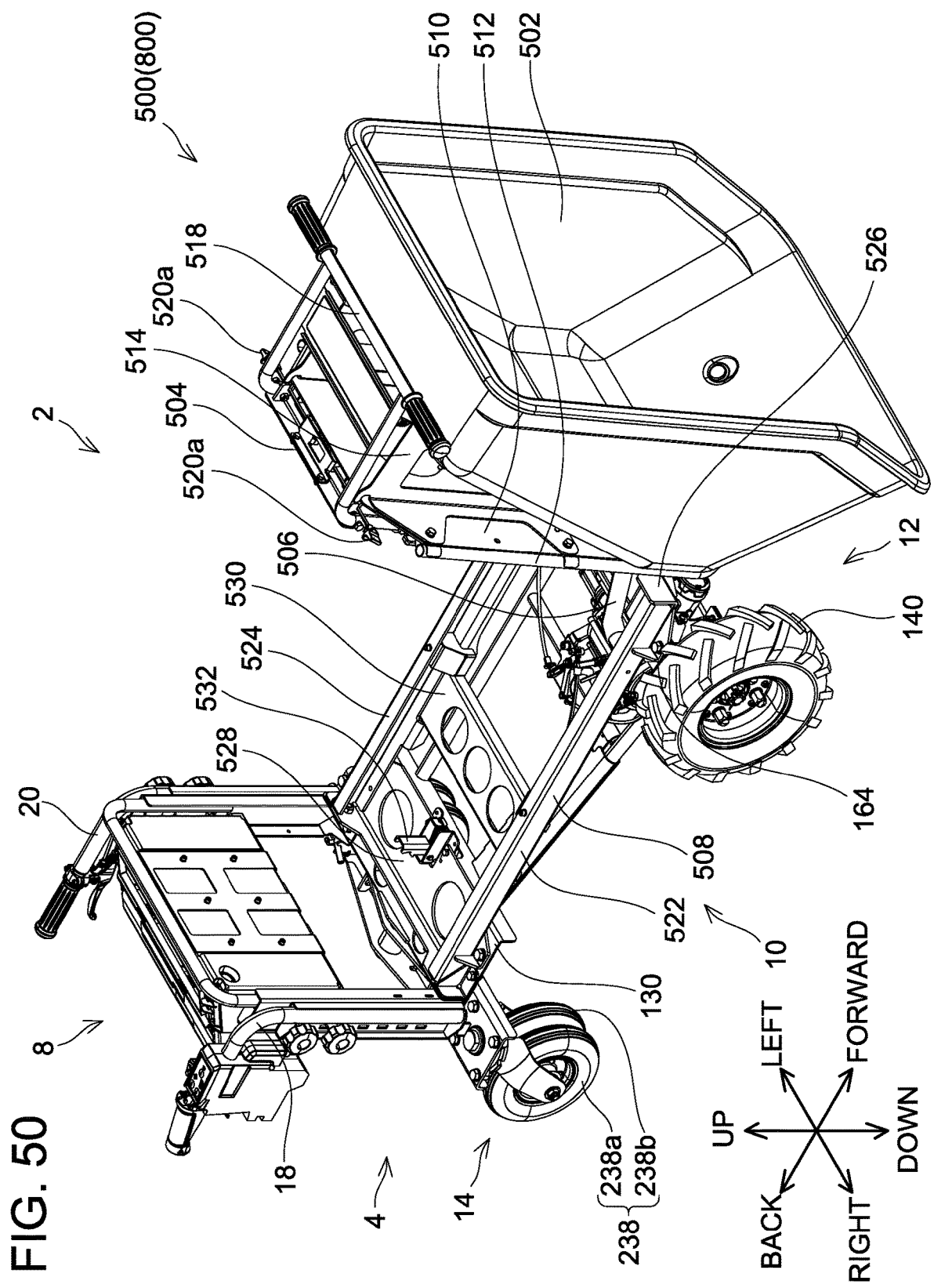
FIG. 50 is a perspective view of the cart 2 according to the embodiment with the third container unit 500 attached to the chassis unit 4 and a movable support base 504 tilted relative to a fixed support base 508, when seen from upper-front-right side.

As shown in FIGS. 49 and 50 the third container unit 500 includes a bucket 502, a movable support base 504, support arms 506, and a fixed support base 508. The fixed support base 508 of the third container unit 500 is screwed and fixed to the chassis unit 4. The third container unit 500 is configured to tilt the bucket 502 relative to the fixed support base 508 as shown in FIG. 50 by the user tilting the movable support base 504 relative to the fixed support base 508.

Figure 51:
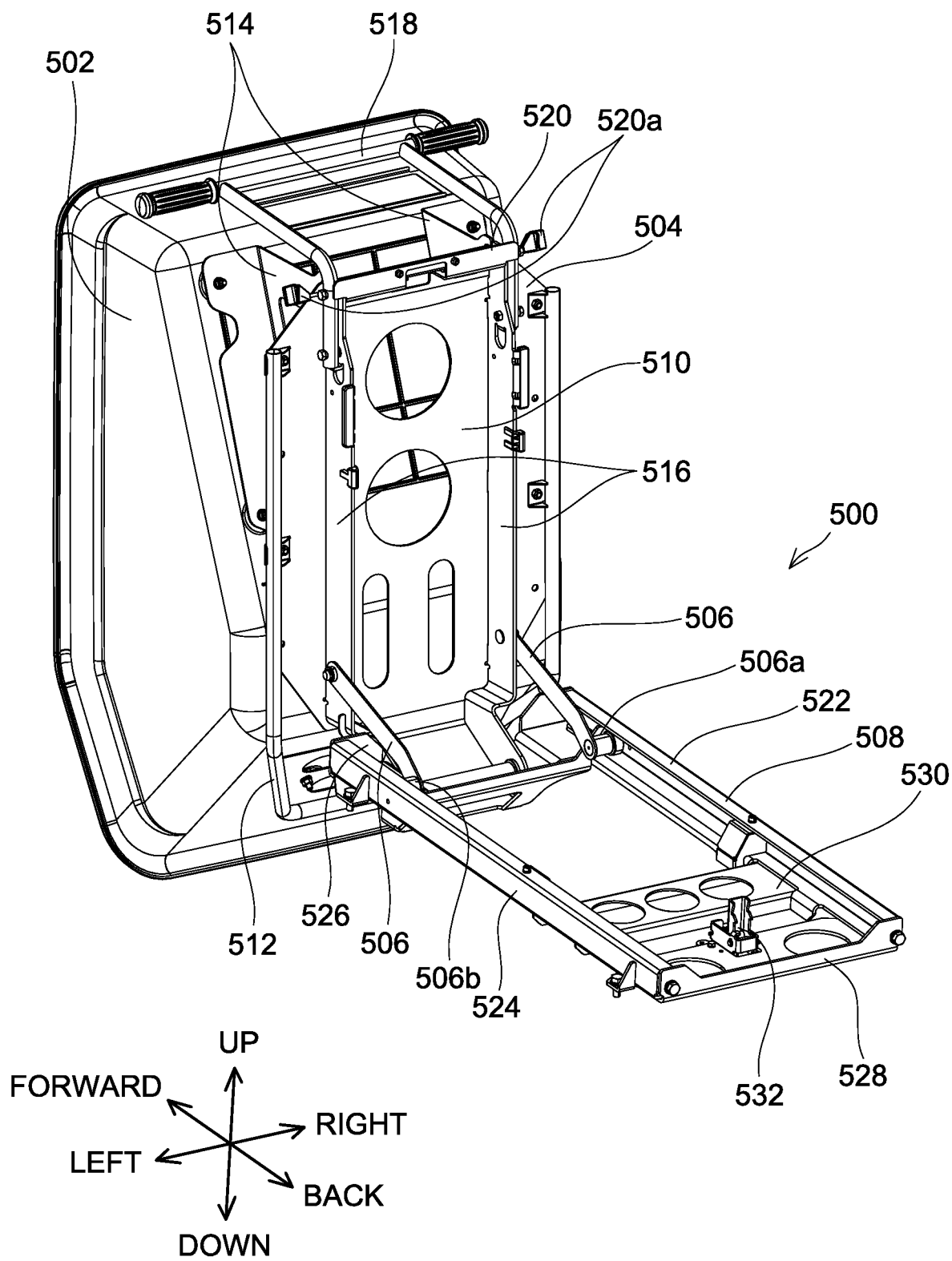
FIG. 51 is a perspective view of the third container unit 500 according to the embodiment with the movable support base 504 tilted relative to the fixed support base 508, when seen from upper-rear-left side.

The bucket 502 has a box shape with its upper side opened. As shown in FIG. 51, the movable support base 504 includes a base plate 510, a base pipe 512, an upper frame 514, a lower frame 516, a handle 518, and a latch mechanism 520. All of the base plate 510, the base pipe 512, the upper frame 514, and the lower frame 516 are constituted of a steel material. The base plate 510 is disposed along the front-rear direction and the right-left direction. The base pipe 512 extends along a lower surface of a front lower portion of the bucket 502 and also extends in the front-rear direction along a lower surface of the base plate 510. The base pipe 512 is screwed to the front lower portion of the bucket 502 and is also screwed to the base plate 510. The upper frame 514 is disposed between a lower surface of a rear lower portion of the bucket 502 and an upper surface of the base plate 510, along the front-rear direction and the up-down direction. The upper frame 514 is screwed to the rear lower portion of the bucket 502 and is also screwed to the base plate 510. The lower frame 516 extends in the front-rear direction along the lower surface of the base plate 510. The lower frame 516 is welded to the base plate 510. The handle 518 is located rearward of the bucket 502. The handle 518 is screwed to the lower frame 516. The latch mechanism 520 is disposed below the handle 518. The latch mechanism 520 is fixed to the base plate 510 and the lower frame 516.

The fixed support base 508 includes a right channel 522, a left channel 524, a front plate 526, a rear plate 528, a reinforcement frame 530, and a latch receiver 532. All of the right channel 522, the left channel 524, the front plate 526, the rear plate 528, and the reinforcement frame 530 are constituted of a steel material. The right channel 522 and the left channel 524 extend in the front-rear direction. The right channel 522 has a cross-sectional shape with its left side opened, and the left channel 524 has a cross-sectional shape with its right side opened. The front plate 526 is welded to a front end of the right channel 522 and a front end of the left channel 524. The rear plate 528 is welded to a rear end of the right channel 522 and a rear end of the left channel 524. As shown in FIGS. 49 and 50, the third container unit 500 is fixed to the chassis unit 4 by screwing the front plate 526 to the right bracket 164 and the left bracket 170 of the front wheel unit 12 and also screwing the rear plate 528 to the frame plate 130 of the chassis frame 10. As shown in FIG. 51, the reinforcement frame 530 extends in the right-left direction, a right end thereof is welded to the right channel 522, and a left end thereof is welded to the left channel 524. The latch receiver 532 is fixed at the vicinity of a center of the rear plate 528. The latch receiver 532 is disposed at a position corresponding to the latch mechanism 520 of the movable support base 504. When the movable support base 504 is tilted relative to the fixed support base 508 in a direction that brings a rear end of the movable support base 504 close to a rear end of the fixed support base 508, the latch mechanism 520 engages with the latch receiver 532. The latch mechanism 520 includes an unlatch knob 520a. The latch mechanism 520 is disengaged from the latch receiver 532 by the user operating the unlatch knob 520a when the latch mechanism 520 is engaged with the latch receiver 532.

Upper ends of the support arms 506 are connected to the vicinity of a front end of the lower frame 516 of the movable support base 504 to be pivotable about a pivot axis, which is the right-left direction. The support arms 506 are constituted of a steel material. Lower ends of the support arms 506 include rollers 506a and 506b, respectively. The rollers 506a and 506b are supported by the right channel 522 and the left channel 524 of the fixed support base 508, respectively.

When the user operates the unlatch knob 520a to disengage the latch mechanism 520 from the latch receiver 532 in the state shown in FIG. 49 and further pivots the handle 518 in forward, the movable support base 504 becomes tilted relative to the fixed support base 508 as shown in FIG. 50.

(Fourth Container Unit 600)

Figure 52:
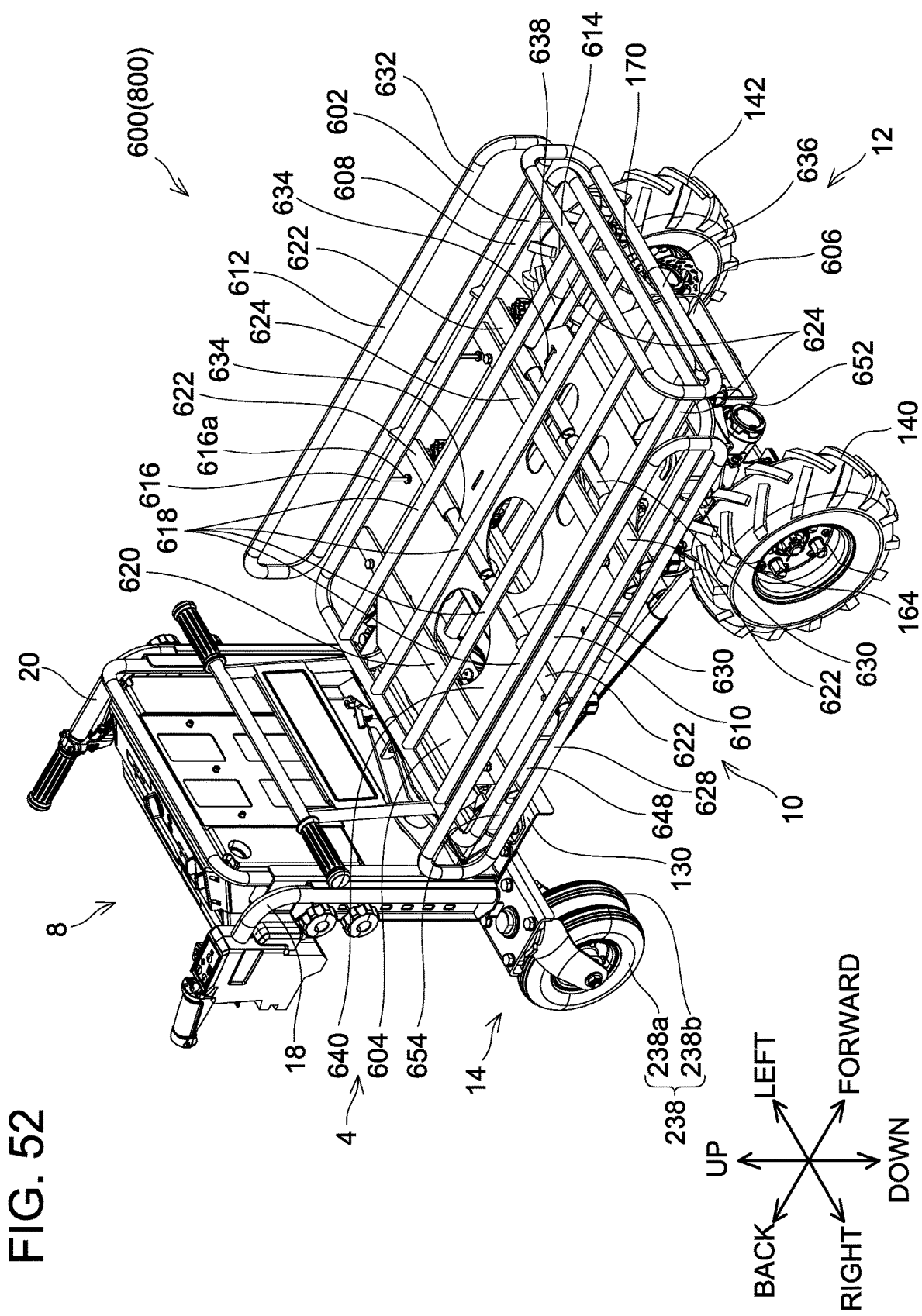
FIG. 52 is a perspective view of the cart 2 according to the embodiment with a fourth container unit 600 attached to the chassis unit 4, when seen from upper-front-right side.

As shown in FIGS. 52 and 53, the fourth container unit 600 includes a container 602, a movable support base 604, a support arm (not shown), and a fixed support base 606. The fixed support base 606 of the fourth container unit 600 is screwed and fixed to the chassis unit 4. The fourth container unit 600 is configured to tilt the container 602 relative to the fixed support base 606 by the user tilting the movable support base 604 relative to the fixed support base 606.

The container 602 includes a main frame 608, a right guard 610, a left guard 612, and a front guard 614. The main frame 608 includes a frame pipe 616, a floor pipe 618, a reinforcement pipe 620, a right guard retaining pipe 622, a left guard retaining pipe 624, and a front guard retaining pipe 626. All of the frame pipe 616, the floor pipe 618, the reinforcement pipe 620, the right guard retaining pipe 622, the left guard retaining pipe 624, and the front guard retaining pipe 626 are constituted of a steel material. The frame pipe 616 forms a substantially rectangular shape of which longitudinal direction is along the front-rear direction and short direction is along, the right-left direction. The floor pipe 618 extends in the front-rear direction on substantially the same plane as the frame pipe 616, and front and rear ends thereof are welded to the frame pipe 616. The reinforcement pipe 620 extends in the right-left direction along, lower surfaces of the frame pipe 616 and the floor pipe 618 and is welded to the frame pipe 616 and the floor pipe 618. The right guard retaining pipe 622 is disposed in the vicinity of a right end of the main frame 608, extends in the right-left direction along the lower surfaces of the frame pipe 616 and the floor pipe 618, and is welded to the frame pipe 616 and the floor pipe 618. The left guard retaining pipe 624 is disposed in the vicinity of a left end of the main frame 608, extends in the right-left direction along the lower surfaces of the frame pipe 616 and the floor pipe 618, and is welded to the frame pipe 616 and the floor pipe 618. The front guard retaining pipe 626 is disposed in the vicinity of a front end of the main frame 608, extends in the front-rear direction along the lower surface of the floor pipe 618, and is welded to the floor pipe 618. A hook 616a projecting downward is disposed on the lower surface of the frame pipe 616. When roping a load placed on the container 602, the user can hook the rope on the hook 616a.

The right guard 610 includes a guard pipe 626 and an insertion pipe 630. The guard pipe 628 and the insertion pipe 630 are both constituted of a steel material. The guard pipe 628 forms a substantially rectangular shape of which longitudinal direction is along the front-rear direction and short direction is along the up-down direction. The insertion pipe 630 extends in the right-left direction and a right end thereof is welded to a lower portion of the guard pipe 628. Insertion of the insertion pipe 630 into the right guard retaining pipe 622 enables the right guard 610 to be retained by the main frame 608. The right guard retaining pipe 622 includes a grip bolt 622a for fixing the position of the insertion pipe 630 to the right, guard retaining pipe 622. The user adjusts the position of the right guard 610 to the main frame 608 in the right-left direction with the grip bolt 622a loosened and then tightens the grip bolt 622a to fix the right guard 610 at a desired position to the main frame 608.

The left guard 612 includes a guard pipe 632 and an insertion pipe 634. The guard pipe 632 and the insertion pipe 634 are both constituted of a steel material. The guard pipe 632 forms a substantially rectangular shape of which longitudinal direction is along the front-rear direction and short direction is along the up-down direction. The insertion pipe 634 extends in the right-left direction and a left end thereof is welded to a lower portion of the guard pipe 632. Insertion of the insertion pipe 634 into the left guard retaining pipe 624 enables the left guard 612 to be retained by the main frame 608. The left guard retaining pipe 624 includes a grip bolt 624a for fixing the position of the insertion pipe 634 to the left guard retaining pipe 624. The user adjusts the position of the left guard 612 to the main frame 608 in the right-left direction with the grip bolt 624a loosened and then tightens the grip bolt 624a to fix the left guard 612 at a desired position to the main frame 608.

The front guard 614 includes a guard pipe 636 and an insertion pipe 638. The guard pipe 636 and the insertion pipe 638 are both constituted of a steel material. The guard pipe 636 forms a substantially rectangular shape of which longitudinal direction is along the right-left direction and short direction is along the up-down direction. The insertion pipe 638 extends in the front-rear direction and a front end thereof is welded to a lower portion of the guard pipe 636. Insertion of the insertion pipe 638 into the front guard retaining pipe 626 enables the front guard 614 to be retained by the main frame 608. The front guard retaining pipe 626 includes a grip bolt 626a for fixing the position of the insertion pipe 638 to the front guard retaining pipe 626. The user adjusts the position of the front guard 614 to the main frame 608 in the front-rear direction with the grip bolt 626a loosened and then tightens the grip bolt 626a to fix the front guard 614 at a desired position to the main frame 608.

The movable support base 604 includes a base plate 640, a lower frame 642, a handle 644, and a latch mechanism 646. The configurations of the base plate 640, the lower frame 642, the handle 644, and the latch mechanism 646 are similar to those of the base plate 510, the lower frame 516, the handle 518, and the latch mechanism 520 of the third container unit 500. The reinforcement pipe 620 of the main frame 608 is screwed to the base plate 640.

The fixed support base 606 includes a right channel 648, a left channel 650, a front plate 652, a rear plate 654, a reinforcement frame 656, and a latch receiver 658. The configuration of the fixed support base 606 is similar to that of the fixed support base 508 of the third container unit 500. Further, how the movable support base 604 is connected to the fixed support base 606 is similar to how the movable support base 504 is connected to the fixed support base 508 in the third container unit 500. That is, most of the components of the fourth container unit 600 are common with the components of the third container unit 500. Similar to the third container unit 500, when the user operates the unlatch knob 646a to disengage the latch mechanism 646 from the latch receiver 658 in the state shown in FIG. 52 and further pivots the handle 644 forward, the movable support base 604 becomes tilted relative to the fixed support base 606 in the fourth container unit 600.

(Fifth Container Unit 700)

Figure 54:
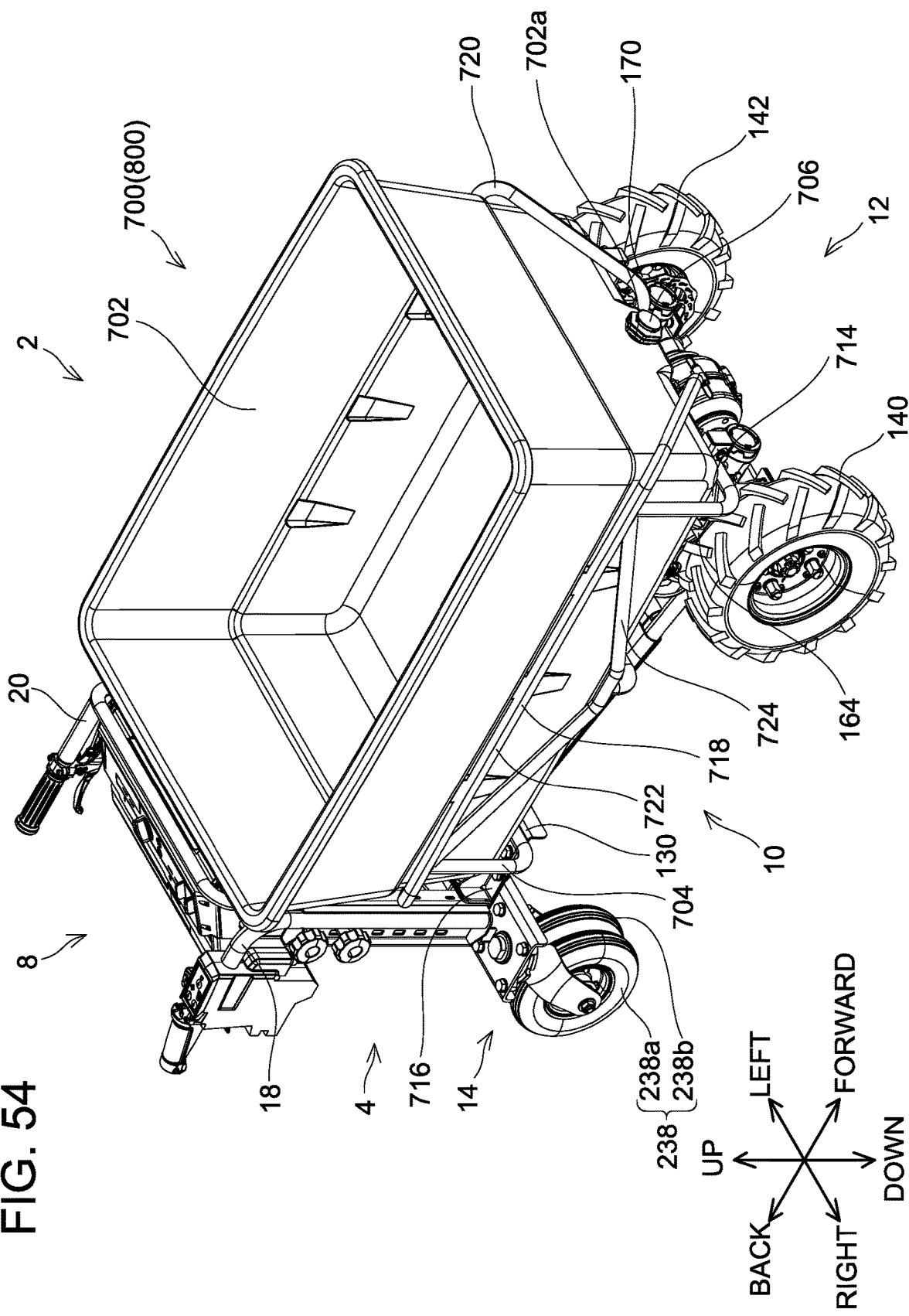
FIG. 54 is a perspective view of the cart 2 according to the embodiment with a fifth container unit 700 attached to the chassis unit 4, when seen from upper-front-right side.
Figure 55:
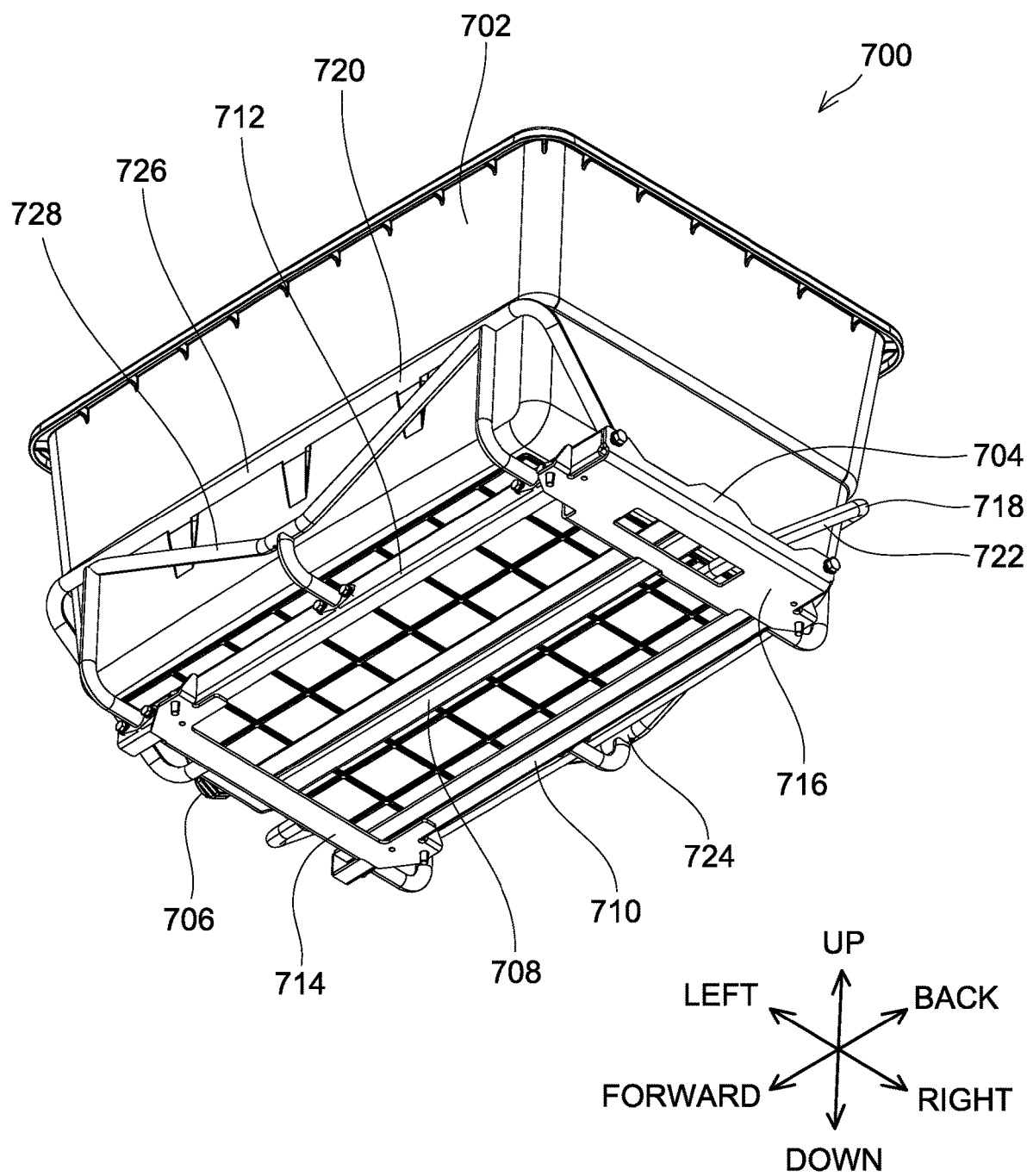
FIG. 55 is a perspective view of the fifth container unit 700 according to the embodiment, when seen from lower-rear-left side.

As shown in FIGS. 54 and 55, the fifth container unit 700 includes a bucket 702 and a support base 704. The support base 704 of the fifth container unit 700 is screwed and fixed to the chassis unit 4. In the fifth container unit 700, the bucket 702 is not fixed to the support base 704, thus the user can lift the bucket 702 to remove it from the support base 704 and place the bucket 702 onto the support base 704.

As shown in FIG. 54, the bucket 702 has a box shape with its upper side opened. A through hole 702a is disposed in a lower portion of a front surface of the bucket 702. A cap 706 is detachably attached to the through hole 702a.

As shown in FIG. 55, the support base 704 includes a central frame 708, a right channel 710, a left channel 712, a front plate 714, a rear plate 716, a right guard 718, and a left guard 720. All of the central frame 708, the right channel 710, the left channel 712, the front plate 714, and the rear plate 716 are constituted of a steel material. The central frame 708, the right channel 710, and the left channel 712 extend along the front-rear direction. The front plate 714 is welded to a front end of the central frame 708, a front end of the right channel 710, and a front end of the left channel 712, The rear plate 716 is welded to a rear end of the central frame 708, a rear end of the right channel 710, and a rear end of the left channel 712. As shown in FIG. 54, the fifth container unit 700 is fixed to the chassis unit 4 by screwing the front plate 714 to the right bracket 164 and the left bracket 170 of the front wheel unit 12 and screwing the rear plate 716 to the frame plate 130 of the chassis frame 10.

The right guard 718 includes a guard pipe 722 and a reinforcement pipe 724. The guard pipe 722 and the reinforcement pipe 724 are both constituted of a steel material. The guard pipe 722 extends in the front-rear direction along a right surface of the bucket 702. The guard pipe 722 is bent downward and leftward at a front end of the bucket 702 along a front surface of the bucket 702 and is connected to the front plate 714. The guard pipe 722 is also bent downward and leftward at a rear end of the bucket 702 along a rear surface of the bucket 702 and is connected to the rear plate 716. The reinforcement pipe 724 connects between the guard pipe 722 and the right channel 710.

As shown in FIG. 55, the left guard 720 includes a guard pipe 726 and a reinforcement pipe 728. The guard pipe 726 and the reinforcement pipe 728 are both constituted of a steel material. The guard pipe 726 extends in the front-rear direction along a left surface of the bucket 702. The guard pipe 726 is bent downward and rightward at the front end of the bucket 702 along the front surface of the bucket 702 and is connected to the front plate 714. The guard pipe 726 is also bent downward and rightward at the rear end of the bucket 702 along the rear surface of the bucket 702 and is connected to the rear plate 716. The reinforcement pipe 728 connects between the guard pipe 722 and the left channel 712.

As described, in one or more embodiments, the cart 2 (an example of handcart) comprises the right front wheel 140 and the left front wheel 142 (examples of drive wheel); the motor 150 (an example of prime mover) configured to rotate the right front wheel 140 and the left front wheel 142; the right handle 18 and the left handle 20 (examples of grip portion) configured to be gripped by the user; and the taillight 74 (an example of visibly noticeable portion) that is clearly noticeable from behind the user when the user stands behind the cart 2, gripping the right handle 18 and the left handle 20.

In this configuration, the taillight 74 can be visually noticed from behind the user even when the user stands behind the cart 2, gripping the right handle 18 and the left handle 20. Thus, the configuration can inform a person or a car coming from behind that transferring work is in progress with the cart 2.

In one or more embodiments, the taillight 74 configured to emit light functions as a visibly noticeable portion that is clearly noticeable.

This configuration can surely inform a person or a car coming from behind that transferring work is in progress with the cart 2, even when the cart 2 is used outdoor at night and/or in bad weather or the cart 2 is used indoor, for example, in a factory.

In one or more embodiments, the right handle 18 includes the grip 38 extending in the front-rear direction. The taillight 74 is disposed forward of the rear end of the grip 38.

In this configuration, when an object collides with the cart 2 from behind it, the object collides with the rear end of the grip 38 before reaching the taillight 74. Thus, damage to the taillight 74 can be prevented.

In one or more embodiments, the cart 2 further comprises the casing 66 disposed near the grip 38 and the operation lever 72 (an example of operation member) supported by the casing 66 and configured to be operable by the user with the user gripping the grip 38. The motor 150 is configured to rotate the right front wheel 140 and the left front wheel 142 when the operation lever 72 is operated by the user.

This configuration enables the user to perform an operation for driving the motor 150 while the user grips the grip 38, thus it improves convenience for the user.

In one or more embodiments, the taillight 74 is disposed on the rear surface of the casing 66.

This configuration can simplify the configuration of the cart 2 as compared to a configuration in which the taillight 74 is disposed separately from the casing 66 which supports the operation lever 72.

In one or more embodiments, the cart 2 further comprises the alarm sound button 70 supported by the casing 66 and configured to be operable by the user with the user gripping the grip 38; and the buzzer 124 (an example of alarm sound emitter) configured to emit the alarm sound when the alarm sound button 70 is operated by the user.

This configuration can inform a person or a car that is present in other directions than behind the cart 2 that transferring work is in progress with the cart 2, by emitting the alarm sound from the buzzer 124. Further, the configuration enables the user to perform an operation for emitting the alarm sound from the buzzer 124 while the user grips the grip 38, thus it can improve the user's convenience.

In one or more embodiments, the motor 150 functions as a prime mover configured to rotate the right front wheel 140 and the left front wheel 142.

This configuration can suppress vibrations transmitted to a load on the cart 2 as compared to a configuration in which an engine is used as the prime mover for rotating the right front wheel 140 and the left front wheel 142.

In one or more embodiments, the cart 2 further comprises the battery mounting portions 110 to which the battery packs 112 are detachably attached. The motor 150 is driven by electric power from the battery packs 112.

This configuration enables the motor 150 to be supplied with the electric power, without connecting the cart 2 with an external power supply via a power cord.

What is claimed is:

1. A handcart comprising:
a drive wheel;
a prime mover configured to rotate the drive wheel;
a right grip and a left grip configured to be gripped by a user; and
a visibly noticeable portion disposed at a position that is visually recognizable from behind the user when the user stands behind the handcart gripping both of the right grip and the left grip, wherein
the right grip is disposed on a right side of a center of the handcart in a left-right direction,
the left grip is disposed on a left side of the center of the handcart in the left-right direction,
the visibly noticeable portion includes at least one of a taillight configured to emit light and a reflector configured to receive and reflect light,
the right grip and the left grip extend in a front-rear direction, and
the visibly noticeable portion is disposed forward of rear ends of the right grip and the left grip.

2. The handcart according to claim 1, further comprising:
a casing disposed near the right grip or the left grip; and
an operation member supported by the casing and configured to be operable by the user with the user gripping both of the right grip and the left grip,
wherein the prime mover is configured to rotate the drive wheel when the operation member is operated by the user.

3. The handcart according to claim 2, wherein the visibly noticeable portion is disposed on a rear surface of the casing.

4. The handcart according to claim 2, further comprising:
an alarm sound button supported by the casing and configured to be operable by the user with the user gripping both of the right grip and the left grip; and
an alarm sound emitter configured to emit an alarm sound when the alarm sound button is operated by the user.

5. The handcart according to claim 1, wherein the prime mover includes a motor.

6. The handcart according to claim 5, further comprising a battery mounting portion to which a battery is detachably attached,
wherein the motor is driven by electric power from the battery.

7. The handcart according to claim 1, wherein, in the left-right direction, a distance from the center of the handcart to a center of the visibly noticeable portion is 150 mm or more.

8. A handcart comprising:
a drive wheel;
a prime mover configured to rotate the drive wheel;
a right grip and a left grip configured to be gripped by a user;
a switch box; and
a visibly noticeable portion disposed at a position that is visually recognizable from behind the user when the user stands behind the handcart gripping both of the right grip and the left grip, wherein
the right grip is disposed on a right side of a center of the handcart in a left-right direction,
the left grip is disposed on a left side of the center of the handcart in the left-right direction,
the visibly noticeable portion includes at least one of a taillight configured to emit light and a reflector configured to receive and reflect light,
the visibly noticeable portion is disposed lower than the right grip and the left grip, and
the visibly noticeable portion is attached to the switch box in a location directly under the right grip or the left grip.

9. The handcart according to claim 8, wherein the prime mover includes a motor.

10. The handcart according to claim 9, further comprising a battery mounting portion to which a battery is detachably attached,
wherein the motor is driven by electric power from the battery.

11. The handcart according to claim 8, wherein, in the left-right direction, a distance from the center of the handcart to a center of the visibly noticeable portion is 150 mm or more.

12. A handcart comprising:
a drive wheel;
a prime mover configured to rotate the drive wheel;
a right grip and a left grip configured to be gripped by a user; and
a visibly noticeable portion disposed at a position that is visually recognizable from behind the user when the user stands behind the handcart gripping both of the right grip and the left grip, wherein
the right grip is disposed on a right side of a center of the handcart in a left-right direction,
the left grip is disposed on a left side of the center of the handcart in the left-right direction,
the visibly noticeable portion includes at least one of a taillight configured to emit light and a reflector configured to receive and reflect light,
the visibly noticeable portion is disposed at a same height as the right grip or the left grip, and the visibly noticeable portion is disposed on a rear end surface of the right grip or the left grip.

13. The handcart according to claim 12, wherein the prime mover includes a motor.

14. The handcart according to claim 13, further comprising a battery mounting portion to which a battery is detachably attached,
wherein the motor is driven by electric power from the battery.

15. The handcart according to claim 12, wherein, in the left-right direction, a distance from the center of the handcart to a center of the visibly noticeable portion is 150 mm or more.

* * * * *